(12) United States Patent
Shao et al.

(10) Patent No.: US 10,878,349 B2
(45) Date of Patent: *Dec. 29, 2020

(54) METHOD OF GENERATING AN OPTIMIZED SHIP SCHEDULE TO DELIVER LIQUEFIED NATURAL GAS

(71) Applicant: ExxonMobil Upstream Research Company, Spring, TX (US)

(72) Inventors: Yufen Shao, Houston, TX (US); Vikas Goel, Houston, TX (US); Joshua R. Lowry, Houston, TX (US); Bora Tarhan, Houston, TX (US); Kevin C. Furman, Morristown, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/688,685

(22) Filed: Apr. 16, 2015

(65) Prior Publication Data

US 2015/0324714 A1 Nov. 12, 2015

Related U.S. Application Data

(60) Provisional application No. 62/020,892, filed on Jul. 3, 2014, provisional application No. 62/020,890, filed on
(Continued)

(51) Int. Cl.
*G06Q 10/06* (2012.01)
*G06Q 10/08* (2012.01)
(Continued)

(52) U.S. Cl.
CPC ........ *G06Q 10/0631* (2013.01); *G06Q 10/04* (2013.01); *G06Q 10/0633* (2013.01); *G06Q 10/0832* (2013.01); *G06Q 50/06* (2013.01)

(58) Field of Classification Search
CPC .......... G06Q 10/0631; G06Q 10/0633; G06Q 10/0832; G06Q 10/04; G06Q 50/06
See application file for complete search history.

(56) References Cited

U.S. PATENT DOCUMENTS 6,076,067 A * 6/2000 Jacobs .................. G06Q 10/06
705/35
6,298,671 B1 10/2001 Kennelley et al.
(Continued)

FOREIGN PATENT DOCUMENTS

WO 2013/148442 10/2013

OTHER PUBLICATIONS

"Scheduling short-term marine transport of bulk products", DO Bausch, GG Brown, D Ronen—Maritime Policy & Management, 1998—Taylor & Francis.*
(Continued)

*Primary Examiner* — Jonathan G Sterrett
(74) *Attorney, Agent, or Firm* — ExxonMobil Upstream Research Company—Law Department

(57) ABSTRACT

A system and method is provided for generating an optimized ship schedule to deliver liquefied natural gas (LNG) from one or more LNG liquefaction terminals to one or more LNG regasification terminals using a fleet of ships. The method involves modeling the ship schedule via an LNG ship scheduling model and a LNG ship rescheduling model to provide optimized decisions for the LNG supply chain. The LNG supply chain includes the one or more LNG liquefaction terminals, the one or more LNG regasification terminals, and the fleet of ships.

22 Claims, 12 Drawing Sheets

Related U.S. Application Data on Jul. 3, 2014, provisional application No. 61/990,035, filed on May 7, 2014.

(51) Int. Cl.
  *G06Q 50/06* (2012.01)
  *G06Q 10/04* (2012.01)

(56) References Cited

U.S. PATENT DOCUMENTS

| | | |
|---|---|---|
| 6,335,733 B1 | 1/2002 | Keren et al. |
| 6,456,982 B1 | 9/2002 | Pilipovic |
| 6,631,615 B2 | 10/2003 | Drube et al. |
| 6,785,662 B1 | 8/2004 | Guy et al. |
| 6,983,186 B2 | 1/2006 | Navani et al. |
| 7,050,056 B2 | 5/2006 | Meyringer |
| 7,099,341 B2 | 8/2006 | Lingafelt et al. |
| 7,162,444 B1 | 1/2007 | Machado, Jr. et al. |
| 7,264,025 B2 | 9/2007 | Farese et al. |
| 7,406,475 B2 | 7/2008 | Dorne et al. |
| 7,448,046 B2 | 11/2008 | Navani et al. |
| 7,587,328 B2 | 9/2009 | Kawahara et al. |
| 7,606,776 B1 | 10/2009 | Havens et al. |
| 7,634,449 B2 | 12/2009 | Alvarado et al. |
| 7,657,480 B2 | 2/2010 | Harper |
| 7,676,420 B1 | 3/2010 | Agnew et al. |
| 7,730,046 B2 | 6/2010 | Barth et al. |
| 7,797,205 B2 | 9/2010 | Song et al. |
| 7,873,429 B2 | 1/2011 | Boutemy et al. |
| 7,925,581 B2 | 4/2011 | Mordecai |
| 8,000,988 B1 * | 8/2011 | Bezanson ............ G06Q 10/063 705/7.11 |
| 8,019,617 B2 | 9/2011 | Kocis et al. |
| 8,032,451 B2 | 10/2011 | Mordecai |
| 8,275,719 B1 | 9/2012 | Agnew et al. |
| 8,321,354 B2 | 11/2012 | Ye et al. |
| 8,374,898 B2 | 2/2013 | El-Bakry et al. |
| 8,402,983 B2 | 3/2013 | Harland et al. |
| 8,494,976 B2 | 7/2013 | Furman et al. |
| 8,504,335 B2 | 8/2013 | Furman et al. |
| 8,577,778 B2 | 11/2013 | Lange et al. |
| 8,600,911 B2 | 12/2013 | Kocis et al. |
| 8,626,565 B2 | 1/2014 | Petroff |
| 8,775,347 B2 | 7/2014 | Goel et al. |
| 8,775,361 B2 | 7/2014 | Goel et al. |
| 8,788,068 B2 | 7/2014 | Kocis et al. |
| 8,812,397 B2 | 8/2014 | Mordecai |
| 8,849,623 B2 | 9/2014 | Carvallo et al. |
| 8,972,304 B2 | 3/2015 | Ye et al. |
| 9,129,449 B2 | 9/2015 | Davidson |
| 9,135,826 B2 | 9/2015 | Malhotra |
| 2002/0156663 A1 | 10/2002 | Weber et al. |
| 2004/0133458 A1 | 7/2004 | Hanrahan |
| 2004/0236714 A1 | 11/2004 | Eisenberger et al. |
| 2005/0144033 A1 | 6/2005 | Vreeke et al. |
| 2006/0089787 A1 | 4/2006 | Burr et al. |
| 2006/0168168 A1 * | 7/2006 | Xia ..................... H04L 43/00 709/223 |
| 2008/0010357 A1 | 1/2008 | Ye et al. |
| 2008/0134193 A1 * | 6/2008 | Corley ................. G06F 9/52 718/104 |
| 2008/0140597 A1 * | 6/2008 | Satir ................... G06Q 10/04 706/46 |
| 2009/0094087 A1 * | 4/2009 | Chung ................ G06Q 10/063 705/7.11 |
| 2009/0094141 A1 | 4/2009 | Regnery et al. |
| 2009/0177505 A1 | 7/2009 | Dietrich et al. |
| 2010/0000252 A1 | 1/2010 | Morris et al. |
| 2010/0088142 A1 * | 4/2010 | El-Bakry ......... G06Q 10/06312 705/7.22 |
| 2010/0257015 A1 | 10/2010 | Molander |
| 2010/0287073 A1 | 11/2010 | Kocis et al. |
| 2010/0332273 A1 | 12/2010 | Balasubramanian et al. |
| 2011/0182698 A1 | 7/2011 | Foo et al. |
| 2011/0307230 A1 | 12/2011 | Lee et al. |
| 2012/0053975 A1 | 3/2012 | Lohn, Jr. |
| 2012/0084110 A1 | 4/2012 | Wu et al. |
| 2012/0123578 A1 | 5/2012 | Ransbarger et al. |
| 2013/0030873 A1 | 1/2013 | Davidson |
| 2013/0246032 A1 | 9/2013 | El-Bakry et al. |
| 2014/0058775 A1 | 2/2014 | Siig et al. |
| 2014/0089030 A1 | 3/2014 | Bell |
| 2014/0089031 A1 | 3/2014 | Bell |
| 2014/0089032 A1 | 3/2014 | Bell |
| 2014/0180566 A1 | 6/2014 | Malhotra |
| 2014/0183120 A1 | 7/2014 | Schmitz et al. |
| 2014/0303895 A1 | 10/2014 | Dreyfus et al. |
| 2014/0310049 A1 | 10/2014 | Goel et al. |
| 2014/0310156 A1 | 10/2014 | Mordecai |
| 2014/0316839 A1 | 10/2014 | Furman et al. |
| 2014/0324727 A1 | 10/2014 | Hoda et al. |
| 2014/0336853 A1 | 11/2014 | Bradenham et al. |
| 2014/0344000 A1 | 11/2014 | Furman et al. |
| 2014/0378319 A1 | 12/2014 | Regberg et al. |
| 2015/0012326 A1 | 1/2015 | Furman et al. |
| 2015/0170094 A1 | 1/2015 | Ye et al. |
| 2015/0051941 A1 | 2/2015 | Bell |
| 2015/0178649 A1 | 6/2015 | Furman et al. |
| 2015/0324714 A1 | 11/2015 | Shao et al. |
| 2015/0324740 A1 | 11/2015 | Shao et al. |
| 2016/0253607 A1 | 9/2016 | Xu |
| 2016/0307155 A1 | 10/2016 | Bell |
| 2017/0031356 A1 | 2/2017 | Bell |
| 2017/0109673 A1 | 4/2017 | Bell |

OTHER PUBLICATIONS

Theofanis, et.al., "Container Terminal Berth Planning", Transportation Research Record Journal of the Transportation Research Board, Dec. 2009, pp. 26-27.*

Maritime inventory routing problems maritime inventory routing problems M Christiansen, K Fagerholt—Encyclopedia of optimization, 2008—Springer.*

"An adaptive solution to dynamic transport optimization", K Dorer, M Calisti—Proceedings of the fourth international joint . . . , 2005—dl.acm.org.*

"Multiobjective optimization and multiple constraint handling with evolutionary algorithms. I. A unified formulation", CM Fonseca, PJ Fleming—IEEE Transactions on Systems, Man, . . . , 1998—ieeexplore.ieee.org.*

Clever Carl Age 7 to 14 Article by NRICH team Published Apr. 1999,Oct. 2009,Sep. 2012,Feb. 2011., retrieved from the web at: https://nrich.maths.org/2478 (Year: 2011).*

Agarwal, R., et al., (2009), "Collaboration in Cargo Transportation", in W. Chaovalitwongse, K.C. Furman and P. Pardalos (Eds.), *Optimization and Logistics Challenges in the Enterprise*, Springer, p. 373-409.

Andersson, H, et al., (2010), "Transportation Planning and Inventory Management in the LNG Supply Chain", *Energy Systems*, v. 3, p. 427-439.

Black, F., et al., (1973), "The Pricing of Options and Corporate Liabilities," *Journal of Political Economy*, v. 81, p. 637-654.

Christiansen, M., et al., (2004), "Ship Routing and Scheduling: Status and Perspectives". *Transportation Science*, v. 38 n. 1, p. 1-18.

Clewlow, L., et al., (2000), "Chapters 6, 7 and 8," *Energy Derivatives: Pricing and Risk Management*, Lacima Group, p. 89-162.

Contesse, L., et al., (2005), "A Mixed-Integer Programming Model for Gas Purchase and Transportation", *Engineering School, Catholic University of Chile*, p. 1-19.

Ergun, O., et al., (2007), "Shipper Collaboration", *Computers & Operations Research*, v. 34, p. 1551-1560.

Fagerholt, K. et al., (2002), "Design of a sea-borne system for fresh water transport—A simulation analysis", *Belgian Journal of Operations Research, Statistics and Computer Science.* v. 40 n. 3-4, p. 137-146.

Felix, B.J., et al., (2008), "Gas Storage Valuation: Comparison of Recombining Trees and Least Squares Monte-Carlo Simulation", Engineering Management Conference, IEMC Europe 2008, p. 1-4.

(56) References Cited

OTHER PUBLICATIONS

Fodstad, M., et al., (2008), "Profit Maximization in the LNG-Value Chain by Combining Market Prices and Ship Routing", Conference Proceedings, *APIEMS 2008—The 9th Asia Pacific Ind. Eng. & Management Systems Conference*.

Gabriel, S.A., et al., (2005), "A Mixed Complementarity-Based Equilibrium Model of Natural Gas Markets", Operations Research v. 53(5) p. 799-818.

Grønhaug, R., et al., (2010), "A Branch-and-Price Method for a Liquefied Natural Gas Inventory Routing Problem", *Transportation Science*, v. 44 n. 3, p. 400-415.

Grønhaug, R., et al., (2009), "Supply Chain Optimization for the Liquefied Natural Gas Business", in L. Bertazzi, J. van Nunen, & M.G. Speranza (Eds.), Innovation in distribution logistics, Springer, Lecture Notes in Economics and Mathematical Systems, vol. 619, p. 195-218.

Guigues, V., et al., (2010), "Robust management and pricing of LNG contracts with cancellation options", *Optimization Online*, Dec. 2010.

Halvorsen-Weare, E.E., et al., (2010), "Routing and scheduling in a liquefied natural gas shipping problem with inventory and berth constraints", To appear in *Annals of Operations Research*, DOI 10.1007/s10479-010-0794-y.

Hartley, P., et al. (2006), The Baker Institute world gas trade model. In A. Jaffe, D. Victor & M. Hayes (Eds.), *Natural Gas and Geopolitics:From 1970 to 2040*, Cambridge University Press, p. 357-406.

Haubrich, J.G., et al., (2004), "Oil Prices: Backward to the Future?", Federal Reserve Bank of Cleveland, *Economic Commentary*, Dec. 2004.

Lai, G., et al., (2010), "An Approximate Dynamic Programming Approach to Benchmark Practice-Based Heuristics for Natural Gas Storage Valuation", *Operations Research*, v. 58, p. 564-582.

Lai, G., et al., (2011), "Valuation of Storage at a Liquefied Natural Gas Terminal", *Operations Research*, forthcoming, pp. 602-616.

The Lanner Group, (2011), "Case Study: Lanner and Shell Develop ADGENT Simulation Tool", http://www.lanner.com, downloaded Feb. 2011, p. 1-2.

The Lanner Group (2011), "Case Study: Improving Shipping Distribution at Exxon", http://www.lanner.com, downloaded Feb. 2011. p. 1-2.

Lustig, , I., et al., (2010), "The Analytics Journey", *Analytics*, Nov./Dec. 2010, p. 11-18.

Muller, L., et al. (2010), "Evaluation of Optional Cancellation Contracts using Quantitative Finance Techniques", Technical Paper, IMPA, submitted for publication.

Özelkan, E.C., (2008), "Optimizing liquefied natural gas terminal design for effective supply-chain operations", *International Journal of Production Economics*. V. 111, p. 529-542.

Pattison, G., (2010), "GNL Chile—Managing a New LNG Value Chain", *Proceedings of the Operational Research Society Simulation Workshop 2010*.

Pattison, G., (2003), "Maximizing LNG Supply Chain Efficiency with Simulation Modeling", *Offshore Technology Conference*, Houston, [The Lanner Group], p. 1-9.

Quelhas, A., et al. (2006), "A Multiperiod Generalized Network Flow Model of the U.S. Integrated Energy System Part I—Model Description", *the National Science Foundation*, 9 pages.

Rakke, J.G., et al., (2010), "A rolling horizon heuristic for creating a liquefied natural gas annual delivery program", To appear in *Transportation Research Part C, Emerging Technologies*, V19, 5, p. 896-911.

Rodríguez, R.Y., (2008), "Real option valuation of free destination in long-term liquefied natural gas supplies", *Energy Economics*, v. 30, p. 1909-1932.

Rzevski, G., et al., (2004), "Magenta Multi-Agent Technology: Mageneta Platform Version 2" Whitepaper, pp. 1-37.

Saker Solutions (2004), "Simulation in the oil & gas sector", Whitepaper, p. 1-4.

Stchedroff, N., et al., (2003), "Modeling a Continuous Process with Discrete Simulation Techniques and Its Application to LNG Supply Chains", *Proceedings of the 2003 Winter Simulation Conference*, [Shell Information Technology International], p. 1607-1611.

Tomasgard, A., et al., (2007), "Optimization Models for the Natural Gas Value Chain", *Norwegian University of Science and Technology, SINTEF*, p. 1-39.

Uggen, K.T., et al., (2008), "Profit Maximization in the LNG-Value Chain by Combining Market Prices and Ship Routing", Conference Proceedings, *APIEMS 2008—The 9th Asia Pacific Ind. Eng. & Management Systems Conference*, p. 1-12.

Van de Broecke, A., et al., (2007), "Optimising the LNG Supply Chain", Petroleum Review, v. 61, n. 725, p. 30-32+48 [Honeywell].

You, F., et al., (2008), "Risk Management for a Global Supply Chain Planning Under Uncertainty: Models and Algorithms", *Dept. of Chemical Engineering, Carnegie Mellon University*, p. 1-40.

Fodstad, M., et al., (2011), "LNG Scheduler: a rich model for coordinating vessel routing, inventories and trade in the liquefied natural gas supply chain", *Journal of Energy Markets*, v. 3, n. 4, Winter 2010/11, p. 31-64.

* cited by examiner

METHOD OF GENERATING AN OPTIMIZED SHIP SCHEDULE TO DELIVER LIQUEFIED NATURAL GAS

CROSS-REFERENCE TO RELATED APPLICATION

This application claims the benefit of U.S. Provisional Patent Applications 62/020,892 filed Jul. 3, 2014 entitled METHOD OF GENERATING AN OPTIMIZED SHIP SCHEDULE TO DELIVER LIQUEFIED NATURAL GAS; U.S. Provisional Patent Application 62/020,890 filed Jul. 3, 2014 entitled METHOD OF GENERATING AN OPTIMIZED SHIP SCHEDULE TO DELIVER LIQUEFIED NATURAL GAS; and U.S. Provisional Patent Application 61/990,035 filed May 7, 2014 entitled METHOD OF GENERATING AN OPTIMIZED SHIP SCHEDULE TO DELIVER LIQUEFIED NATURAL GAS, the entirety of which is incorporated by reference herein.

FIELD OF THE INVENTION

Disclosed aspects and methodologies relate to Liquefied Natural Gas (LNG) operations, and more particularly, to systems and methods relating to planning and operations of an LNG project or projects.

BACKGROUND

This section is intended to introduce various aspects of the art, which may be associated with aspects of the disclosed techniques and methodologies. References discussed in this section may be referred to hereinafter. This discussion, including the references, is believed to assist in providing a framework to facilitate a better understanding of particular aspects of the disclosure. Accordingly, this section should be read in this light and not necessarily as admissions of prior art.

The current liquefied natural gas (LNG) business is driven by long-term contracts and planning. Currently, annual delivery schedules for each LNG project are planned and agreed upon by various parties before the beginning of each contractual time period. In addition, an updated 90-day delivery schedule is developed by the LNG producer and provided to customers every month to account for deviations from the annual schedule. Agreement on these delivery plans can involve significant negotiation and coordination of operations by several parties. Consequently, developing a portfolio of LNG projects and operating LNG liquefaction terminals involves significant long-term planning which can greatly benefit from robust planning and optimization tools.

Increasing liquidity in the LNG market may cause the global LNG business to evolve from a long-term contracts based business to one with significantly more flexibility and short-term sales. This will complicate the management of projects since operations will have to be optimized not only to satisfy contractual obligations but also to maximize profitability by exploiting contractual flexibility and market opportunities. Known attempts to manage LNG projects via computational technology have fallen short because of substantially reduced scope, reduced capabilities of the proposed solutions, and/or a lack of the technology utilized. The following paragraphs discuss known attempts as they relate to various aspects of the disclosed methodologies and techniques.

Many conventional LNG projects tend to use simple spreadsheets for scheduling ships. The schedule has to be populated manually and does not provide any optimization functionality. Even in the more detailed systems, there are no known integrated models for lifting schedule generation combined with ship schedule optimization. This can lead to sub-optimal plans manifested in over-utilization of spot vessels for satisfying contractual demands. Further, generating a feasible shipping schedule could require a great number of iterations between the capacity planning and the ship scheduling components. Additionally, the ship scheduling components of the more sophisticated models do not seek to optimize schedules for selling spot cargoes, and do not account for transportation losses in cargo (e.g. boil-off, fuel) and consequently the generated ship schedules have discrepancies when attempting to satisfy contractual obligations related to annual volume delivered.

As an example, Rakke et al appears to describe a first attempt to address problems of developing Annual Development Plans (ADPs) for larger LNG projects. See, e.g., J. G. Rakke, M. Stalhane, C. R. Moe, M. Christiansen, H. Andersson, K. Fagerholt, I. Norstad, (2010), "A rolling horizon heuristic for creating a liquefied natural gas annual delivery program", to appear in Transportation Research Part C, doi:10.1016/j.trc.2010.09.006. While Rakke reports results for problems with multiple ships and a one year planning horizon, the optimization model and solution methods are fairly simplified. For example, the model is built for a case with only one producing terminal, boil-off and heel calculations are not integrated with ship schedules, partial loads and discharges are not allowed, time windows are not specified for deliveries, etc. From a practical perspective, known ship schedule methodologies address a much simplified and a small subset of the LNG ship schedule optimization problem.

To address some of the problems in conventional methods, other methods may provide the capability to perform a number of valuation and validation analyses for the LNG supply chain incorporating options and opportunities. See, .e.g., Intl. Patent Application These methods may include identification and valuation of short-term and long-term options, portfolio planning analysis, and management of shipping operations, validation of supply chain operability, and new LNG project design and evaluation. Accordingly, these references describe a suite of fit-for-purpose optimization and analytics applications are used in combination within various workflows and methodologies. In particular, these models form the combined suite of applications (e.g., five optimization and analytical models in the software suite) to be used in operations, analysis and decision-making within the LNG value chain. These models include: (1) ship scheduling, which has a capability for combined LNG ship scheduling, logistics and inventory optimization to develop annual delivery programs, rolling 90-day schedules, or schedules of any other useful scheduling time horizon; (2) optionality planning, which is used to identify the benefits, value or advantages in potential options and investments in long-term global LNG market analysis and for portfolio planning; (3) price model, which provides advanced price scenario generation capabilities enabling the valuation and statistical analysis of short-term optionality; (4) supply chain design, which provides optimization under uncertainty for robust LNG supply chain designs of new LNG projects including appropriate operational details; and (5) shipping simulation, which is a high-fidelity simulator to study, probabilistically analyze and visualize the behavior of LNG supply chain operations. The models encompass a variety of analytical tasks and levels of fidelity.

Despite these enhancements, existing models for Annual Development Plan fail to properly integrate each of the components, such as multiple production facilities, multiple storage facilities, multiple berths both in production and regas side, multiple LNG grades, multiple ships in varying capacities and fuel options, multiple contracts/delivery locations, mass balance calculations (production, inventory, and potential losses), full, partial and coloads, planned dry-dock schedules, ratability windows, complex delivery windows, and fiscal calculations. Accordingly, a need exists to integrate each of the components within a model that can optimize all variables simultaneously. In addition, conventional algorithms do not optimize real-sized problems in a time frame necessary for practical business purposes. In particular, what is needed is an algorithm and its extensions that optimize real-sized models in a reasonable time frame. Further, conventional methods consider all constraints to be equally important. Hence, for highly constrained systems, these methods may be unsuccessful in finding any solution due to their inherent inflexibility. As such, a need exists to be able to prioritize constraints such that some of them can be considered more important ("hard"), than others ("soft"). This will enable us to find solutions than can satisfy all hard (critical) constraints and minimize violation in the soft (less important) constraints. As a result, finding good solutions can become easier, with the possibility of improving economics at the expense of minor violations in the soft constraints.

Further still, none of the conventional models provide the ability to update the ship schedules based on operational disruption events, or on updated information that is different from the assumptions that were used for developing the plan. This type of functionality is useful in developing 90-day delivery schedules. Because the annual delivery schedules are negotiated between the LNG buyers and LNG sellers to best suit the interests of both parties, a need exists to develop updated ship schedules being able to re-optimize the schedules, such that the deviations from the initial plan can be minimized, in addition to maximizing economics.

SUMMARY

In one aspect, a computer implemented method for generating an optimized ship schedule to deliver liquefied natural gas (LNG) from one or more LNG liquefaction terminals to one or more LNG regasification terminals using a fleet of ships is described. The method comprising: obtaining input data on the LNG shipping operations; defining one or more objectives associated with the LNG shipping operations; defining one or more constraints, wherein at least one of the one or more constraints is configurable to be a hard constraint or a soft constraint (e.g., at least one constraint could be turned into soft constraint or turned into hard constraint as needed); determining one or more algorithms to optimize an LNG ship scheduling model; calculating optimal decisions with the one or more algorithms based on the one or more objectives, input data and one or more constraints; and using the output from the calculation to perform LNG shipping operations.

The calculating optimal decisions with the one or more algorithms may further include generating a feasible solution to a feasibility model, wherein the feasibility model is a based on the LNG ship scheduling model; and generating an optimal solution to the feasibility model; minimizing the in-chartered ships using an in-charter model, wherein the in-charter model is based on the LNG ship scheduling model; searching for out-charter opportunities using an out-charter model, wherein the out-charter model is based on the LNG ship scheduling model; computing optimal solution to an optimality model, wherein the optimality model is based on the LNG ship scheduling model.

The calculating optimal decisions with one or more algorithms may further include generating soft constraints, wherein the soft constraints may be applied to one or more models stated above; and minimizing violations with respect to soft constraints after generating optimal solution to the feasibility model or generating optimal solution to optimality model.

Further, a system for generating an optimized ship schedule to deliver liquefied natural gas (LNG) from one or more LNG liquefaction terminals to one or more LNG regasification terminals using a fleet of ships is described. The system comprising: a processor; an input device in communication with the processor and configured to receive input data associated with the LNG shipping operations; memory in communication with the processor, the memory having a set of instructions, wherein the set of instructions, when executed, are configured to: define one or more objectives associated with the LNG shipping operations; define one or more constraints, wherein at least one of the one or more constraints is configurable to be to be a hard constraint or a soft constraint; determine one or more algorithms to optimize an LNG ship scheduling model; calculate optimal decisions with the one or more algorithms based on the one or more objectives, input data and one or more constraints; and an output device that outputs the optimized ship schedule.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

Figure 1A:
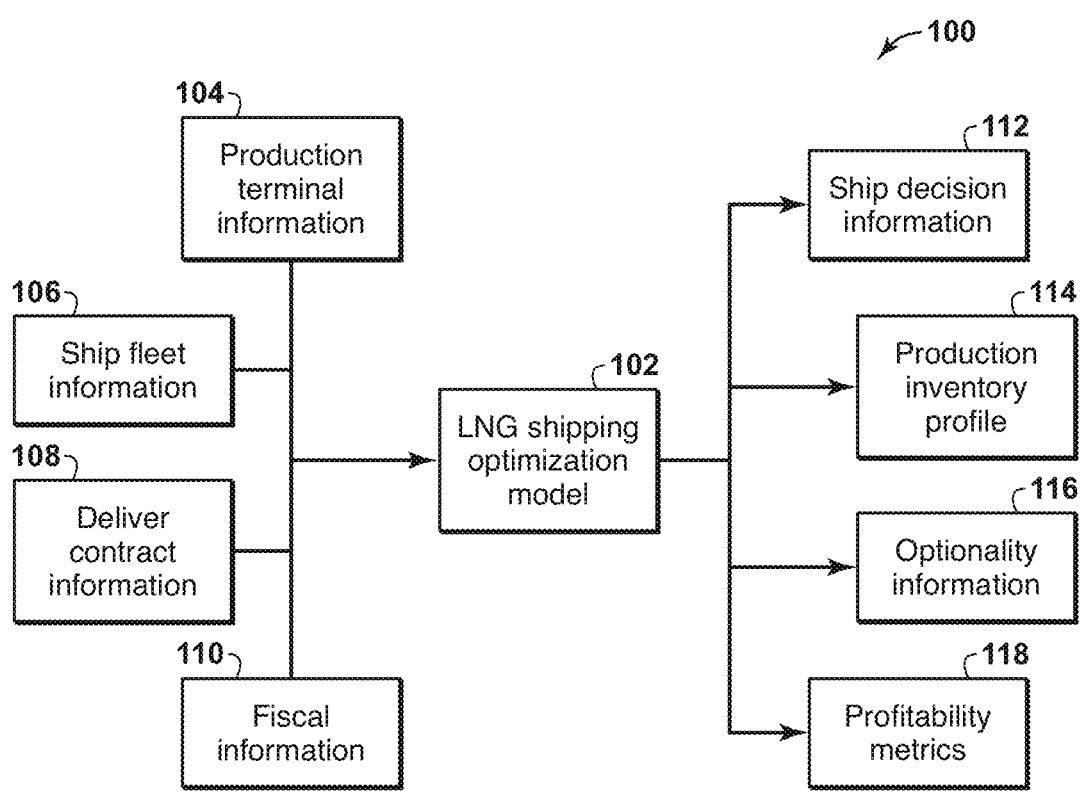
FIG. 1A is a block diagram of a LNG supply chain design optimization model.

To the extent the following description is specific to a particular embodiment or a particular use, this is intended to be illustrative only and is not to be construed as limiting the scope of the invention. On the contrary, it is intended to cover all alternatives, modifications, and equivalents that may be included within the spirit and scope of the invention.

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as generating, modeling, accepting, interfacing, running, outputting, evaluating, optimizing, performing, minimizing, maximizing, developing, determining, analyzing, identifying, representing, incorporating, entering, employing, displaying, using, integrating, simulating, valuating, valuing, validating, comparing, accounting for, prescribing, or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a non-transitory computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a non-transitory computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.)).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "exemplary" is used exclusively herein to mean "serving as an example, instance, or illustration." Any aspect described herein as "exemplary" is not necessarily to be construed as preferred or advantageous over other aspects.

As used herein, "hydrocarbon" includes any of the following: oil (often referred to as petroleum), natural gas in any form including liquefied natural gas (LNG), gas condensate, tar and bitumen.

As used herein, "machine-readable medium" refers to a non-transitory medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, EEPROM, or other memory chip or card, a memory stick, and other media from which a computer, a processor or other electronic device can read.

The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; or 6) seeking to maximize one or more factors in light of competing and/or cooperative interests in maximizing, minimizing, or otherwise controlling one or more other factors, etc.

As used herein, the term "production entity" or "production entities" refer to entities involved in a liquefaction project or regasification project.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

In general, LNG inventory routing problems (IRPs) have special characteristics that differentiate them from general maritime IRP's. Maritime IRP's in turn have special characteristics that distinguish them from vehicle routing problem (VRPs). The LNG IRP is based on a real-world application and shares the fundamental properties of a single product maritime IRP. However, the LNG IRP includes several variations including variable production and consumption rates, LNG specific contractual obligations, and berth constraints. Further, the LNG IRP seeks to generate schedules where each ship perform several voyages over a time horizon with both the number of voyages and the time horizon being considerably larger than those considered by a typical maritime IRP. As an example, LNG boils off during transportation and this boil-off can be used as fuel. Further, LNG involves long term delivery contracts where schedules for a year have to developed and then adhered to as closely as possible. In LNG shipping, the ships are typically fully loaded and fully discharged and the ships are owned/leased by shipper, which further complicate the economics related to taxes, royalties, etc.

The present techniques involve enhancements to systems and methods for ship schedule optimization. The present techniques involve integrating LNG ship schedule optimization and inventory management in an enhanced manner. As may be appreciated, various inputs, such as production schedule of different grades of LNG, inventory limitations, ship fleet details and ship-terminal compatibility, contract details including destinations, quantity, pricing, ratability requirements are integrated to enhance LNG shipping operations. As part of the LNG shipping optimization algorithm, several search routines may be utilized to optimize shipping decisions, e.g., which ship to deliver which cargo to a certain destination. Typically, the optimal solution is searched for a criterion such as maximizing social economics, minimizing shipping cost. Exemplary ship schedule optimization methods and systems are described in Intl. Patent Application Publication Nos. 2013/085688; 2013/085689; 2013/085690; 2013/085691; and 2013/085692, each of which is incorporated hereby by reference in their entirety.

As shown in FIG. 1A, an LNG optimization model 102 may obtain various inputs, such as production terminal information 104 (e.g., production schedule and/or infrastructure constraints), ship fleet information 106 (e.g., terminal compatibility, boil-off rates, fuel options, and/or degree of pooling), delivery contract information 108 (e.g., destination, annual quantity, ratability, pricing and/or optionality), and fiscal information 110 (e.g., tax and/or royalty structure). These inputs are used by the LNG shipping optimization model 102 to generate various outputs that are used in the LNG shipping operations. These outputs include shipping decision information 112 (e.g., ship schedule, optimal fleet size, fuel requirements, speed selection, maintenance schedule); terminal inventory profile 114 (e.g., amount of inventory for a given time period); optionality information 116 (e.g., diversions); and profitability metrics 118 (e.g., taxes, royalty, expenses, allocation of income, etc.).

As LNG projects include one or more LNG production or liquefaction terminals that supply LNG to multiple regasification terminals using a fleet of ships, the outputs of the LNG shipping optimization model 102 generates a schedule and associated plans for the LNG shipping operations. The outputs include an annual delivery plan (ADP) created to specify the LNG delivery schedule for the forthcoming planning period (e.g., year) for one or more customers. The ADP may be developed and agreed upon by the supplier and the various customers. In addition, one or more 90-day plans (e.g., delivery schedule that accounts for deviations in the existing business conditions from the forecasts used during the ADP development) is provided by the LNG shipping optimization model 102. This 90-day plan may be provided to one or more customers on a monthly basis through the year.

The present techniques involve enhancement to a method and system to develop annual delivery plans (ADPs) and some of which apply to developing 90-day schedules (90DS). Specifically, the system enables optimization of ship schedules, terminal inventory management, LNG production schedules, and maintenance schedules while accounting for tradeoffs related to various options in available shipping, customer requirements, price uncertainty, contract flexibility, market conditions, and the like. The system may provide the ability to optimize these decisions from several perspectives including minimizing costs, satisfying contractual obligations, maximizing profit, and the like.

The method and system includes specific workflows, which use various optimization models to provide enhanced ADP and 90-day plans. As an example, the system may include models and algorithms stored in memory, input data and output data stored in one or more databases, and a graphical user interface.

For ADP creation, the disclosed aspects and methodologies provide the capability to perform a number of valuation and validation analyses for the LNG supply chain incorporating options and opportunities. In particular, one or more embodiments may be include a system or method that enhances LNG ship scheduling modeling (e.g., ADP modeling), such that the LNG ship scheduling model is configured to (1) obtain input data associated with LNG shipping operations; (2) determine objectives for the LNG shipping operations; (3) define constraints for the optimization decisions, wherein the constraints include hard constraints and soft constraints; (4) determine one or more algorithms, wherein the algorithms include basic algorithms and along one or more extensions to handle soft constraints; (5) calculate optimal decisions using the one or more algorithms to maximize and/or minimize one or more objectives based on the input data, one or more soft constraint and one or more hard constraint; and (6) generate output data based on decision data. Then, the LNG ship schedule or updated ADP may be utilized to operate the LNG supply operations.

For the LNG ship scheduling (e.g. ADP), the data used in the modeling may include one or more of contract specification; production and re-gasification location specifications rates; ship specifications; ship compatibilities with contracts, production and re-gas terminals and/or berths; dry-dock requirements; storage tank requirements; berth specifications; berth and storage maintenance; loans and/or transfers of LNG among collocated joint ventures; LNG grades; optionality opportunities including in-charter, out-charter and/or diversion; price projections; and potential ship routes. The output data may include ship travel details (e.g., time, route, fuel, speed, "state" (e.g., warm or cold)); cargo size; LNG quality; storage-berth combination which a cargo is served; ship status as in-chartered or out-chartered; and planned dry-dock for the ship. The constraints may include one or more of ship travel restrictions based on arrival and departure times, speed, distance, loading/unloading operations; compatibility requirements between different parties, storage tanks, berths, contracts, cargo sizes; limits on loans between different parties; storage restrictions; berth utilization; contractual requirements (quantity, time); and/or maintenance requirements. The objectives may include one or more of maximize social interest; minimize shipping costs; maximize profitability; and/or maximize shareholder profitability (e.g., multiple different parties involved in operations).

The basic algorithms may include different algorithms that may be utilized in the system. As an example, the algorithms may be configured to be a five-stage method. The five stage method may include (i) stage 1: generating feasible solution to the feasibility model; (ii) stage 2: generating optimal solution to feasibility model; (iii) stage 3: reducing in-chartered ships; (iv) stage 4: pursuing out-charter opportunity; and (v) stage 5: finding optimal solution to optimality model. The feasibility model, in-charter model, out-charter model and optimality model is based on the LNG ship scheduling model or is a variant of the LNG ship scheduling model (e.g., an embodiment of the ADP model). These models are a less complex models that are computational more efficient than the LNG ship scheduling model.

The extensions configured to handle soft constraints may include a soft ratability constraint method and a soft inventory constraint method. The soft ratability constraint method may include different approaches, such as minimizing violations after stage 5 of the five-stage method and/or minimizing violations after stage 2 of the five-stage method. The soft inventory constraint method may also include different approaches, such as minimizing violations after stage 5 of the five-stage method and/or minimizing violations after stage 2 of the five-stage method.

Beneficially, the present techniques provide an annual development plan that integrates each of the components, such as multiple production facilities, multiple storage facilities, multiple berths both in production and regas side, multiple LNG grades, multiple ships in varying capacities and fuel options, multiple contracts/delivery locations, mass balance calculations (production, inventory, and potential losses), full, partial and co-loads, planned dry-dock schedules, ratability windows, complex delivery windows, and fiscal calculations. Further, the present techniques may be utilized to optimize real-sized problems in a time frame necessary for practical business purposes. The present techniques may be utilized to handle soft constraints that are effective in finding feasible solutions easier or improving economics. As another enhancement, the present techniques may provide updates to ship schedules based on operational disruption events, or on updated information that is different from the assumptions that were used for developing the plan, and/or on customer requests for delivery changes, and/or on new market opportunities. This functionality may be utilized to enhance the 90-day delivery schedules (e.g., the 90-day plan), schedule repair, and/or ADP negotiation. Also, the present techniques may be configured to re-optimize schedules such that the deviations from the initial plan can be minimized, in addition to maximizing economics.

Figure 1B:
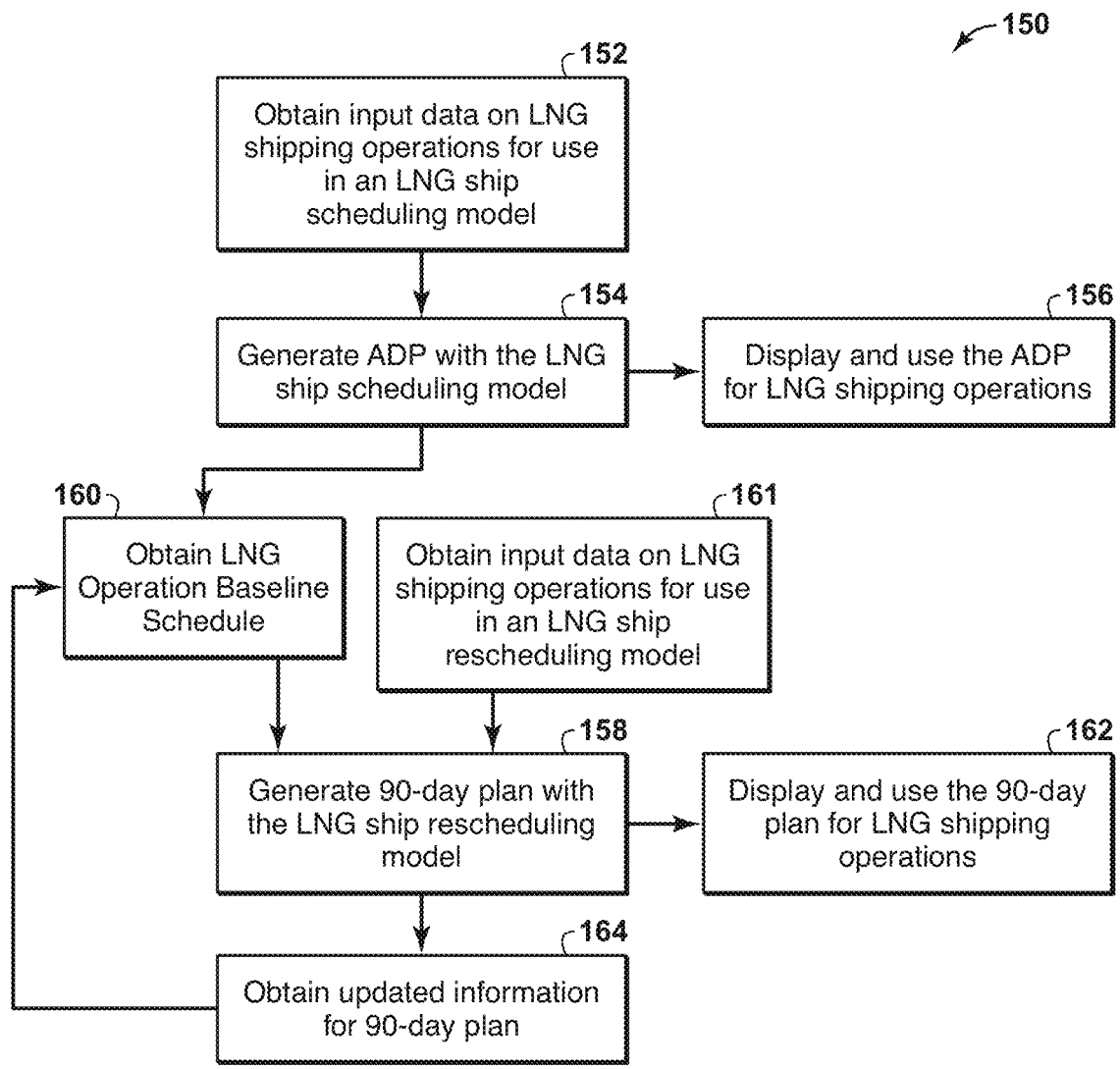
FIG. 1B is a flow chart of a LNG supply chain design optimization.

As an example, FIG. 1B is a flow chart 150 of a LNG supply chain design optimization. In this flow chart 150, the generation and use of the ADP is described in blocks 152 to 156, while the generation and use of the 90-day plan is described in blocks 158 to 164.

With regard to the LNG ship scheduling model (e.g., ADP model), input data on LNG shipping operations is obtained in block 152. This input data may include the input data described in blocks 104 to 110 of FIG. 1A. From this input data, an ADP may be generated from the LNG ship scheduling model, as shown in block 154. The generation of the LNG ship schedule model is described further below with reference to FIGS. 2A to 3 and 13. The ADP may be iterated through various versions based on changes and/or discussions with third parties. The ADP may be displayed and used for LNG shipping operations as shown in block 156. The display of the ADP may be via a computer display, and use may involve using the ADP for LNG shipping operations.

With regard to the LNG ship re-scheduling model (e.g., 90-day scheduling, schedule repair, ADP negotiation), input data on LNG shipping operations may be obtained in block 161. This input data may include the input data described in blocks 104 to 110 of FIG. 1A or other data, as noted further below. A baseline schedule may also be obtained in block 160. The baseline schedule can be user-defined based on the ADP produced by the LNG ship scheduling model, as discussed in block 154, or the updated plan produced by the LNG ship rescheduling model, as discussed in block 158. At block 158, a 90-day plan may be generated from the LNG ship re-scheduling model. The generation of the 90-day plan may include obtaining input data on LNG shipping operations, as discussed in block 161, and/or obtaining an LNG operation baseline schedule, as shown in block 160. The LNG ship rescheduling model is described further below with reference to FIGS. 4 to 13. The 90-day plan may be displayed and used for LNG shipping operations, as shown in block 162. The display of the 90-day plan may be via a computer display, and use may involve using the 90-day plan for LNG shipping operations. Further, as shown in block 164, updated information may be obtained. This updated information may be utilized to construct the baseline schedule for the next ship schedule updating. The present techniques are explained further below in FIGS. 2A to 13.

LNG Ship Scheduling Optimization Model

As noted above, the present techniques integrate LNG ship schedule optimization and inventory management. The LNG shipping optimization model uses various inputs, such as production schedule of different grades of LNG, inventory limitations, ship fleet details and ship-terminal compatibility, contract details including destinations, quantity, pricing, ratability requirements. Then, optimization algorithms are used to optimize shipping decisions (e.g., which ship to deliver which cargo to a certain destination). The output (e.g., decisions) is based on the optimal solution to an objective function, which may include maximizing social economics and/or minimizing shipping cost.

Figure 2A:
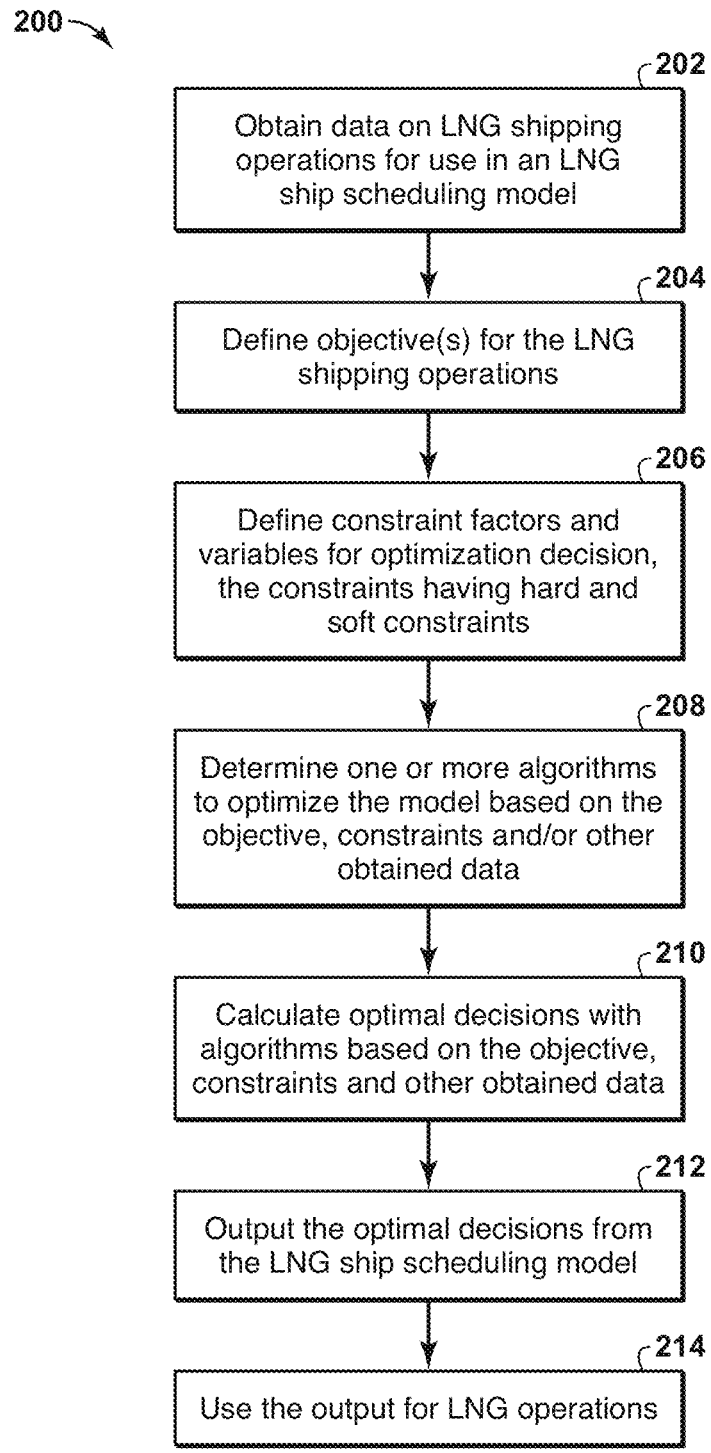
FIG. 2A is a flow chart of an LNG ship scheduling optimization method according to an exemplary embodiment of the present techniques.

FIG. 2A is a flow chart 200 of an ADP optimization method according to an exemplary embodiment of the present techniques. In this diagram 200, various steps may be performed to create an ADP based on an LNG ship scheduling model. At block 202, input data associated with LNG shipping operations is obtained to for use in a LNG ship scheduling model. The input data may include data associated with the long-term planning operations. In addition, the input data may be categorized as: production data at one or more liquefaction terminals, facility management data at production terminals, customer requests, customer terminal data, market conditions, contracts and/or shipping data. Production data may include data relating one or more of: the types or grades of LNG produced and their heat content; production rates of one or more types or grades of LNG; production unit maintenance schedules and associated flexibility in scheduling the maintenance. Facility management data may include data relating one or more of: the number of berths available for loading; storage capacity for each type or grade of LNG; connection between berth and storage unit; and berth maintenance schedules and their associated flexibility. Customer requests may include input data relating to one or more of the ratability of deliveries; the time window and cargo sizes for specific deliveries; the speeds that the ships should take; and the fuel modes that the ships should use. Customer terminal data may include input data relating to one or more of: storage capacities for each type or grade of LNG; the number of berths available for unloading; regasification rate schedules; and distances from each liquefaction terminal. Market conditions may include input data relating to one or more of: the outlook for index prices to be used in pricing formula; the outlook for future market opportunities such as spot sales; and futures and forward contract prices. Contracts may include input data relating to one or more of: terminals where LNG can be delivered; annual delivery targets for each customer terminal; ratability of delivery, which is the timing and spacing of delivery of portions of an agreed-upon amount of LNG; gas quality, type, or grade to be delivered; pricing formulas; diversion flexibility; and other types of flexibility such as downflex (an option whereby the buyer may request a decreased quantity of LNG). Contracts may also include input data relating to the length of contract to which one or more LNG customers are bound. For example, an LNG customer may be bound by a long-term contract, such as sales and purchase agreements or a production sharing contracts. Shipping data may include input data relating to one or more of: a list of leased DES (delivered ex ship), CIF (cost, insurance and freight), CFR (cost and freight) and available spot ships; a list of FOB (freight on board) ships for each customer, the ships typically being owned or leased by the customer; ship capacities; restrictions on what ship can load/unload at what terminal; maintenance schedules for ships; cost structures for ships; boil-off and heel calculations for each ship, including an optimal heel amount upon discharge at a regasification terminal; range of ship speeds and associated cost profile; and/or set of allowed fuels. Further, the input data may include one or more of contract specification; production and re-gasification location specifications rates; ship specifications; ship compatibilities with contracts, production and re-gas terminals and/or berths; dry-dock requirements; storage tank requirements; berth specifications; berth and storage maintenance; loans and/or transfers of LNG among co-located joint ventures; LNG grades; optionality opportunities including in-charter, out-charter and/or diversion; price projections; and potential ship routes.

At block 204, objectives for the LNG shipping operations are determined. The objectives may be determined by the user or system to provide certain outputs. The objectives may include one or more of maximize social interest; minimize shipping costs; maximize profitability; and/or maximize shareholder profitability (e.g., multiple different parties involved in operations).

Then, at block 206, constraints for the optimization decisions are defined. The constraints may include hard constraints and soft constraints. The constraints may include one or more of ship travel restrictions based on arrival and departure times, speed, distance, loading/unloading operations; compatibility requirements between different parties, storage tanks, berths, contracts, cargo sizes; limits on loans between different parties (e.g., JVs); storage restrictions; berth utilization; contractual requirements (quantity, time); and/or maintenance requirements.

At block 208, one or more algorithms are determined. The algorithms may include basic algorithms and along one or more extensions to handle soft constraints. The basic algorithms may include different algorithms that may be utilized in the system. As an example, the algorithms may be configured to be a five-stage method. The five stage method may include (i) stage 1: generating feasible solution to the feasibility model; (ii) stage 2: generating optimal solution to feasibility model; (iii) stage 3: reducing in-chartered ships; (iv) stage 4: pursuing out-charter opportunity; and (v) stage 5: finding optimal solution to optimality model.

Once the algorithms, constraints and objectives are determined, optimal decisions are calculated, as shown in block 210. The calculation of optimal decisions may include using the one or more algorithms to maximize and/or minimize one or more objectives based on the input data, one or more constraint that may be configurable as a soft or hard constraint (e.g., turned into a soft constraint or maintained as a hard constraint). This may be subject to a model including input data, one or more constraint that may be adjusted based on the various settings. The extensions is configured to handle soft constraints may include a soft ratability constraint method and a soft inventory constraint method. The soft ratability constraint method may include different approaches, such as minimizing violations after stage 5 of the five-stage method and/or minimizing violations after stage 2 of the five-stage method. The soft inventory constraint method may also include different approaches, such as minimizing violations after stage 5 of the five-stage method and/or minimizing violations after stage 2 of the five-stage method.

Once calculated, the optimal decisions are provided as output data, as shown in block 212. The output data may include ship travel details (e.g., time, route, fuel, speed, "state" (e.g., warm or cold)); cargo size; LNG quality; storage-berth combination which a cargo is served; ship status as in-chartered or out-chartered; and planned dry-dock for the ship.

Then, the output is utilized for LNG operations, as shown in block 214. The use of the output may include updating the ADP or other scheduling plan, adjusting may be utilized to operate the LNG supply operations. That is, the decision variables are used by the user to manage and/or adjust LNG shipping operations.

As noted above, the LNG ship scheduling model may include various types of input data, constraints, and/or objectives. The LNG ship scheduling model may be a mathematical model that involves a collection of independent decision variables, dependent (auxiliary) variables, and constraints specified by a data input instance. Decision variables may be manipulated by the solution algorithm toward the optimal value of an objective function (e.g. to find optimal decisions). The final solution is assumed to satisfy the associated constraints and/or limits.

As an example, the LNG ship scheduling model may include an initial state of the inventories, availability of ships, projected production profiles, contractual requirements, such as target quantity and/or quality; and schedules cargos in varying sizes to ships such that an objective, such as social economics, is optimized. The LNG ship scheduling model can be used for generating an initial annual delivery plan (ADP). In addition, the model can be used to analyze the impact of various business decisions to the bottom-line economics. One specific example may involve reviewing the impact of speeding up (or down) the entire or a part of the fleet and also determining whether to out-charter or in-charter a ship.

As this is a mathematical model, input data for the LNG ship scheduling model includes a wide range of data types. Some or all of this data may be required for a specific instance. This section presents all the input data and provides further explanation for certain sections. As an example, the time horizon may be one of the input data types. The time horizon may include the start date of the planning horizon; length and duration (e.g., a one year period, but it may involve shorter and/or longer periods); time discretization, which is the smallest unit of time that specifies the frequency of decisions (e.g., 2 days, 1 day, and ½ day). The time discretization is useful because the time calculations are based on discrete units of time. Fine discretization of time increases the complexity of the calculations by increasing the size and volume of computations, while course discretization may not provide realistic schedules as it is a simplified view of the problem. The time discretization is assumed to uniform throughout the planning horizon.

Due to the time discretization, rounding of various time-based data may be performed. The rounding rules employed may involve an internal parameter, such as X. Any time-based parameter or data may be rounded down to the nearest integer number of time units, if the fraction is less than or equal to X, and rounded up to the next largest integer number of time units, if fraction is greater than X. As a specific example, if X is equal (=) to 0.3 with discrete time units of one day, then a value of 1.25 days is rounded down to 1 day and 4.6 days is rounded up to 5 days. Further, some data may be the sum of multiple data entries (e.g., input data) and then the sum is rounded up or down. As such, for the discrete time units greater than a day, the data may be aggregated. For discrete time units less than a day, daily data will be divided evenly. Price data is simply multiplied or reduced based on time granularity (e.g. half day units have same price where price is given daily). Further, to accommodate multi-time period operations, such as loading and unloading, the quantity loaded or unloaded per day may involve an approximation. The load or unload quantity may be spread out evenly across the number of time units associated with loading and/or unloading and post-loading and/or unloading activities. Time unit rounding rules may be used to calculate that number of time units.

Another data type that may be utilized with the LNG ship scheduling model is ship specification data. The ship specification data may be associated with each ship in the fleet. The ship specification data may include ship type; owner; capacity; cargo sizes; fuel options; fuel (diesel) usage; daily boil-off rates; minimum SSD MCR coefficient; minimum DFD MCR coefficient; heel volume; fuel usage at port and canal; speed; fixed cost; available time windows; start location and state, end location and state; out-charter option; cool-down time (e.g., cool-down time from warm and/or cool-down time from dry); and/or cool down loss from warm; cool down loss from dry.

The ship specification data may include information about the ships' operation. This data may include classifications, such as conventional, QFLEX, QMAX). The owner may include a designation whether the ship is joint venture ship (JV), which is referred to as DES, and if it is a customer ship, it is referred to as FOB. The capacity may include maximum volume of LNG that a ship can carry and/or ability to load any quality and/or grade of LNG. The cargo sizes may include discrete set of loading sizes for ships, which may not necessarily be used in all variants of the LNG ship scheduling model, or more specifically an ADP model.

Another type of ship specification data is the fuel options. The fuel options may include an indication that ships can operate using different fuels. Further, as LNG is carried in very low temperatures, some of the LNG evaporates (i.e. boil-off) during the travel. This is a result of the heat difference between the tank and outside and associated efficiencies for the storage. Accordingly, some ships may use this boil-off gas as fuel. This makes the fuel options and boil-off rates related to each other. The fuel options may include this input to specify which fuel options are compatible with each ship. For example, the input may be specified as NBO (natural boil-off) and diesel (e.g., uses the boil-off from LNG tank as fuel in addition to the diesel fuel); NBO and forced boil-off (FBO) (e.g., uses natural and forced boil-off as fuel); slow steam diesel (SSD) with re-liquefaction (e.g., uses only diesel and liquefies the boil-off therefore there is no loss due to boil-off); and/or gas combustion unit (GCU) (e.g., uses only diesel, re-liquefaction is turned-off).

Another type of ship specification data may include other fuel related data types. For example, the fuel (diesel) usage may include a cubic function of speed, wherein its coefficients are provided or specified by the ship manufacturer. The daily boil-off rates may depends on ship, voyage leg (loaded and/or ballast), speed, fuel selection. The minimum slow steam diesel (SSD) maximum continuous rating (MCR) coefficient is the minimum MCR coefficient for SSD and steaming ships for calculating fuel use based on speed. The minimum DFD MCR coefficient is the minimum MCR coefficient for DFD ships for calculating fuel use based on speed. The heel volume involves the ship's requirement of a small amount of gas left in the tank in the ballast leg of a ship's trip to keep the tank cool by natural evaporation. Ships are assumed to arrive at a production terminal in cold state. Fuel usage at port and canal is the ship's use of some fuel while they are not travelling. An average daily fuel consumption rate is assumed.

The ship specification data may also include ship operation data. For example, the speed may include the ship's speed, which is assumed to travel with one of three average speeds (e.g., minimum, maximum, and nominal). This type of discretization is useful to formulate the LNG ship scheduling model using a time-space network. The travel times are assumed to be identical during the entire year for this aspect. The LNG ship scheduling model can also accommodate speed changes based on seasonal variations, if preferred. As specific example, the LNG ship scheduling model may include MCR at a base speed, which is the maximum continuous rate at base speed. The fixed cost may include the fixed daily cost incurred for each DES ship. This part of the shipping cost is fixed, while the fuel cost depends on the distance and speed. Also, the available time windows are the time period that the ship is assumed to be available. The unavailability due to dry-dock may be handled separately. The start location and state, end location and state are initial conditions that are set for a ship based on last year's expected final situation and business expectations for next year. The out-charter option may specify if a DES ship can be considered for a potential out charter opportunity.

Further, the ship specification data may include additional ship operation data. For example, the cool-down time is the time needed for the ship to be cooled down before loading operation. The cool-down time from warm is the time spent when the ship arrives to production without any heel. The cool-down time from dry is the time that is spent when a ship arrives to production from dry-dock. These can be ship, berth, or port specific. Also, the cool down loss from warm may include energy cost to cool ship from warm and cool down loss from dry which is energy cost to cool ship from dry.

As an example of the ship specification data, the following table describes the comparison of boil-off ship and reliquefaction ship, as shown in Table 1. Table 1 summarizes the fuel, boil-off and heel related information, which is shown below:

TABLE 1

| | Boil-Off Ship | Reliquefaction Ship |
|---|---|---|
| LNG →Regas | (NBO + FBO) vs. (NBO + Fuel Oil) | Reliq vs. GCU (i.e. burn) |
| Regas →LNG Cold | (NBO + FBO) vs. (NBO + Fuel Oil) | Reliq vs. GCU (i.e. burn) |
| Regas →LNG Warm | Fuel Oil (heel out) | Fuel Oil (heel out) |

As shown in this Table 1, the LNG ship scheduling model may include constraints that capture the relationship between speed, fuel usage, boil-off, and voyage leg for each ship.

Further still, the input data may include other specifications, such as production and regasification specifications and dry-dock specifications. For example, the production and regasification specifications may include locations, compatibility with each vessel and/or port fees. The dry-dock specifications may include planned maintenance (e.g., each ship needs to be regularly maintained). The planned maintenance window may be included in the input data, which may include the following specifications of locations, compatibility with each vessel (e.g., dry-dock location; earliest and/or latest start date, duration, and/or exit status (e.g., cold, warm, dry, and the like)).

Another input data type may include storage tanks located in production and regasification side; berths and storage and berth compatibility. The storage tanks located in production and re-gasification side may include location, capacity, initial inventory and/or grade. The grade may include storage units at production terminals may only accept a single quality of LNG, while the initial inventory is the amount of LNG available in the beginning of planning horizon. The storage unit may be shared by various parties. For example, in a joint venture (JV) setting, each party of the JV may send produced LNG to multiple storage units. These specifications have to comply with the compatibility between the joint venture agreement and storage unit. The berths may include location; berthing/de-berthing time (e.g., amount of time a ship takes for these operations); and/or load/unload rates (e.g., this rate affects the time it takes to complete loading or unloading operations). The rates and times may vary based on ship and location. The loading and/or unloading operation(s) may be performed at a single berth. The LNG ship scheduling model may or may not consider berth limits at re-gasification terminals because a producer has limited visibility or control of operations at re-gasification terminals. The storage and berth compatibility may involve specifying storage tanks that can transfer LNG to specific berths. This is typically bound by the available infrastructure of the LNG facility. For regas operations, the LNG ship scheduling model may be used for managing inventory for approximating ratability, actual control, simulating customer behavior.

The input data type may also include specific LNG information. For example, the input data may include loans and/or transfers of LNG among co-located third parties (e.g., JVs). The loans and/or transfers of LNG among co-located third parties may include third party supplier and storage unit; destination third party (e.g., JV) and storage unit; quantity and quality of LNG; transfer rate, daily max loan and/or maximum net; and/or time and/or date of transaction. Transfers may be assumed to finalize instantaneously within a storage unit. Between separate storage units, transfer time may be based on a rate limit between units. Transfers should be of the same quality and/or grade. The balance should be restored by the end of the time horizon and no cost or fees are assumed for the transfers and loans. Also, production and regasification rates are another input data type. This data type may include daily projections of LNG production of multiple third parties, allocation of a third parties production to a storage unit; and/or daily projections of re-gasification of customers. The daily production and re-gas rate forecasts are provided as input data. Production changes due to planned maintenance can be adjusted in the input data. Moreover, another input data type may include LNG grades. The LNG grades may include energy content: typically specified as energy quantity per volume; boil-off equivalent: coefficient to calculate boil off fuel energy equivalence to fuel oil amount; and/or density.

As another input data type, contractual data may be used in the LNG ship scheduling model. The contractual data may include contract name; third party involved in the agreement (e.g., JVs, which may include single JV customer or multiple location assignment per contract); customer, location, type (e.g., DES/FOB), minimum (min), target, and/or maximum (max) delivery quantities, start and/or end date of annual delivery window, minimum and/or maximum energy content of delivered cargos; and/or ratability specifications (e.g., monthly, quarterly, etc.). The ratability time windows may be inclusive of deliveries within the time range. These may include start date (e.g., beginning of ratability period); end date (e.g., end of ratability period); minimum quantity (e.g., minimum quantity in period); target quantity (e.g., target quantity in ratability period); and/or maximum quantity (e.g., maximum quantity in ratability period).

The contractual data may also include various other contractual terms, such as fuel compatibility; whether or not an in-charter ship may deliver one or more cargos for contract; whether or not vessels may return back to supply location warm or cold; maximum additional spot sale; diversion notification time; maximum divertible quantity; replacement penalty; and/or compatible cargo sizes for each contract. The fuel compatibility may specify if ships serving a contract may use a specific fuel type. The maximum additional spot sale may include the maximum amount of spot sales (e.g. due to overproduction) that may be delivered to a contract. The diversion notification time may include a notification requirement for scheduling a diversion. The max divertible quantity may include the maximum quantity that may be diverted from contract. The replacement penalty may include a fee paid to buyer for diverted quantity. The compatible cargo sizes for each contract may specify the cargo sizes that may be utilized in the LNG ship scheduling model. Further, a contract can have multiple delivery windows, which may or may not overlap and each cargo can have varying grades of LNG.

As yet another type of input data, time windows and maintenance data may be used by the LNG ship scheduling model. For each time window, the delivery location, start date, end date, minimum cargoes (e.g., minimum number of deliveries), maximum cargoes (e.g., maximum number of deliveries), minimum quantity (e.g., minimum LNG to be delivered within time span), maximum quantity (e.g., maximum LNG to be delivered within time span) and/or compatible cargo sizes for each time window. The maintenance data may include berth and storage maintenance that may be handled by setting berth and storage availability in the LNG ship scheduling model.

The data input may also include optionality opportunities. The optionality opportunities may include in-charter, out-charter and/or short term diversion. The in-charter may include a list of ships available for in-chartering. For the in-charter ships, the data may include ship specifications; daily costs; available time window; type (e.g., one way—paid only for one way voyage and fees, round trip—paid for roundtrip voyage, and/or long term—paid for long time period without specific voyage info); positioning (e.g., whether or not positioning fee is required and paid); positioning lump sum for fee for positioning; repositioning, whether or not re-positioning is required and paid; re-positioning lump sum if fee for re-positioning is required; fixed cost (e.g., general fixed costs); and/or daily rate if a daily rate is charged. The out-charter may include a list of opportunities for out-chartering. The out-charter data may include required ship specifications; revenue; required time window; ship class (e.g., ship class required for out-charter); opportunity type (e.g., one way that is paid only for one way voyage and fees; round trip that is paid for roundtrip voyage; and/or long term that is paid for long time period without specific voyage information); required location (e.g., location to send ship for out-charter, such as first location in one way or roundtrip); required date, which is the date to send ship; required state, which is the state of ship to arrive at location; completion location, which is the location of ship when finished, such as the last location in one way or roundtrip); completion date that is the date the ship is finished and at location; end state, which is the state of ship when returning; positioning (e.g., whether or not positioning fee is required and paid); position lump sum (e.g., fee for positioning); re-positioning, which is a determination whether or not re-positioning is required and paid; re-positioning lump sum, which is the fee for re-positioning; fixed cost, which is the general fixed costs; and/or daily rate, which is the daily rate charged. The short term diversion may include required quantity and/or quality; time range; and/or price.

As an example of the optionality opportunity data, the following table describes the comparison of in-charter between incoming voyage, returning voyage, intermediate voyages and number of deliveries, as shown in Table 2. Table 2 summarizes the type and voyage details for in-charters, which is shown below:

TABLE 2

| Type | Incoming Voyage | Returning Voyage | Intermediate Voyages | Number of Deliveries |
|---|---|---|---|---|
| OneWay | FixedCost + PosLumpSum | 0 | DailyRate × numDays | 1 |
| RoundTrip | FixedCost + PosLumpSum | RePosLumpSum | DailyRate × numDays | 1 |
| LongTerm | FixedCost + PosLumpSum | RePosLumpSum | DailyRate × numDays | multiple | where FixedCost is the fixed cost, PosLumpSum is the positioning lump sum amount, RePosLumpSum is the re-positioning lump sum amount, numDays is the number of days.

Price data is yet another input data type. The price data may include price projections for each day or other time period. The price data may include market index, which is the list of market indices for which to assign market pricing; fuel, which is the list of production locations for which to assign fuel price; spot, which is the list of re-gasification terminals for which to assign spot pricing; and/or contract, which is the list of contracts for which to assign contract pricing. The prices are assumed to be adjusted (e.g., rolling average, or other suitable method) such that price on the day delivered (DES) or picked up (FOB) is the price expected to be received for revenue and royalty calculations, or cost of fuel on a day for cost calculations. The fuel price may be independent of location and/or region.

Route data is another input data type. The route data may include the nautical distance between production, re-gas, and/or dry-dock locations based on various routes (e.g., both ways). The route data may also include determining whether or not there is a delay due to canal on a route and/or the cost of transit from canal. The route data may also include determining whether or not there is a delay due to bunkering on a route, and/or bunker fee. Bunkering is assumed to occur on return voyages to production locations.

Complex time windows are yet another input data type. Some complex deliveries may involve more than single seller, port, and/or buyer. For such situations, the LNG ship scheduling model may include input data that represents the business needs. For example, the complex time windows may include various data to model the business needs. This data may include contract ID1 (e.g., contract for delivery part one); location 1 (e.g., re-gasification location for delivery part one); cargo size 1 (e.g., size of delivery part one); LNG grade1 (e.g., LNG energy quality for delivery part one); earliest start date1 (e.g., earliest date for complex delivery part one); latest end date 1 (e.g., last date for complex delivery part one); contract ID2 (e.g., contract for delivery part two); location 2 (e.g., re-gasification location for delivery part two); cargo size 2 (e.g., size of delivery part two); LNG grade2 (e.g., LNG energy quality for delivery part two); earliest start date 2 (e.g., earliest date for complex delivery part two); latest end date 2 (e.g., last date for complex delivery part two); minimum deliveries (e.g., minimum number of complex deliveries, such as split and/or co-load, in a time window); maximum deliveries (e.g., maximum number of complex deliveries, such as split and/or co-load, in time window); and/or fiscal relationship. The fiscal relationship may include the fiscal rules that specify tax rate, profit fraction, royalty rate for each delivery. Each contract can have complex relationships, correlations across deliveries.

Following table, Table 3, summarizes some of such complex deliveries.

TABLE 3

| Delivery Pattern | Number of JVs/Sellers | Number of Discharge Ports | Number of SPAs/Buyers |
|---|---|---|---|
| Default | 1 | 1 | 1 |
| Simple split | 1 | Multiple | 1 |
| Co-load | 1 | 1 | Multiple |
| Co-load with split | 1 | Multiple | Multiple |
| Complex Co-load | Multiple | 1 | Multiple |
| Complex Co-load with split | Multiple | Multiple | Multiple |

In this Table 3, combinations of settings for complex windows. For example, one or more JVs and/or one or more contractors may be involved with one or more locations.

In addition to the input data, different variables may be utilized by the LNG ship scheduling model as well. For example, variables can be classified as two types: decision variables and dependent (auxiliary) variables. Decision variables are the variables that the optimization algorithms are manipulating to achieve a desirable objective value. Decision variables specify activities of each ship within the entire time horizon. For example, the decision variables may include arrival date to production or re-gas locations; departure date and/or time from production/re-gas locations; size of assigned cargo size at each trip and associated LNG quality; storage-berth combination which a cargo is served; travel route; fuel type in each leg of a trip; speed in each leg of a trip; departure "state" from regas port (e.g., warm versus cold); whether a ship is in-chartered or out-chartered for a certain period; and/or whether a ship goes to dry-dock on a certain day. The dependent (auxiliary) variables are dependent on the value of the data input and decision variables. For example, the dependent variables may include storage levels at production and re-gas terminals at each point in time.

Further, constraints may be used by the LNG ship scheduling model to force the decisions to comply with some business or physical requirements. In the LNG ship scheduling model, constraints should satisfy a feasible solution. As will be explained further below, some of these constraints can be considered as soft constraints, which may be able to slightly violate the constraint, while hard constraints are more rigid.

Certain constraints are related to the input data noted above. For example, constraints may include compatibility requirements between JV and storage tanks; compatibility requirements between storage tanks and berth to ensure loading a single grade to a ship; compatibility requirements between contracts and fuel options and/or third party (e.g., JV) transfers being limited to not exceed a daily maximum amount and maximum net amount. Other constraints may be included in the LNG ship scheduling model as specific constraints. For example, constraints may include setting arrival and departure timing of vessels to feasible time periods based on speed, distance, loading/unloading operations; inventory mass balance at production and regasification storage units being set to a value greater than or equal to zero; inventory is maintained under storage capacity (e.g., relaxed in soft constraints extension); loans between JV's have to be balanced by the end of the time horizon; cargo size has to be less than vessel capacity; berths can be utilized by only one vessel at a time; total delivery amount and/or quality has to be acceptable based on contractual requirements; deliveries have to be performed within the delivery time windows (e.g., quantity and time window); deliveries follow ratability windows; and/or vessels have to be maintained within necessary time windows.

The input data and constraints are utilized based on one or more objectives. That is, one or more optimization algorithm may be utilized to manipulate the decision variables to maximize or minimize one of these potential objective functions (e.g., the value determination for an objective). The objective functions may include maximizing social interest; minimize shipping costs, maximizing joint venture profitability, maximizing IOC shareholder profitability and/or maximizing NOC interest, for example. The maximizing social interest may be the difference between overall revenue coming from deliveries and shipping costs due to fixed, fuel, canal, and bunker costs. The minimizing shipping costs may be the shipping cost is based on fixed, fuel, canal, and/or bunker costs. The maximizing joint venture profitability (e.g., single JV case) may include maximizing profit of a single JV, which may apply if there are multiple JV's. The maximize IOC shareholder profitability (e.g., multiple JV case) may include maximizing profit of an IOC partnering with multiple JV's. The maximizing NOC interest (e.g., multiple JV case) may include maximizing interests of an NOC having shares in multiple JV's With the objectives, one or more algorithms may be used in the LNG ship scheduling model to provide the optimal decision variables. The algorithm uses several models derived from the optimality model, which is a variation of the LNG ship scheduling model. The optimality model contains the variables, constraints and objective function which may be one of several alternatives, such as maximization of social economics and/or minimization of shipping cost. The LNG ship scheduling model and all derived models may be mixed-integer linear models. Details of other models are provided further below.

The feasibility model is a relaxation of the optimality model. It includes various features, such as objective function which minimizes total penalty due to infeasibilities. The infeasibilities may include slacks, such as daily loss production, daily stock-out, violation of lower bound of contractual requirements, and/or violation of lower bound of time windows requirements.

Another model is the in-charter model. The in-charter model is similar to the optimality model except the objective function. This model includes features, such as objective function that minimizes cargos delivered by in-chartered ships. It may include all variables and constraints of optimality model.

The out-charter model is yet another model. The out-charter model is similar to the optimality model except the objective function. This model includes features, such as objective function which minimizes the total number of cargos that a specific ship delivers. It may include all variables and constraints of optimality model.

The minimize-ratability-violation (MRV) model is a model similar to the feasibility model except the objective function and some additional constraints. The objective function minimizes the violations due to ratability constraints. Model includes an additional constraint to limit the deterioration in optimal objective value such as social economics.

Figure 2B:
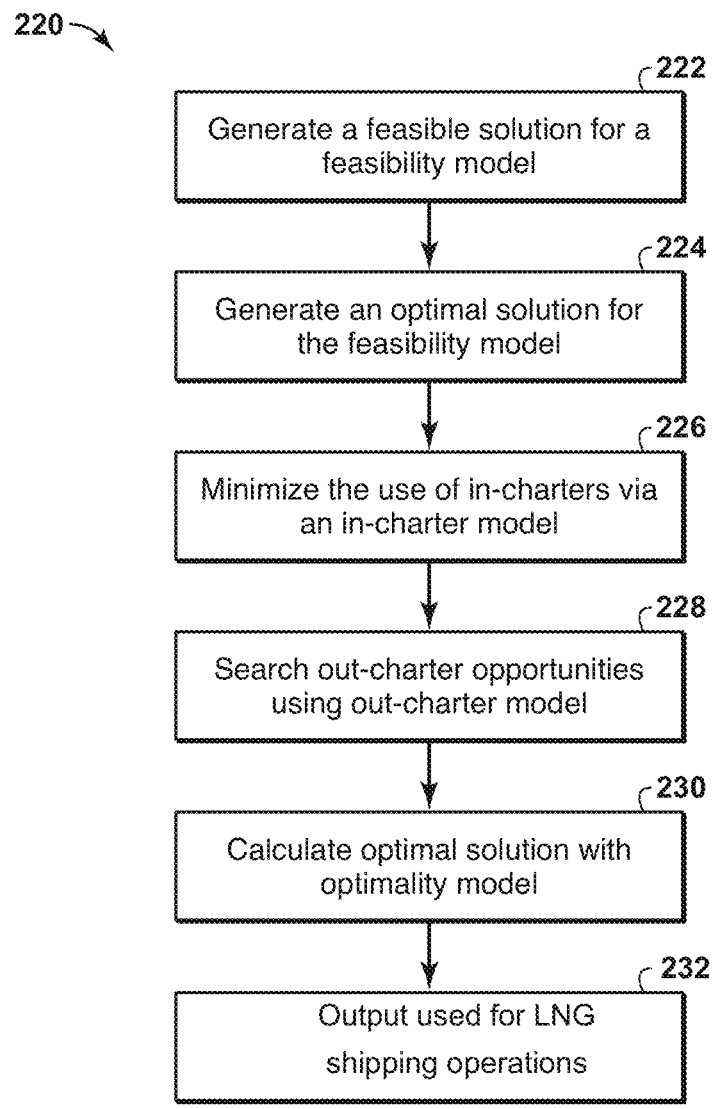
FIG. 2B is a flow chart of the five stage algorithm method for the LNG ship scheduling model according to an exemplary embodiment of the present techniques.

As noted above, the algorithm may include five stages. FIG. 2B is a flow chart 220 of the five stage algorithm method according to an exemplary embodiment of the present techniques. In this diagram 220, various stages may be performed to enhance the LNG ship scheduling model. In stage 1, as shown in block 222, a feasible solution is generated using feasibility model. In stage 2, as shown in block 224, an optimal solution is generated for the feasibility model. The optimal solution has no violation and therefore it is also feasible to the optimality model. In stage 3, as shown in block 226, utilization of in-chartered ships are minimized using in-charter model. In stage 4, as shown in block 228, potential out-charter opportunities are searched using out-charter model. In stage 5, as shown in block 230, an optimal solution is searched for the optimality model. The output of these algorithms is used to perform LNG shipping operations, as shown in block 232.

The stages 3, 4, and 5 may follow the described order or may be rearranged into a different order to emphasize a different aspect of optimal solution. For example, if outchartering is more beneficial than lessening in-chartering, then stage 4 may be performed before stage 3. These various stages are further described below.

In stage 1, as noted in block 222, a feasible solution is generated to the feasibility model. The feasibility model is initialized and then solved by a rolling time algorithm. The rolling time algorithm breaks the entire time horizon into a sequence of smaller, but overlapping time blocks, and solves each smaller problem sequentially. A feasible solution is constructed by solving a sequence of optimization sub problems, each of which corresponds to smaller time block. The rolling time algorithm is shown further in FIG. 3.

Figure 3:
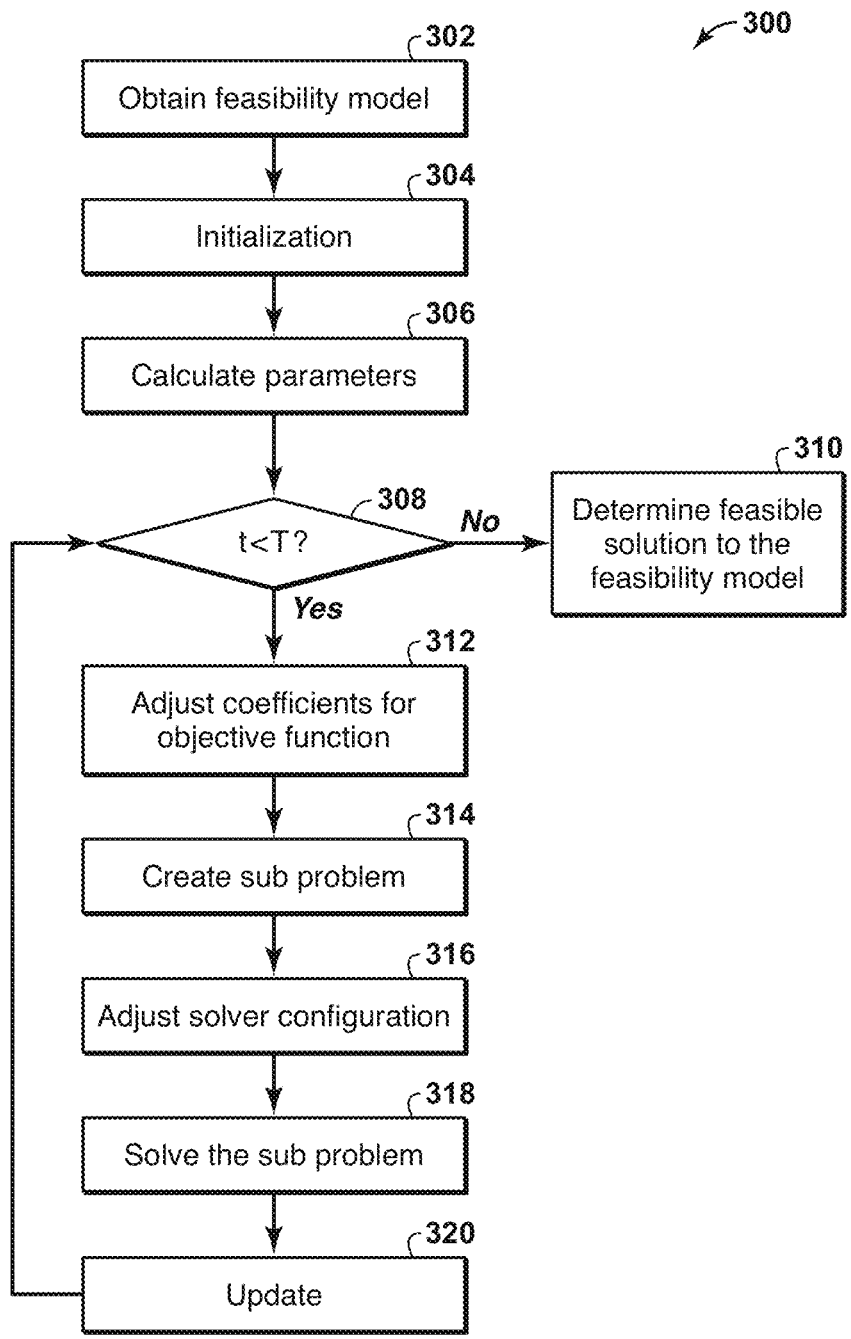
FIG. 3 is flow chart of a rolling time algorithm according to an exemplary embodiment of the present techniques.

FIG. 3 is flow chart 300 of a rolling time algorithm according to an exemplary embodiment of the present techniques. In this flow chart 300, a feasibility model is obtained in block 302. The model variables are initialized in block 304.

Then, at block 306, the parameters to construct sub-problems may be determined based on the difficulty of the problem. These parameters may include the total number of time periods that are to be solved in each sub problem, and the total number of time periods during which the schedule are fixed after a sub problem is solved.

Once the parameters are calculated, sub-problems may be constructed and solved iteratively starting from the beginning of the planning horizon to the end of the planning horizon. For each iteration, a determination is made whether the current starting time period of the sub-problem t is less than T, as shown in block 308. If t exceeds T (e.g., number of time periods in the planning horizon, such as 365 days), then ship deliver); schedules have been made for all time periods in the planning horizon, and a feasible solution to the feasibility model is obtained, as shown in block 310.

However, if t is less than T (e.g., number of time periods in the planning horizon, such as 365 days), the process may be continued by constructing a sub-problem whose objective function coefficients are adjusted in block 312. The adjustment of the objective function coefficients may be performed to achieve a reasonable scaling for violations. For example, the scaling may include penalty rate for cargo violation of 250; penalty rate for quantity violation of 4; and penalty rate for volume violation on time t. Then, the penalty rates may be adjusted during the algorithm.

Once the objective function coefficients are adjusted, sub problem may be created, as shown in block 314. The sub problem is created by populating variables, parameters and constraints. Then in block 316, the solver configuration may be adjusted. The solver adjustment may include, but are not limited to, node limits, time limits and optimality tolerance. At block 318, the sub problem is solved. The solving the sub problem may include using different stopping criteria based on the distance between the current time periods and the end of the time horizon.

Once the sub problem is solved, problem settings may be updated, including the ship schedules for some specific time periods, and the starting time period of the next potential sub-problem, as shown in block 320. Then, the update is provided to block 308 to determine whether the process should be reiterated or the feasible solution to the feasibility model is determined, as shown in block 310.

In stage 2, the optimal solution to feasibility model is generated. This may involve the algorithm performing a sequence of local searches until the objective function value of the feasibility model reaches zero. The sequence of local searches may include two rounds. During the first round, one-direction search, k-day-flexibility-time-window search, sorted one-ship search and sorted two-ship search are performed sequentially. If the objective function value is positive after the first round, it may be the result of the local search getting stuck in a local optimal solution or infeasibility of the optimality model. In case the algorithm cannot find a solution with zero infeasibility in the first round, a second round is performed. The second round may include performing a time-window search, sorted one-ship search and sorted two-ship search. If the objective function value is still positive, it is very likely that the optimality problem is infeasible.

As noted above, the local searches here may include a one-direction search, a k-day-flexibility-time-window search, a sorted one-ship search, a sorted two-ship search, and a time-window search. The one-direction search may include solving feasibility sub-problems iteratively in which, loading and unloading arcs are fixed to their current values alternatively while all other arcs are left as free variables. The algorithm is terminated when the objective function value reaches zero or cannot be improved after a specified number of iterations (e.g., number of sub-problems may be created in this neighborhood structure). The k-day-flexibility-time-window search may also be performed. For this search, each ship is given flexibility to leave several days earlier or later for a given existing schedule. The number of days that each ship is allowed to advance or delay may take various values. A typical value used in practice is one day. In the network traveling and waiting arcs for each ship within search time window are left as free variables while all other arcs are fixed to their current value. The algorithm optimizes feasibility model for each ship and the algorithm is terminated when the objective function value reaches zero or cannot be improved. The sorted one-ship search may also be performed. For this search, the schedule for each ship is optimized while schedules for other ships are fixed to a given existing schedule. In the network, the arcs related to one ship are set free while others are fixed to their current values. The algorithm optimizes feasibility model and is terminated when the objective function value reaches zero or cannot be improved after a specified number of iterations (e.g., the total number of ships). The sequence of ships to optimize depends on the solution quality associated with each ship. Typically, higher level of violation a ship has in its schedule; there is more chance to improve its schedule. Therefore, the ships are sorted according to their violation degree in non-increasing order at the beginning of the algorithm. After each round of local search, the order of ships is updated based on the new schedule. The sorted two-ship search may also be performed. For the sorted two-ship search, schedules for two ships are optimized simultaneously, while schedules for other ships are fixed to a given existing schedule. In the network, arcs for two ships are left as free variables while all other arcs are fixed to their current values. The algorithm optimizes feasibility model and is terminated when the objective function value reaches zero or cannot be improved after a specified number of iterations (e.g., the total number of ship pairs). Similar as the one-ship search, the ship pairs are prioritized in non-increasing order based on the total violation. After each round of local search, the order of pairs is updated based on the new schedule. The time-window search may also be performed. Time-window search in this stage is similar to the rolling time window search in stage 1. This search may optimize all ship schedules for shorter time blocks sequentially, while fixing the schedule outside of the time block. The parameters may also be defined to determine the number of periods solved in a sub-problem and the number of time periods where the ship schedule will be fixed. The algorithm optimizes feasibility model and is terminated when the objective function value reaches zero or cannot be improved after a specified number of iterations (e.g., the total number of time windows which can be constructed during one planning horizon).

In stage 3, the in-chartered ships may be reduced. Reducing the usage of in-chartered ships may have a beneficial impact on the economics. This stage of the algorithm seeks potential improvements in the solution be reducing in-chartered ships, while maintaining the delivery plans within acceptable limits. This stage minimizes the usage of in-chartered ships one by one, each of which is accomplished in three steps. The first step involves the selection of the next in-chartered ship which is more likely to be idled compared to other in-charters. In this step, all in-chartered ships may be sorted based on the number of cargos that it carries. The in-chartered ship that carries the fewest cargos may be selected because it may be easier to idle such a ship by switching fewer cargos to other ships. The second step tries to use sorted two-ships local searches to totally idle the selected in-chartered ship by shifting/swapping cargos. Similar to the operation in stage 2, schedules for two ships, the selected in-charter and another ship that may take over cargos from the selected in-chartered ship are optimized simultaneously, while maintaining other ships fixed. The only difference from the step in stage 2 and this step is that the in-charter model is used where the objective is to minimize the number of cargos that the selected in-chartered ship carries. The algorithm optimizes in-charter model and is terminated when the objective function value reaches zero, is below a threshold or after a specified number of iterations (e.g., the total number of ships that may take over cargos from the selected in-chartered ship). Then, the time window search is performed in the third step. Similar to the step in stage 2, this search optimized ship schedules for shorter time blocks sequentially, while fixing the schedule outside of the time block. There are two differences between the step in stage 2 and this step. One difference is that, the time windows is constructed around the period when the in-chartered ship has cargo delivery; and the other is that in-charter model is used with the objective to minimize the number of cargos for the selected in-chartered ship.

In stage 4, out-charter opportunities are pursued. Out-chartering a ship has a beneficial impact on the economics as long as it does not affect the delivery plans. Given a feasible schedule for the optimality problem, this stage tries to maximize the number of ships to be out-chartered. This stage of the algorithm investigates out-chartering eligible ships one by one by using three steps. In the first step, all ships, which are eligible for out-charter opportunity may be sorted based on the number of cargos. The ship carrying fewest cargos may be selected since it may be easier to switch fewer cargos to other ships. Then, in the second step, local searches are used to totally idle the selected ship by shifting/swapping cargos. These searches may include the sorted two-ship search and the time-window search similar to the steps in stage 3. Instead of the in-charter model used in stage 3, out-charter model is used to minimize the total number of carrying cargos for the selected ship. In the third step, the assignments are finalized between the idled ships and out-charter opportunities. Note that this part of the algorithm is specifically designed for pursuing out-charter opportunities that require a ship to be idle for the entire time horizon. Shorter term opportunities can be materialized in stage 5.

In stage 5, optimal solution is determined for the optimality model. The algorithm may perform a sequence of local searches until the objective function value of the optimality model is within a threshold, or does not improve for a specified number of iterations. The local searches include time-windows search, one-ship, and two-ship search, which are discussed below.

The time-windows search may be similar to the rolling time algorithm in stage 1. This search may optimize all ship schedules for shorter time blocks sequentially, while fixing the schedule outside of the time block. The parameters may include number of time periods solved in the sub problem, and number of time periods fixed after the sub problem is solved.

Further, the one-ship search and the two-ship searches may be performed similar to the algorithm in stage 2, which is noted above, with the exception that this local search is applied to the optimality problem.

With regard to the soft constraint extensions to LNG ship scheduling model, a feasible solution for the LNG ship scheduling model (e.g., optimality model) satisfies all the constraints. The benefit of satisfying feasibility is not the same for each of the constraints. While some of the constraints need to be satisfied due to the contractual or physical capacity restrictions (e.g. inventory and/or production), others, such as ratability constraints, present users' or customers' preferences and can be slightly violated. Such soft constraints may enhance the solution algorithm. That is, soft constraints may be applied either because it is difficult to find a feasible solution when hard constraints are used (e.g., infeasible or time consuming) or because economics improvement is restricted due to burdensome hard constraints. Accordingly, soft ratability constraints are designed to facilitate limited flexibility for feasibility and economics; while soft inventory levels are designed for feasibility.

As an example, the soft constraints may be utilized to enhance the solution algorithm. In particular, the soft constraints may enhance solutions for situations where it is difficult and/or impossible to find a feasible solution due to hard constraints. These situations may involve those having infeasible solutions and/or very few feasible solutions (e.g., performance of algorithm may not complete within an acceptable time period). Other situations may involve those where the economics deteriorate drastically due to restrictions by hard constraints. Specifically, relaxing some of strict ratability constraints may allow some deliveries to be made a day early or late. This may not cause any problem for the LNG operations and may create additional value.

To provide advantages for this flexibility to enhance the algorithm's performance, the LNG ship scheduling model may include soft constraints, such as soft ratability constraints and/or soft inventory constraints. The soft ratability constraints may include ratability constraints that represent users' or customers' preferences. These may guide the LNG ship scheduling model to make certain deliveries in a desired fashion, but can be slightly violated (e.g., adjusted to have a larger tolerance range) without creating any problems for the LNG shipping operations. The soft inventory constraints may include shipping and production disruptions that lead to changes in projected inventory levels.

Therefore, some of the physical inventory restrictions may not have to be enforced strictly for the entire year. Imposing such hard inventory constraints for the entire planning horizon may unduly restrict the solution space. As shown in block 242, the algorithm may be automated to identify constraints that can be modeled as soft constraints.

With regard to soft ratability constraints, each customer has a specific preference for deliveries throughout the year. For example, the customer may prefer the deliveries to be evenly distributed throughout the year. Optimality model includes constraints for ratability windows for each contract, which enforce a proportional shipment to a certain location/contract throughout the year.

Various mechanisms may be utilized to implement ratability windows in the LNG ship scheduling model. As an example, the ratability constraints may include monthly; bimonthly, bi-monthly with one month overlap; quarterly; quarterly with one month overlap; quarterly with two month overlap. Further, the upper and lower bound quantity for each ratability window can be generated in various manners. As an example, two different logics, based on the variety of vessels serving a specific contract/location, and one logic based on aggregation is described below. If the size of ships serving a location is close to each other, then the following logic for each contract may be implemented:

TargetQuantity(tw)=TargetMMBTU/NofRatabilityWindows
avgTargetNOfDeliveries(tw)=TargetQuantity(tw)/(AvgShipSize*EnergyContent)
minTargetNumberOfDeliveries(tw)=max(0,floor(avgTargetNOfDeliveries(tw))−1)
maxTargetNumberOfDeliveries(tw)=ceiling(avgTargetNOfDeliveries(tw))
minQuantity(tw)=IninTargetNumberOfDeliveries(tw)*minshipsize(c)*EnergyContent
maxQuantity(tw)=maxTargetNumberOfDelveries(tw)*maxshipsize(c)*EnergyContent where TargetMMBTU is the target annual delivery quantity from contractual obligations; minshipsize, maxshipsize, AvgShipSize: min, max, average size of ships which can serve to a specific contract; minQuantity, maxQuantity, TargetQuantity: min, max, target quantity of LNG to be delivered in a time window; minTargetNumberOfDeliveries, maxTargetNumberOfDeliveries; avgTargetNOfDeliveries: min, max, average number of deliveries for a ratability window; EnergyContent: energy content of LNG; TargetMMBTU: target amount of LNG to deliver in MMBTU units; and NofRatabilityWindows: number of ratability windows in one year. The logic uses the similar ships are similar than it is enough to provide one to two delivery flexibility for each time window.

If the size of ships serving a location are different from each other (above a threshold), then the following logic may be implemented:

TargetQuantity(tw)=TargetMMBTU/NofRatabilityWindows
minQuantity(tw)=max(0, TargetQuantity(tw)−downflex)
maxQuantity (tw)=TargetQuantity (tw)+upflex;

where downflex and upflex are defined as:
Downflex=maxshipsize*EnergyContent
Upflex=maxshipsize*EnergyContent Another logic is to aggregate (e.g., sum) the monthly upper and lower bounds of two months and generate upper and lower bounds for bi-monthly; and similarly summing bounds of three months for calculating quarterly ratability windows. Using aggregate ratability windows creates a relaxation of the original model.

In other embodiments, it may be preferred to have deliveries to be made roughly even without satisfying the ratability constraints exactly. Accordingly, this type of business constraints may be represented using soft constraints. While multiple methods may be utilized to incorporate the soft ratability constraints into the current algorithm, two alternative approaches are described below, which include the minimize ratability after stage 5 and minimize ratability after Stage 2.

In the proposed algorithms, two or more sets of ratability restrictions may be used (e.g., original and looser (or aggregate)). The original constraints are typically created based on business needs. For instance if a customer requests deliveries to be roughly equal in each month, then similar lower and upper bounds on deliveries are provided for each month. The proposed algorithm may be automated to decide which type of aggregation to use based on model inputs such as the number of vessels, number of contracts, number of deliveries, and original ratability requirements.

With regard to the minimize ratability violation after stage 5 method, the algorithm first decides on the aggregate ratability constraints based on model inputs. Stages 1 to 5 is applied with ratability constraints which are looser (or aggregate) than original model. For instance, if the original model has monthly ratability windows, then aggregate model may have quarterly ratability windows. Aggregate (Quarterly) may be generated in several potential approaches provided above. The objective of the aggregate ratability is to lessen solution time without compromising the quality of optimal solution. At the end of stage 5, algorithm finds a feasible solution to the model with aggregate ratability windows. This solution may or may not be feasible with respect to the original ratability (e.g., monthly). Then, in a MRV stage (Minimize Ratability Violation), the algorithm minimizes ratability violations with respect to the original ratability windows. The model may also include an additional constraint, which limits deterioration in the objective function value to a range within some tolerance around the optimal solution found in stage 5. The MRV stage, similar to stage 2, may be solved using one-direction search, time-window search, sorted one-ship search, and sorted two-ship search.

As an example, the method may include the following stages. In stage 1, the feasible solution to feasibility model is generated using aggregate ratability windows. Then, in stage 2, the optimal solution to feasibility model is generated using aggregate ratability windows. At stage 3, the in-charter usage is reduced using the aggregate ratability windows. Then, at stage 4, the out-charter opportunities are pursued using the aggregate ratability windows. At stage 5, optimal solution to optimality model is calculated using the aggregate ratability windows. Then, following stage 5, ratability violation with respect to original ratability windows are calculated. Following this calculation, the minimize ratability violation using the original ratability windows is calculated in the MRV stage.

If aggregate ratability windows are based on quarters, and original ratability windows are based on months. Then, stages 1 to 5 optimize using quarterly ratability windows and produce an optimal solution based on quarterly ratability windows. The quarterly ratability solution is then evaluated based on monthly ratability windows. If there is any violation, the MRV stage minimizes the resulting violations, while sustaining the economics within a certain level same as or close to the maximized economics achieved in stage 5. With regard to the minimize ratability violation after stage 2 method, this method is similar to the method above, but the order is adjusted. First algorithm determines the aggregate ratability constraints based on model inputs. Stages 1 and 2 use the aggregate ratability windows, and generate a feasible solution. Stage MRV takes the feasible solution, which is based on aggregate ratability, and minimizes violations with respect to the original ratability windows. The stage MRV may or may not eliminate each of the ratability violations. After the stage MRV, stages 3 to 5 follow to further improve the solution.

As an example, the method may include the following stages. In stage 1, feasible solution to feasibility model is generated using the aggregate ratability windows. In stage 2, the optimal solution to feasibility model is generated using the aggregate ratability windows. Then, the ratability violations with respect to original ratability windows are calculated. Following this calculation, the minimal ratability violation is determined in the original ratability windows. Then, in stage 3, in-charter usage is reduced using the original ratability windows. In stage 4, out-charter opportunities are pursued using the original ratability windows. Then, in stage 5, the optimal solution is determined from the optimality model using the original ratability windows.

If the aggregate ratability windows are based on quarters, and original windows are based on months, the stages 1 and 2 use quarterly ratability windows. At the end of stage 2, the algorithm may have a feasible solution based on quarterly ratability windows. This solution is then evaluated based on monthly ratability windows and if there is any violation, the MRV stage minimizes the resulting violations. Then, stages 3 to 5 are performed to enhance the solution, while sustaining the violation towards the monthly ratability within a pre-specified tolerance.

These two approaches are two exemplary algorithms that may be used to address the soft ratability issue. The minimize ratability after stage 5 method is directed to providing the best solution through stages 1 to 5 and then minimize violations as much as possible. In the minimize ratability after stage 2 method, the method is directed to feasibility because the ratability violations are minimized after stage 2. This approach may help for situations where it is difficult to get a feasible solution. After ratability violations are minimized, stages 3 to 5 are performed to enhance the solution.

Figure 2C:
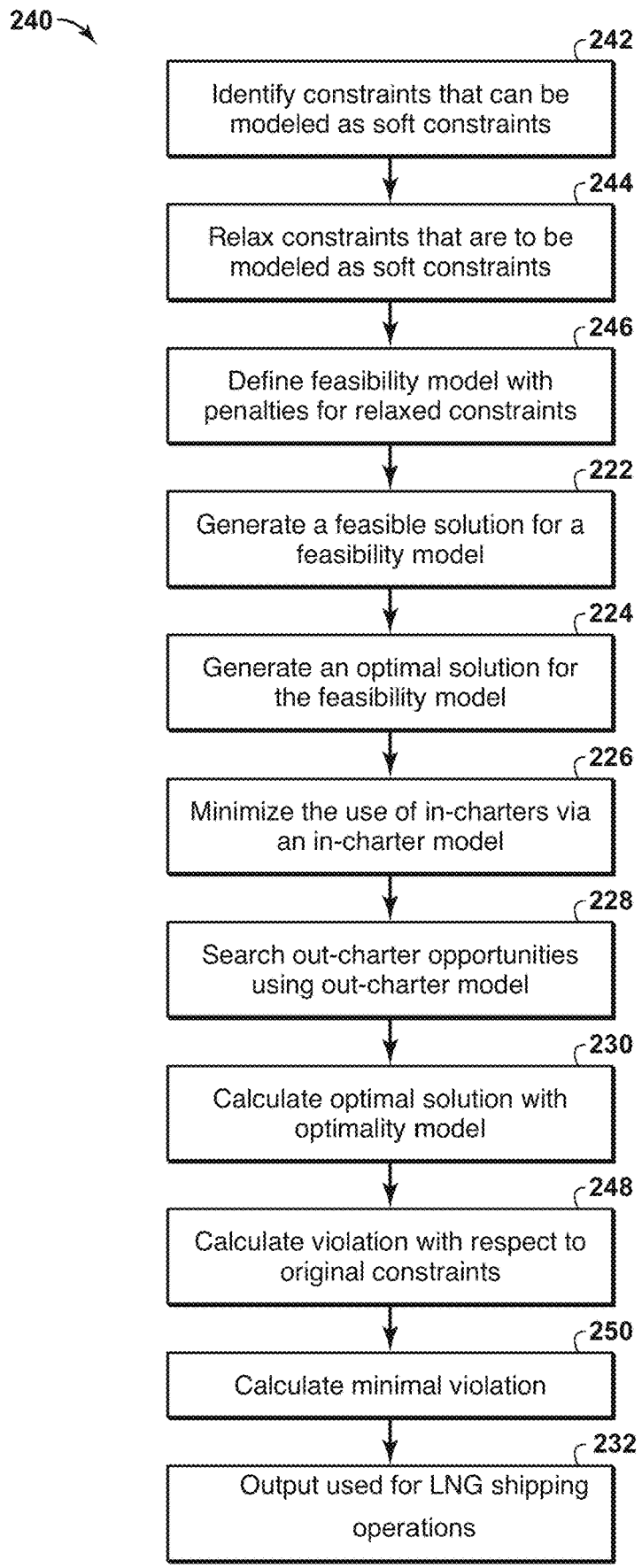
FIG. 2C is a flow chart of the five stage algorithm with soft extensions method according to an exemplary embodiment of the present techniques.

As an example, FIG. 2C is a flow chart 240 of the five stage algorithm with soft extensions method according to an exemplary embodiment of the present techniques. The reference characters from FIG. 2B are included may be referenced as described above. In addition to the five stages, the method includes a violation calculation with respect to original constraint (e.g., window or range around the constraint), as shown in block 248. The violation may be a ratability violation and the original constraint may be an original ratability window or other soft constraint window or range. Further, as shown in block 250, the minimal violation is calculated. The violation may be a ratability violation (MRV) for certain embodiments.

With regard to soft inventory constraints, LNG ship scheduling models may be optimized during the preparations for next year's delivery plan. Once the ADP is finalized and operations start, shipping and production disruptions may lead to changes in projected inventory levels. The initial plan may involve regular adjustments to account for these variations. Imposing such hard inventory constraints for the entire planning horizon may restrict the solution space more than it is needed. Therefore some of the physical inventory restrictions may not be treated as soft constraints.

Similar to the example for soft ratability constraints, the algorithm can be extended to address soft inventory issues. As shown in block 244, the proposed algorithm may be automated to decide how to relax the inventory constraints based on model inputs such as the number of vessels, number of contracts, number of deliveries. A relaxed set of inventory constraints can be used to find a feasible solution and then the violations can be minimized in a manner similar to the method used in the stage MRV, as described for the ratability example. In stages 1 and 2, the feasibility model may be used to reduce the penalty with respect to the relaxed constraints to zero. The solution at the end of stage 2 may still have violations in inventory constraints as evaluated when using the original (e.g., tighter) bounds. During stages 3 to 5, the algorithm seeks to constrain the violation in inventory constraints as evaluated for the tighter bounds such that the violations do not exceed the violation obtained at the end of stage 2. The penalty structure for violating the inventory constraints may be set in various manners. There may be multiple techniques of creating relaxed inventory constraints. One example is to increase inventory capacity over time such that relaxed capacity is always higher than the original inventory levels. The penalties can also be differentiated by storage units. Similarly, the relaxed bounds for inventory constraints can be generated in various manners. For example, the relaxed bounds may be based on degree of flexibility in re-routing production to other storage facilities, or on degree of flexibility in securing additional storage from another entity that shares storage at that facility.

With the input data, constraints and objectives, the LNG ship scheduling model may be used to predict decision variables. The model, which is a mathematical model, is further described in Appendix A as an ADP model.

LNG Ship Re-Scheduling Optimization System

With regard to -LNG ship re-scheduling (e.g., 90-day plan), the optimization system may develop updated LNG loading and delivery schedules based on new planning information, and/or in response to a disruption event or customer request or new market opportunity.

The-updated ship schedule may be provided by a re-scheduling optimization system by performing analysis of the input data through the use of one or more objectives, constraints and algorithms, which may be similar to the discussion above for the ship scheduling model. However, the re-scheduling system is intended to be used more frequently concurrently with the updates of LNG shipping operations, disruptions, customer requests and/or new market opportunities. This system can be used for 90-day plan development, ship schedule repair and ADP negotiation. Further, the algorithm may include different stages, such as (i) stage A that recovers feasibility; (ii) stage B that minimizes changes; (iii) stage C that maximizes economics, while sustaining minimum changes; (iv) stage D that-maximizes economics, which may induce significant number of changes to the baseline schedule; and/or (v) stage E that minimizes changes while sustaining the maximum economics. An example of one embodiment of the system for developing 90-day plan is shown in FIG. 4.

Figure 4:
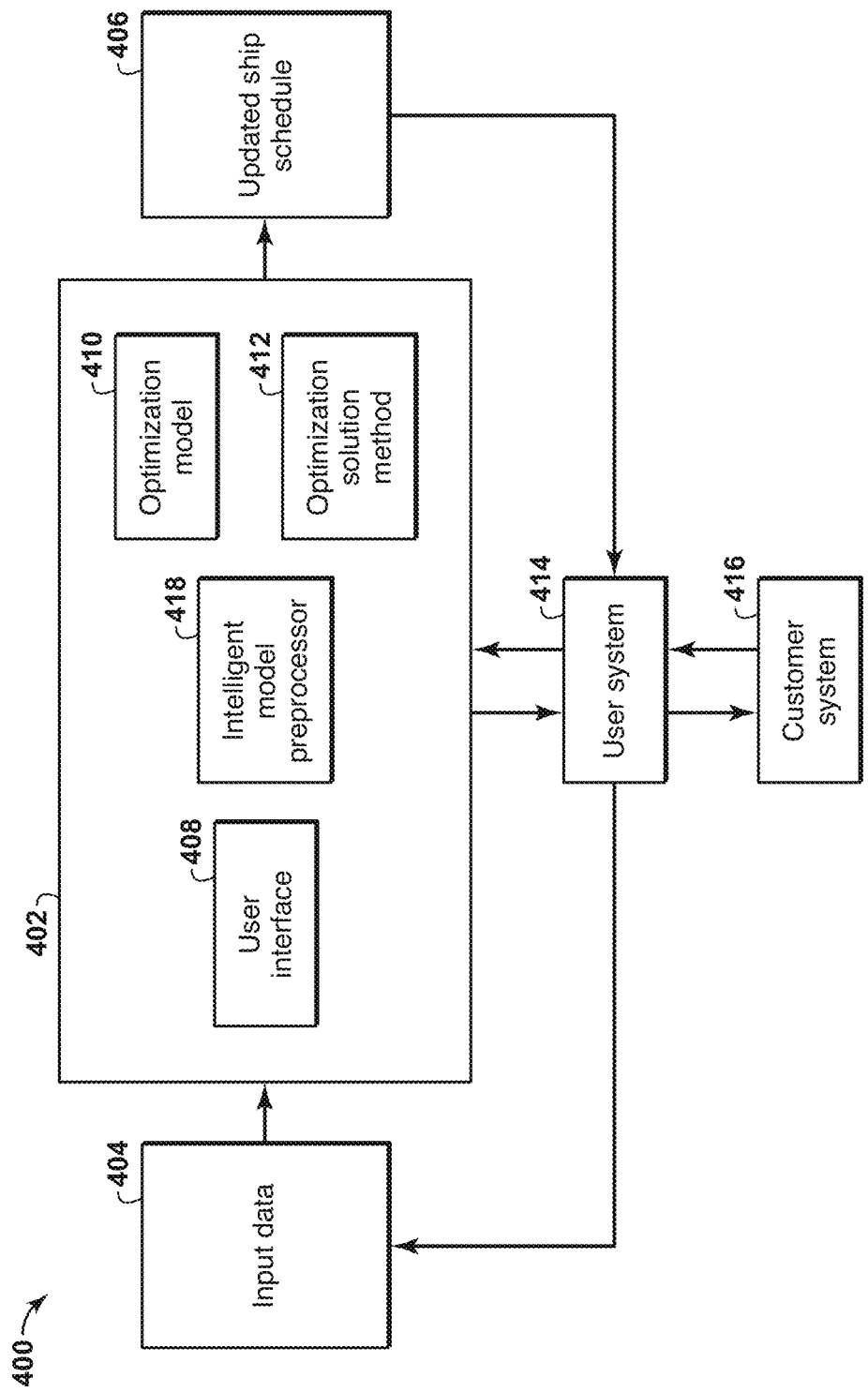
FIG. 4 is a block diagram of a LNG ship rescheduling optimization model for use in a 90-day plan according to an exemplary embodiment of the present techniques.

FIG. 4 is a block diagram 400 of a LNG ship re-scheduling optimization model according to an exemplary embodiment of the present techniques. In this diagram 400, the input data 404 (e.g., baseline schedule (which may be the ADP or another baseline schedule), updated planning assumptions, user preferences, such as the degree of flexibility for various changes, historical actuals data (e.g., deliveries, inventory and the like)) is provided to an optimization system 402 to create an updated ship schedule 406. The optimization system 402 includes a user interface 408, intelligent model preprocessor 418, optimization models 410 and optimization solution method 412, which each communicate with each other. The updated ship schedule 406 is communicated to the user system 414, which is provided to the customer system 416.

This system extracts different information from different scenes accordingly (e.g., new planning information, disruption, new customer request and new opportunity) and use them in an intelligent manner to update delivery schedules in a more efficient manner. The system includes a suite of optimization models 410 and specifically designed algorithms (e.g., optimization solution method), which recover the schedule from disruptions (e.g., resolve the infeasibility caused by the updated information), minimize changes with respect to a baseline schedule, maximize economics within some specified tolerance for changes to schedule, evaluate new market opportunities, and minimize changes again while sustaining the maximized economics which are achieved after considering the new market opportunities.

The system can be used to develop 90-day delivery schedules (e.g., 90-day plans). The system can also be used to recover delivery schedule from disruptions (e.g., ship breakdown, terminal breakdown, etc.). The system can also update the delivery schedules beyond the 90-day period to enable analysis around the effects of disruptions and changes made in the 90-day period on planned deliveries further out in the future. The system can also be used to investigate different market opportunities within 90-days or further out in the future. The system can also be used to experiment the tradeoff between maintaining schedule stability and increasing customer satisfaction or pursuing new market opportunities. The system can also be used to prioritize changes that are applied to recover schedules. The system can also be used in negotiating annual delivery programs. In developing the updated delivery schedules, the system can optimize ship schedules, terminal inventory management, LNG production schedules, maintenance schedules, and other shipping decisions, while accounting for tradeoffs related to various options in available shipping, customer requirements, price uncertainty, contract flexibility, market conditions, and the like. Other shipping decisions may include ship fuel selection, ship speed, and/or heel selection for every voyage.

Figure 5A:
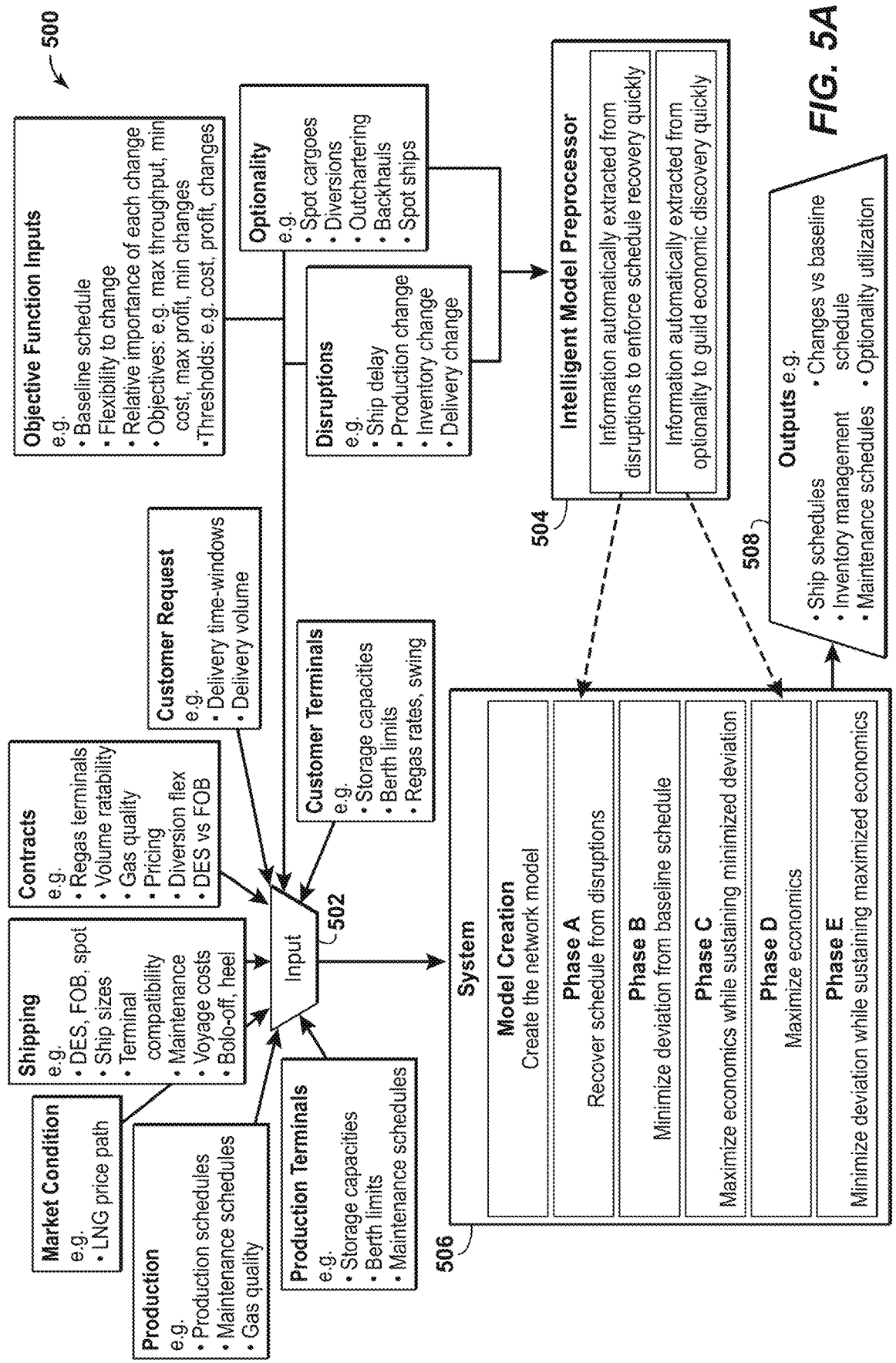
FIG. 5A is a block diagram of how the system may be implemented for the LNG ship rescheduling model according to an exemplary embodiment of the present techniques.

FIG. 5A is a block diagram 500 of how the system may be implemented for updating ship schedules according to an exemplary embodiment of the present techniques. This system includes the input data 502, the intelligent model preprocessor 504, the model and algorithm system 506, and the output data 508 with the illustration of how they could work together to realize the objective of the present techniques. The input data includes two categories: data in one category is the original information used to generate the baseline schedule (e.g. annual delivery plan, another baseline plan, etc.) as discussed above, and data in the other category represents the new and/or updated information and the new objective requirements. The intelligent model preprocessor 504 translates the updated information and business preferences in an intelligent manner that the model and algorithm can use the translated information to recover schedules from disruptions or evaluate new market opportunities in an efficient manner. Then, the system creates a time-space network model (e.g., LNG ship rescheduling model) and applies a suite of specially designed algorithms to solve it based on the specifications of the objectives. The outputs of the system may be used not only for ship scheduling, but also for inventory management, optionality utilization, and/or maintenance schedules.

A portion of the LNG ship re-scheduling optimization model may utilize one or more of the input data associated with the long-term planning modules to provide consistency between the long-term production plan and contractual obligations. The input data 502 may be categorized as: production data at one or more liquefaction terminals, facility management data at production terminals, customer requests, customer terminal data, market conditions, contracts and/or shipping data. Production data may include data relating one or more of: the types or grades of LNG produced and their heat content; production rates of one or more types or grades of LNG; production unit maintenance schedules and associated flexibility in scheduling the maintenance. Facility management data may include data relating one or more of: the number of berths available for loading; storage capacity for each type or grade of LNG; connection between berth and storage unit; and berth maintenance schedules and their associated flexibility. Customer requests may include input data relating to one or more of the ratability of deliveries; the time window and cargo sizes for specific deliveries; the speeds that the ships should take; and the fuel modes that the ships should use. Customer terminal data may include input data relating to one or more of: storage capacities for each type or grade of LNG; the number of berths available for unloading; regasification rate schedules; and distances from each liquefaction terminal. Market conditions may include input data relating to one or more of: the outlook for index prices to be used in pricing formula; the outlook for future market opportunities such as spot sales; and futures and forward contract prices. Contracts may include input data relating to one or more of: terminals where LNG can be delivered; annual delivery targets for each customer terminal; ratability of delivery, which is the timing and spacing of delivery of portions of an agreed-upon amount of LNG; gas quality, type, or grade to be delivered; pricing formulas; diversion flexibility; and other types of flexibility such as downflex (an option whereby the buyer may request a decreased quantity of LNG). Contracts may also include input data relating to the length of contract to which one or more LNG customers are bound. For example, an LNG customer may be bound by a long-term contract, such as sales and purchase agreements or a production sharing contracts. Shipping data may include input data relating to one or more of: a list of leased DES (delivered ex ship), CIF (cost, insurance and freight), CFR (cost and freight) and available spot ships; a list of FOB (freight on board) ships for each customer, the ships typically being owned or leased by the customer; ship capacities; restrictions on what ship can load/unload at what terminal; maintenance schedules for ships; cost structures for ships; boil-off and heel calculations for each ship, including an optimal heel amount upon discharge at a regasification terminal; range of ship speeds and associated cost profile; and/or set of allowed fuels.

Further, the input data into the LNG ship rescheduling model may include other data, such as time horizon (e.g., start time, end time, and/or time discretization); ship initial information (e.g., start time, start location, start heel status, LNG volume on board, grade for LNG on board, contract for LNG on board, needs to redirect to another destination location); updated planning information towards ships (e.g., daily availability, fuel modes, speed levels, heel options, and/or loading sizes); updated production/regasification profile (e.g., daily production rates and/or daily regasification rates); updated inventory profile (e.g., initial inventory level at each storage tank and/or inventory capacity for each JV); updated maintenance schedule; new in-chartering offers; new out-chartering opportunities; new diversion opportunities; new spot market opportunities; new backhaul options; baseline schedule including a list of cargos (e.g., delivery contract, delivery location, delivery ship, delivery time, and/or delivery quantity); change flexibility for each cargo (e.g., cargo divertable/optional, ship change allowed, time change allowed, number of days that it can advance or delay, and/or quantity change allowed or amount of quantity that can be reduced or increased); relative importance of each change; objectives: minimize changes; maximize economics; minimize cost, etc.; and/or thresholds towards changes, economics, cost etc.

In addition to the input data, the LNG ship rescheduling model may include constraints. Appropriate constraints and specifications are layered onto the LNG ship rescheduling model for conducting various analyses that are specific to problem being addressed. The constraints in the LNG ship rescheduling model may be similar to those in the LNG ship scheduling model, which is noted above. Further, the core optimization model provides the ability to model a supply chain that includes one or more LNG liquefaction terminals, multiple customers with long and short-term purchase contracts, and spot LNG markets/buyers. The supply chain also has the capability to include multiple fleets of heterogeneous time-chartered ships together with opportunities to in-charter or out-charter ships. When dry-docks are required, the model also ensures the ships to take dry-docks within specified time windows. The model also provides functionality to model contractual flexibilities and market opportunities such as opportunities to divert cargo or backhaul third party cargo on a return voyage. Detailed operational constraints related to liquefaction terminals and shipping, contractual obligations and market conditions are included in the model.

The input for contracts may consider the possibility of multiple operating entities or owners involved in a liquefaction project, and each operating entity or owner may have a joint-venture agreement or other arrangement with the natural gas producer (e.g., national oil company or government (NOC)) including fiscal agreements that cover royalties and taxes. Another type of contract covered by contracts arises in liquefaction projects with shared facilities and infrastructure (such as storage facilities, loading facilities, and ships), in which there exist facility sharing agreements and fleet sharing agreements between the different production entities (e.g., joint ventures (JVs)). These agreements may include terms outlining volume storage entitlements, lifting entitlements and cost-sharing terms among others. Further, sales and deliveries typically are negotiated between a production entity and a buying entity, such as a joint venture and a customer. These contracts can be long-term or short-term and include SPAs (Gas Sales and Purchase Agreements) and PSCs (Production Sharing Contracts). These agreements typically include terms related to annual volumes, ratable delivery requirements, ships required for transport, price and penalties. In any of these multiple entity—type contracts or agreements, it is possible that various parties are operating under different fiscal conditions. For example, two companies may be working with a national oil company on a liquefaction project under different joint venture agreements. For various reasons those joint venture agreements may have different terms governing the above types of subjects. These different terms are factored into the ship scheduling optimization model as disclosed herein.

The system takes as input a baseline schedule, customer preferences regarding flexibility in different kinds of changes to the schedule, updated information regarding assumptions that are used to build the schedule, and new market opportunities. The system develops an updated schedule that minimizes the degree of change with respect to the baseline schedule. The system also generates the most economic schedule that does not deviate from the baseline schedule by more than a pre-specified tolerance for changes. The system also investigates new market opportunities while minimizing impact on the baseline schedule.

In the baseline schedule, a list of planned cargos is specified with the following aspects for each cargo: the customer, the destination, the delivery ship, the delivery time and the delivery quantity. All of these aspects can (sometime have to) be changed in the updated plan. For example, if a ship is delayed 1 day, the delivery time for some cargos may have to be delayed 1 day. As another example, if a ship is broken down, an extra ship may have to be in-chartered to cover the cargos which are planned for the broken ship. If the in-charted ship has different capacity, the delivery quantity is also changed. As another example, if a destination terminal is shut down, the cargos which are originally planned to be sent to this terminal have to be diverted to another destination. As another example, the customer may request to send the cargo to another destination with a bigger ship on a different date, and therefore multiple aspects of the cargo are changed.

The system provides the user the ability to specify the allowed flexibility in changing different aspects of the schedule. For example, the user may specify whether the ship associated with a planned cargo can be changed in the updated plan. As another example, the user may specify the amount of time by which the delivery date for a cargo can be delayed (or advanced) in the updated schedule. As another example, the user may specify the amount by which the quality of LNG to be loaded or delivered on a planned cargo could be changed in the updated schedule. As another example, the user may specify whether or not a planned cargo needs to be delivered to the planned customer/location at all. As another example, the system provides the user the ability to specify whether or not extra ships could be in-chartered or out chartered in the updated schedule.

The system provides flexibility for the user to specify the relative importance of the different types of changes mentioned above, while minimizing the overall differences between the baseline schedule and the updated schedule. For example, the user may specify a higher priority for minimizing changes for deliveries to a specific customer, or for minimizing changes to deliveries in the specific period of the calendar. As another example, the user may prefer to make a sequence of ship swaps or date changes than to rent extra in-charters. As yet another example, the user may prefer ship changes instead of delivery date changes, or vice versa.

As specified above, the system may also obtain as input the new and/or updated information regarding assumptions that pertain to the forward planning period. These assumptions can be different from those that were used to build the baseline schedule. The system may provide the user the ability to provide updated information or consider more decision options which can only be practical during short-term periods. For example, the user can specify the initial status for ships at the beginning of the planning period with different granularities including: the earliest available date, location, heel status, volume on board, LNG quality on board and contract information. As another example, the user can specify constraints on the daily availability for ships. Some of this information may not have been available and/or accurate when the baseline schedule was initially developed. As yet another example, the user can update the initial inventory level in terminal storage at the beginning of the planning period which can be different from what was predicted in the baseline schedule. In another example, the user can update the projected daily production/regasification rates. Also, the user can specify short-term out-chartering opportunities which were not foreseen when the baseline schedule was developed. For example, the user may want to move the planned dry-docking events from one period to another period in order to ensure ample shipping resource during the periods when the LNG market price is higher according to the updated pricing information. Further, the user may want to consider different or multiple fuel or speed options in the short-term periods instead of the options used in baseline schedule. As another example, the user may want to adopt different loading strategy including partial loading, split and co-loading instead of the strategy used to make a long-term plan, etc.

Some of these information updates, especially those related to changes for ships, facilities, production and/or deliveries, often causes infeasibility of the baseline schedule (e.g., disruptions). As example, if a ship is delayed, it may not be able to complete all deliveries on time as planned in the baseline schedule. For example, if a ship is broken down, other ships may have to change their schedules or extra ships may have to be in-chartered in order to cover the deliveries for the broken ship. As another example, if a destination terminal is shut down, all cargos which are planned for this terminal may have to be diverted to other locations. As yet another example, if initial inventory level at a production terminal is much higher than what is predicted in the baseline schedule, some cargos may have to be enlarged or extra cargos may have to be added in order to consume the extra volume. For example, if the daily production rate is higher than what is assumed in the baseline schedule, cargos may have to be loaded faster and extra cargos may have to be added to avoid lost production. As another example, if a customer requests to change the delivery time of his cargos, the entire schedule may have to be changed because ship availability may be changed and loading/unloading schedules may also be changed. As yet another example, if the user wants to move a dry-dock event from one period to another period, all schedules in between these two periods may be affected and need to be re-planned.

Disruption types that user may face in LNG supply chain optimization are prebuilt in the intelligent model preprocessor. When new and/or updated information is provided, the preprocessor may first determine whether or not and what disruptions may be caused. If disruptions are caused, the preprocessor may translate the information through a pre-defined scheme into objectives and constraints into the model to recover the schedule from disruptions in a more efficient manner before the algorithms put effort to minimize deviations from baseline schedule.

Other information updates, together with new market opportunities, may not affect feasibility. That is, the baseline schedule may still function if the new options or opportunities are not pursued. By considering the new options or opportunities, however, economic efficiency may be improved with potentially significant deviation from the baseline schedule. For example, the user can investigate the benefit to slow down the ship fleet by allowing a slower speed than that used in the baseline schedule. For example, the user can improve the netback by allowing some specific fuel modes other than the standard mode used in the baseline schedule. As another example, the user can reduce shipping cost and avoid ship spare time by out-chartering additional ships while not affecting the reliability for the transportation network significantly. As yet another example, the user can generate higher profit by diverting cargos to spot markets with high price.

Similar as disruption types, opportunity types that user may consider in LNG supply chain optimization are also pre-built in the intelligent model preprocessor. Information related to opportunities may also be translated through a pre-defined scheme into objectives and constraints in the model to provide insight in evaluating the economic benefit in an efficient manner. If taking the opportunity may cause significant deviation from the baseline schedule, however, the opportunity may not be considered when the system focuses on schedule recovery and deviation minimization; instead, it may be investigated separately followed by the deviation minimization again.

The system may also take other inputs related to setting up the objective function including user preferences on flexibility to various kinds of changes for each cargo and user preferences on the relative importance of different kinds of changes. Inputs could also include user preferences for the objective function to be optimized. The selections may include minimizing changes compared to a baseline schedule, maximizing economics, minimizing changes for a given economic performance, or maximizing economics for a given level of changes. Economic maximization may include user-defined model objectives such as maximizing LNG throughput, minimizing costs, maximum profits, maximizing gross netback, optimizing optionality, and/or maximizing robustness in face of uncertainty related to weather conditions, travel times, or market conditions.

The models for LNG ship rescheduling optimization also have time-space network structure similar as in the long-term ship scheduling optimization with specific modifications. These modifications are associated with the time horizon, cargo expression and/or ship availability.

For example, the time horizon may include the length of planning horizon, which is adjustable. That is, the time horizon may be any practical number of time periods, which is not limited to 90-day periods. Also, besides the planning horizon, a posterior horizon may also be created in the network, which includes an appropriate number of time periods further out in the future. The posterior horizon provides the model ability to incorporate the future and make better decisions by avoiding unnecessary costly changes or increasing chance to take market opportunities during the planning horizon. For an example, during the planning horizon, daily production rates are higher than what were predicted in the baseline schedule and one spot cargo needs to be delivered by the end of the horizon. An extra ship may have to be in-chartered for this spot cargo if the model cannot see that a ship (not in-chartered) may idle for a long time period since the end of this planning horizon. For example, in the baseline schedule, there is a divertible cargo whose delivery time is close to the end of the planning horizon. However, the spot market that may take this cargo is much farther away than the cargo's original destination. The cargo can be possibly diverted only if the network includes the posterior periods because, otherwise, no decision variables associated with this diversion may be created in the network. Moreover, degree of flexibility (e.g., number of decision variables) in different horizons may be adjustable. For example, all operational options (e.g., fuel modes, speed levels, heels etc.) may be considered in the planning horizon to make a practical delivery schedule in near future. However, only the standard options, which are used in the long-term planning, may be considered in the posterior periods since this horizon is further out in the future and the corresponding planning information is less accurate and more uncertain.

As another example, these modifications may include cargo expression. That is, instead of the general exclusive time windows expressed in the network for the long-term planning, individual cargos are expressed explicitly in the network in this problem. By including cargos in the arcs, all changes associated with cargos can be tracked precisely, while only the binary decision variables towards arcs need to be created.

As yet another example, the modifications may include ship availability. When a ship is unavailable on a specific time period, all traveling arcs (e.g., ship is always on duty on traveling arcs in the network), which includes that time period may not be created in the network to: 1) reduce the network size and speed up the solution searching; and 2) avoid using constraints to handle the ships' unavailability and so reduce the difficulty of the model.

For the LNG ship rescheduling model, the variables may include different types of variables associated with different aspects. For example, variables in the model may include cargo variables; contract variables; spot market opportunity variables; when to dry-dock each ship that requires dry-docking variables; what ship to out-charter and when variables; and/or what ships to in-charter and when variables.

The cargo variables may include whether it may be diverted; load timing, discharge timing; load quantity, discharge quantity; assigned ship, destination terminal; heel left on ship; ship speed and fuel selection for laden voyage; ship speed and fuel selection for ballast voyage; what tank farm to load cargo at; and/or what berth to load cargo at. The contract variables may include how much quantity to divert; which cargo to divert; how much extra spot sale to take; and/or how many extra spot cargos to take and when. The spot market opportunity variables may include whether it may be taken; how much quantity to deliver; and/or how many cargos to deliver and when.

In addition to the variables, the LNG ship rescheduling model may also include various constraints. The time space network model for the long-term planning problem can be applied for this problem including additional constraints related to the cargos with their specific flexibilities towards: delivery contract, delivery destination, delivery ship, delivery time, and/or delivery quantity. The delivery contract and/or destination constraints may include a determination whether a cargo is not divertible/optional (e.g., the cargo is enforced; the cargo can only be delivered to its original contract and destination; the cargo has to satisfy the other restrictions (delivery ship, time, quantity etc.)) and/or a determination whether the cargo is divertible/optional (e.g., diversion is favored, for example, contract/destination change may not penalized; and/or the other restrictions (delivery ship, time, quantity etc.) are deactivated). The delivery ship constraints may include a determination that the cargo can only delivered by the original ship if ship reassignment is not allowed; a determination that the cargo can also be delivered by the other compatible ships if ship reassignment is allowed; and/or a determination that the delivery ship changes may be penalized. The delivery time constraints may include a determination that the cargo cannot be delivered beyond the specified time window; a determination that the cargo can be delivered at any time period within the specified time window; and/or a determination that the delivery time changes may be penalized. The delivery quantity constraints may include a determination that the cargo cannot deliver LNG less than or more than the specified range; a determination that the cargo can deliver any LNG quantity within the specified range; and/or a determination that delivery quantity changes may not be penalized.

With regards to the intelligent model preprocessor, this processor is a translation layer between the input data and the optimization model, which may translate the practical information provided in the input data to the advanced information used by the model and algorithms. This preprocessor may provide a mechanism to translate business preferences and new/updated information into constraints and objectives that can be built into the model, and guide the optimization solver searching solutions towards feasibility in a more efficient manner when disruptions are faced or towards optimality in a more efficient manner when opportunities are investigated.

This preprocessor may also include a series of criteria which reflect management options or preferences, a scheme to manipulate cargos which may be changed due to the updated information, and a penalty calculator which assigns cargo specific penalty weights for changes in the schedule. When updated information is provided in the input data, this preprocessor may execute the following steps: detect whether disruptions are caused and/or opportunities need to be investigated; manipulate, delete and/or add cargos according to the management preferences; calculate the cargo specific penalties for potential changes in the schedule; and feed the modified cargos with their change penalties to the optimization model and algorithms. These steps may be provided in logic or set of instructions as discussed further below.

The intelligent model preprocessor provides users ability to specify their business preference towards LNG supply chain management. For example, if a ship is delayed and delivery of one cargo is affected, there may be two approaches to address the problem, which may include delaying the cargo (which is cost efficient but may reduce customer's satisfaction) and/or in-chartering an extra ship for that cargo (which is expensive but may improve customer's satisfaction). The user can specify which approach is preferred. For instance, if the ship delay is less than a certain number of days, the former may be preferred than the latter; if a specific customer is involved, however, the latter may be preferred than the former. As another example, if a customer requests to change a cargo delivery date, the user can specify the amount of effort permitted to satisfy that request. For instance, if the request is from some specific customer, the user may prefer to in-charter an extra ship if necessary to satisfy the request and so to improve the customer's satisfaction. Otherwise, the user may prefer to negotiate the delivery date with the customer to avoid the cost for in-chartering an extra ship. If the user does not specify their preferences, default assumptions may be applied, which may default to the typical practice in the art.

These cargos, whose delivery schedules may be affected by the updated information, may be manipulated with respect to the delivery contract, delivery ship, delivery time, and delivery quantity. If necessary, some cargos may be deleted or optional cargos may be added to lead solution searching. The changes associated with these manipulated cargos may be assigned with specifically designed penalties based on the user's preferences. The manipulation and penalty scheme may be used to enhance the optimization solver to recover feasible schedule or investigate opportunities in a more efficient manner. When updated information is provided, the intelligent model preprocessor may detect the followings: whether the baseline schedule is disrupted; how many cargos may be affected; how severe the disruption is; which method is preferred and how to fix the schedule; whether new market opportunities are present; and how to take the opportunity.

For example, if a ship is delayed seven days and in-chartering an extra ship (if necessary) is preferred, the system may determine that only the first cargo of the delayed ship needs to be handled by the in-charter and the remaining cargo can be handled by the original ship. Then, the first cargo may be assigned with the in-chartered ship. This modification could result in schedule feasibility immediately if the in-charter's available time window fits to the first cargo's delivery window. If there is a solution in which the usage of this in-charter is unnecessary, the model may get rid of this in-charter when minimizing deviation from baseline schedule by assigning a large penalty for using extra in-charters.

As another example, if the ship is only delayed two days and delaying cargos is preferred over using in-charters, the system may determine that there are three cargos that may be delayed potentially. Then the delivery time flexibility for these three cargos may be enlarged accordingly so that they can still be delivered by the delayed ship. Thus, the model may recover the schedule in a more efficient manner because it only has to resolve the inventory and facility conflict when shipping resource is not a problem. However, if delivering a cargo by its original ship two days later is not preferred compared with delivering the cargo by another ship (e.g., not in-chartered) on time, higher penalties may be assigned to delivery delays than to ship changes. When deviation from baseline schedule is minimized, delivery delay could then be pushed out from the schedule if such a solution exists.

As yet another example, if a user has six divertible cargos and a market opportunity who may take all of these six cargos. In this scenario, the original schedule is still a feasible solution. The system may evaluate the spot market opportunity first and then minimize changes if the market opportunity is taken. Before making a decision, the user first needs to understand: how many cargos should be diverted; how it may improve economics; and what is the impact on the baseline schedule. To achieve this objective, the intelligent model preprocessor may add six optional cargos with the following specifications: 1) delivery destination is the spot market; 2) delivery ship is existing ships (e.g., not in-chartered) if they are available to deliver the spot cargos without causing too many changes; extra in-chartered ships otherwise; 3) delivery time is calculated so that the corresponding loading time matches the loading time of each divertible cargo; 4) delivery quantity is calculated so that the corresponding loading quantity matches the loading quantity of each divertible cargos. The settings of these optional cargos may be useful to avoid shipping resource conflict, inventory tank conflict and facility conflict. By using these settings, the optimization solver may efficiently discover the first solution with diversions to the spot market by searching solutions in the neighborhood around these cargos. And then, the solver may enhance the economics by optimizing the aspects associated to these cargos. After the economics are maximized, deviation from the baseline schedule is minimized by assigning large penalty for using extra in-chartered ships. Thus, the final solution is a trade-off among economic pursue, change tolerance and management preferences.

Beneficially, the intelligent model preprocessor is a scheme to translate business preferences and new and/or updated information in LNG supply chain management to constraints and objectives in the model that may be useful to the model in finding feasible and more economic solutions in a more efficient manner. This preprocessor provides a mechanism for the optimization model to obtain optimality in a more efficient manner when feasible solutions exist, or make practical recommendations to the user when updated information causes infeasibility. The preprocessor also enables the optimization model to evaluate all possible solutions and balance conflicting priorities based the user's requests and preference in one shot. The preprocessor provides the user with the ability to avoid unnecessary delays. The present techniques are specifically designed for and applied to, but may not be limited to, LNG supply chain optimization. However, it may be applied to other scheduling problems in which the schedules need to be updated based on new information and user's preferences.

As an example, a customer request may be made to change delivery. In the baseline schedule, a cargo named as "cargoA" has been planned. The cargo's original specifications are listed in Table 4, including cargo ID, contract, delivery ship, delivery location, delivery time, and delivery quantity. The cargo's original allowed flexibility is also shown in Table 4, below:

TABLE 4

| ID | contract | delivery ship | delivery location | delivery date | delivery Quantity (MMBTU) | is This Cargo Optional? | allow Ship Change? | allowed reduction (MMBTU) | allowed increment (MMBTU) | allowed Advance (days) | allowed Delay (days) |
|---|---|---|---|---|---|---|---|---|---|---|---|
| cargoA | contractA | ship1 | locA | Mar. 12, 2014 | 3270000 | No | Yes | 300000 | 300000 | 0 | 0 |

In this table, the cargo is not optional and this aspect has to be reflected in the updated schedule; the cargo can be delivered by other ships instead of the specified "ship1"; the cargo can have up to 300,000 million British thermal units (mmbtu) more or less quantity than the delivery quantity; and the cargo does not have any delivery time flexibility and so has to be delivered on 3/12/2014.

The cargo's updated specifications are listed in Table 5 below:

from the baseline schedule (e.g., most undesirable changes: introduce extra in-chartered ships; undesirable but acceptable changes: deliver the cargo between 3/6/2014 and 3/12/2014; and/or desirable: deliver cargoA on 3/5/2014); (iii) regular changes: reassign delivery ships (not in-chartered); (iv) how may these changes affect other deliveries; and (v) how may these changes impact economics. The intelligent model preprocessor may perform various calculations, such as cargo manipulation and/or change the penalty scheme. The cargo manipulation may include cargoA being modified to cargoA' as in Table 5 above. In this table, the delivery date may be changed to Mar. 5, 2014; and it is allowed to delay up to seven days. The change penalty scheme manipulation may include adjusting the penalty scheme. That is, penalties for all cargos may be designed as noted below in the following logic:

Delivery location ($\omega\_l$):
  Original destination: $\omega\_l=0$
  Other destinations: not allowed
Quantity ($\omega\_q$)
  Within specified range: $\omega\_q=0$
  Outside specified range: $\omega\_g=0$ if the cargo is divertible; not allowed otherwise
Ship($\omega\_s$)
  Original ship: $\omega\_s=0$
  Other non-in-chartered ships: $\omega\_s=1$
  Extra in-chartered ship: $\omega\_s=100$
Date($\omega\_d$)
  For cargoA'
    Requested date: $\omega\_d=0$
    Within specified range (3/6/2014-3/12/2014): $\omega\_d=(\text{date}—3/5/2014)^2$
    Outside specified range (3/6/2014-3/12/2014): not allowed
  For other cargos
    Original delivery date: $\omega\_d=0$
    Within specified range: $\omega\_d=\text{date-original date}$
    Outside specified range: not allowed
Penalty for each cargo: $\omega\_l+\omega\_g+\omega\_s+\omega\_d$
  Total change penalty: summation of penalties for all cargos Beneficially, the system may provide the best recommendations instead of merely indicating that the request is

TABLE 5

| ID | contract | delivery ship | delivery location | delivery date | delivery Quantity (MMBTU) | is This Cargo Optional? | allow Ship Change? | allowed reduction (MMBTU) | allowed increment (MMBTU) | allowed Advance (days) | allowed Delay (days) |
|---|---|---|---|---|---|---|---|---|---|---|---|
| cargoA' | contractA | ship1 | locA | Mar. 5, 2014 | 3270000 | No | Yes | 300000 | 300000 | 0 | 7 |

If the customer request involves advancing the cargo by seven days (e.g., on 3/5/2014), the user may have various concerns before the decision can be made. The user's concerns may include questions, such as (i) is it possible to satisfy the request (with or without extra in-chartered ships); (ii) What should the user propose to minimize the deviation infeasible. That is, the original baseline plan is always feasible, which provides the optimization solver with a solution that avoids spending large amounts of time on demonstrating feasibility or infeasibility. Further, when the change penalty is minimized, trade-offs are made between satisfying the customer's request and modifying other customers' delivery schedule. For cargoA', the closer the delivery date to 3/5/2014, the less the penalty, the more impact on others' schedule. The designed penalty scheme may be useful for the optimization solver by searching towards satisfying the customer's request because the penalty function $\omega\_d$ for cargoA' is steeper than that for other cargos. Meanwhile, the solution does not have unacceptable amount of impact on others' schedule because the penalties for others' change may be dominant and may be pushed out during minimization. Also, in-charters may not be preferred compared with the regular changes and the economics may be maximized after the derisible change tolerance is discovered.

As a result of the LNG ship rescheduling modeling, the outputs from the LNG ship rescheduling model to the user may include information that may be utilized for negotiation and decision making. That is, the date to deliver the cargo (e.g., some day between the original delivery date and the requested date); the impact on other's schedule; and/or the impact on economics. Accordingly, the user may reply to the customer with a counter offer based on the outputs. The user's counter offer, if the cargo cannot be advanced with 7 days, may include an offer to advance five days instead of seven days, as an example.

Figure 5B:
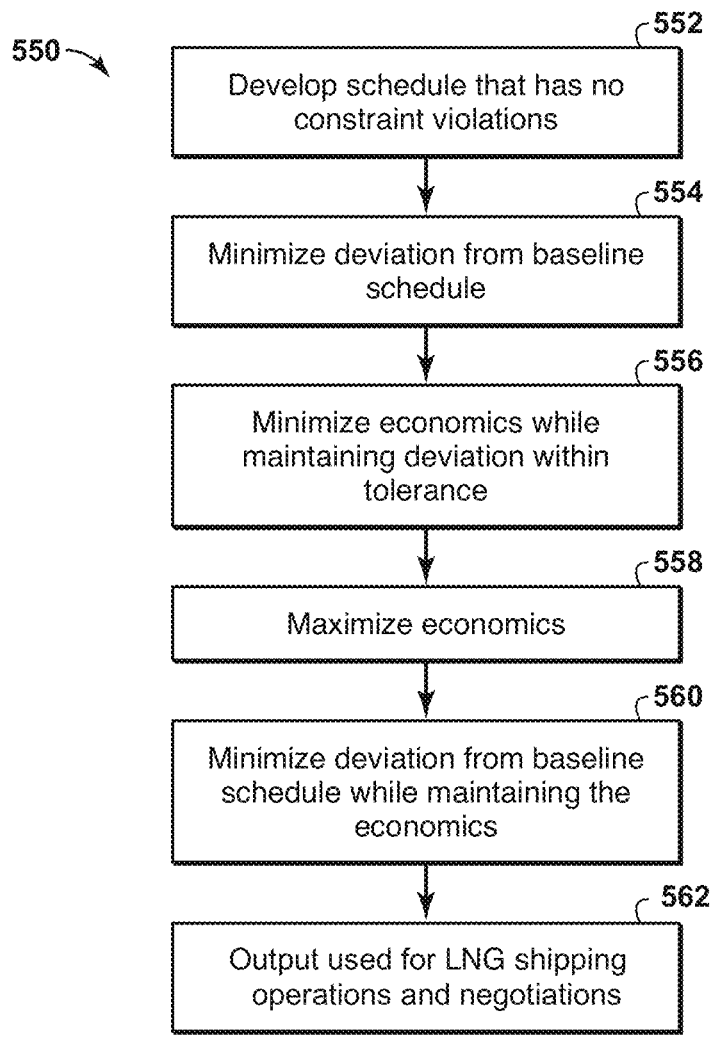
FIG. 5B is a flow chart of the five stage algorithm method for the LNG ship rescheduling model according to an exemplary embodiment of the present techniques.

Similar to the LNG ship scheduling model and noted above, the LNG ship rescheduling model may include different algorithms that are utilized to calculate the outputs. That is, the system includes a suite of specially designed algorithms consisting of five stages. These different stages are shown in FIG. 5B. FIG. 5B is a flow chart 550 of the five stage algorithm method for the LNG ship rescheduling model according to an exemplary embodiment of the present techniques. In stage A, as shown in block 552, a schedule that has no constraint violations is developed. The schedule may be created to recover the schedule from disruptions (e.g., repair schedule to satisfy all hard constraints which may be violated due to disruptions). Then, as shown in block 554, the deviation from baseline schedule may be minimized in stage B. Then, in stage C, as shown in block 556, economics may be maximized while sustaining deviation at the minimized level or within a pre-specified tolerance. At block 558, in stage D, economics is maximized regardless the deviation from the baseline schedule. In this stage, new market opportunities which may induce significant changes may be captured. Then, in stage E, the deviation from baseline schedule is minimized, while sustaining a certain level of economics, as shown in block 560. The output of these algorithms may be used for LNG shipping operations and negotiations with third parties, as shown in block 562.

The system may perform these algorithms stage by stage, wherein the solution of the previous stage is automatically fed to the following stage to speed up the optimization algorithms. Depending on the new and/or updated information, some of these stages may be bypassed or skipped. For an example, if disruptions are caused by the new and/or update information, while no new market opportunities are provided, the system may perform the algorithms in stages A to stage C and skipping stage D and stage E. As another example, if disruptions are not caused, while only new market opportunities need to be investigated, the system could skip performing the algorithm in stage A to stage C and perform the algorithms in stage D and stage E. When both disruptions and new market opportunities are present, the system can also be terminated after any of these stages depending on user's need.

Further, each of the stages of the algorithms solves a series of local neighborhood optimization problems. The local neighborhood structures are designed for this system include, but are not limited to, those described below.

In stage A, the schedule is recovered from disruptions, as noted in block 552. This stage determines a means to recover the schedule from disruptions in a more efficient manner (e.g., repair schedule in a more efficient manner to satisfy all hard constraints, which may be violated due to the new and/or updated information). In this stage, non-negative slack variables may be added to hard constraints; and the total amount of slack variables is minimized. If the objective function value can be minimized to zero, then the schedule is recovered successfully. Otherwise, the solution may suggest what may cause infeasibility and provide hints for the user to resolve the disruptions. This stage includes three major steps, which include (step 1) construct a solution based on the cargos specified in the baseline schedule and the cargos manipulated by the intelligent model preprocessor; (step 2) improve the solution by applying a series of local neighborhood searches, which are similar as in the annual delivery model; and (step 3) search the solution directly in the global region to demonstrate feasibility or infeasibility if step 1 and step 2 fail to discover the first feasible solution.

Due to the potential disruptions caused by the new and/or updated information, the baseline schedule may not be feasible. However, the cargos manipulated by the intelligent model preprocessor are designed to recover the schedule from disruptions in a more efficient manner. Thus, a narrow neighborhood is constructed and searched around the cargos specified in the baseline schedule and the cargos manipulated by the intelligent model preprocessor. Very often, the slack variables can be pushed to zero in a more efficient manner due to the design of the manipulated cargos. Branch and bound node limits can be specified to terminate each search, as well.

If the first feasible solution is not discovered in the above neighborhood, local neighborhood searches may be performed in a sequence. That is, k-day-flexibility search, rolling time window search, one-ship search and two-ship search may be performed in a specific sequence. These searches are similar as the searches designed for the annual delivery model, which is discussed further above. Branch and bound node limits may be specified to terminate each search.

If step 1 and step 2 fail to determine the first feasible solution, step 3 may be performed either to find the first feasible solution or to demonstrate infeasibility of the original configuration and provide suggestions on how to adjust the schedule. In step 3, slack variables may be deleted and the global region may be searched. The search may be terminated after a time limit specified by user or specified number of iterations. For example, if a terminal is down, the user needs to divert all cargos planned for that terminal to another candidate spot market. However, the shipping resource and inventory management conflict may not be solved. As such, the spot market does not have the capacity to consume all volumes that need to be diverted or the user does not have resource to satisfy the requirement of the spot market. Thus, the user may 5 need to consider another market or obtain more resource.

In stage A, the system provides the capability to recover from various types of disruptions. When disruptions have been pre-built in the intelligent model preprocessor, the schedule can be recovered in a more efficient manner in step 1; otherwise, step 2 and step 3 can obtain feasible solutions for any general type of disruptions. Also, if a disruption type is new and cannot be resolved in step 1, the intelligent model preprocessor may learn from that disruption, update its techniques and develop new capabilities to recover from that type of disruption in future performances.

In stage B, the deviation from baseline schedule is minimized. as shown in block 554. The first schedule recovered from disruptions may have an unacceptably significant amount of deviation from the baseline schedule. This stage is designed to minimize the deviation from baseline schedule. The algorithms in this stage can be categorized into two groups, which are a group of searches which may eliminate changes for all cargos simultaneously within a local neighborhood, and another group of searches each of which may eliminate changes of one specific cargo.

The first group includes a time window search and two global searches. In the time window search, the changes are detected one by one starting from the beginning of 90-day period, and a time window around the change is created. Within the time window, variables are freed and may be re-evaluated, while outside the time window, variables may be fixed to their current values. In one global search, variables in the posterior periods are fixed to the current values and the remainders are freed up; in the other global search, decision variables related to in-chartered ships are fixed to their current values and the remainders are freed up. Branch and bound node limit can be specified to terminate each search.

The second group includes a neighborhood structure, which is specifically designed for cargos with changes. If a cargo has deviation from the baseline schedule, a hybrid neighborhood structure may be created for the cargo. In this neighborhood, variables, either inside the time window which is created around the cargo, or associated with the decisions corresponding to the cargo, or related to the ship that originally delivers the cargo in the baseline schedule, may be freed up; other variables may be fixed to their current values. Cargos can be sorted according to the significance of their deviations in this neighborhood search. For an example, cargos which are using extra in-chartered ships can be investigated earlier than the cargos which only have regular date or ship changes. Branch and bound node limit can be specified to terminate each search.

If the user has higher tolerance towards the deviation from the baseline schedule, the deviation tolerance can also be used to terminate the algorithm. That is, the algorithm can be stopped as soon as a solution whose deviation is within tolerance is discovered.

In stage C, the economics are maximized, while sustaining minimized deviation. The economics for the solution with minimized deviation discovered in stage B may be enhanced by optimizing options. For example, different speeds, fuel modes and spot markets may be some of the options. This stage may maximize economics among solutions with the minimized deviation or a deviation within a specified tolerance by adding an upper bound to the total deviation. The algorithms in this stage may include two rolling time window searches with different parameter specifications. The structure of rolling time window searches is similar to that described above for the annual delivery model.

The first rolling time window search has more narrow windows (as compared with the second rolling time window search). For each iteration, all variables, either outsides of the window, or for the decisions associated with a spot market, or for the decisions associated with an extra in-chartered ship, are fixed to their current values; and all other variables are freed up. This neighborhood search is directed to optimize the options which are not related to spot market opportunities, for example the options for fuel, speed, or heel, etc. A smaller branch and bound node limit can be specified to terminate the search.

The second rolling time window search has wider windows (as compared with the first rolling time window search). For each iteration, variables outsides of the window are fixed to their current values; and other variables are freed up. This neighborhood search may not only optimize the options which are not related to spot market opportunities, it may also investigate whether cargos should be sent to spot market to improve economics. This neighborhood is larger compared to the first one and thus a larger branch and bound node limit should be specified to terminate the search.

This is the stage where the user can test the trade-off between deviations from the baseline schedule and the economic pursue. Within a certain threshold, the higher the deviation tolerance, the maximum economics results. Above the threshold, however, further higher deviation tolerance may not be useful because the optimality of the project may have been achieved.

In stage D, economics may be further maximized regardless schedule deviation from the baseline schedule. The new optionality may be evaluated. As noted above, economics are maximized within the specified change tolerance in stage C. If the change tolerance is small or set up improperly, new market opportunities, which could further maximize economics, may be excluded because they may involve significant amount of changes on the schedule. To resolve this situation, economics may be maximized without any change limit in this stage. Rolling time window algorithms are designed and applied in this stage.

The rolling time window is a similar hybrid structure as in stage C. Rolling time windows are created one by one starting from the beginning of 90-day horizon. For each iteration, all variables, either inside of the time window, or for decisions associated with optional cargos, or for decisions associated with spot markets, are freed up for optimization while all others are fixed to their current values. Without change limit, the optimization solver is free to take all options or spot market opportunities as long as the economics are improved. Thus, the solution in this stage has the optimal economic benefit given the resource and market at that time.

In stage E, deviations are minimized while sustaining maximized economics. The schedule achieved after stage C may have unnecessary changes or unacceptable significant amount of deviations even though the economics are maximized. This stage may provide the user a different approach to make the trade-off between deviations from baseline schedule and the economic performance. In this stage, deviations may be minimized while sustaining the economics at the maximized or a pre-specified level. The algorithms in this stage are similar as those in stage B. The only difference is that, a lower bound is added to the economics in the local neighborhood optimization problems in this stage to sustain the economic level.

In this stage, the user can specify how much economic benefit to be allocated to minimize deviations from baseline schedule. Within a certain threshold, the more economics given up, the less the deviations from baseline schedule. Above the threshold, however, further larger tolerance for economic decrement may not be beneficial because the deviations from baseline schedule may have been minimized. The solution achieved in stage B and stage D present the two extreme preferences that the user may have regarding with the trade-off between solution reliability and economic pursue. This model provides user capability to make selections among these solutions at the same time.

This system is designed for and applied to, but is not limited to, LNG ship rescheduling optimization. The present techniques perform one or more of the following: recovering from the disruptions; minimizing changes to the schedule; maximizing benefits while sustaining deviations within a certain level; maximizing benefit by evaluating new opportunities; minimizing changes while sustaining economics at a certain level. These provide a mechanism to update schedules for all projects in which planning assumptions are changed frequently and trade-off between schedule reliability and economic pursue has to be made.

As an output from the system, the system may be used in various manners during project-specific operations planning, such as: to negotiate an ADP during the negotiation process; to develop an initial 90-day delivery plan; and/or to evaluate the effect of customer requests for modifying the initial 90-day delivery plan. Also, it may be used to recover ship schedule from disruptions (e.g. ship breakdown, and/or terminal breakdown). Further, it may be used in a similar way for other scheduling time horizons other than annual and 90-days. The ship schedule optimizer may be integrated with maintenance and production planning, as well as looking at maximizing profits by utilizing flexibility within contracts. For example, the ship schedule may be optimized simultaneously with any of the following: LNG inventory levels at one or more LNG liquefaction terminals; LNG inventory levels at one or more LNG regasification terminal; fuel selection for at least one voyage; ship speed for at least one voyage; a maritime route for at least one voyage; berth assignment at any of the LNG liquefaction terminals and/or LNG regasification terminals; ship maintenance schedules; and LNG liquefaction or production schedules. Further, aspects disclosed herein may be used for developing delivery plans for an individual LNG producer to one or more customers, or for a company that owns equity gas in one or more LNG liquefaction terminals and delivers LNG to one or more customers. Disclosed aspects may also be used to evaluate the performance of an optimized schedule under various future scenarios associated with uncertainties identified herein.

The system may provide the user the capability to recover schedule from disruptions and evaluate new market opportunities in a more efficient manner through its intelligent model preprocessor. Depending on how severe the disruption is and how urgent that the schedule needs to be recovered, the system can provide different solutions with different priorities. If the user prefers to recover the schedule as soon as possible regardless of deviation from the baseline schedule, the system may stop immediately after stage A which is designed to get the first feasible/practical solution in a more efficient manner. Alternatively, if the user also wants to minimize deviation from the baseline schedule, the system could be terminated after stage B in which the total weight for prioritized changes is minimized until satisfying the user-pre-defined change tolerance. Alternatively, if economic benefits are also pursued, the system could run till the end of stage C in which economics are maximized with the given change tolerance. Alternatively, if more market opportunities need to be investigated, the system could perform stage D in which economics may be maximized regardless the change tolerance and stage E in which changes may then be minimized while sustaining the economic advantages.

The system may provide the user the ability to analyze the trade-off between minimizing changes in the updated planned compared to the baseline plan, and maximizing the incremental economics. For example, the system may optimize economics without constraining for the number of changes compared to a baseline plan. The system may also develop a schedule that minimizes overall changes compared to the baseline plan. Alternatively, the system may optimize economics for a given number of changes compared to baseline plan. Alternatively this system may minimize the number of changes for a given level of economic performance. In each of these cases, the system provides a mechanism for the user to specify the degree of flexibility and importance associated with each type of change on a cargo by cargo basis.

Figure 6:
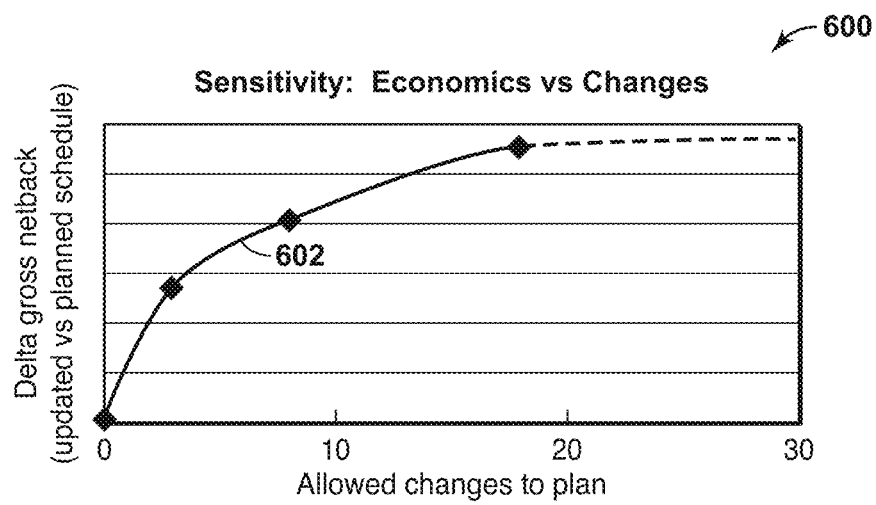
FIG. 6 is a chart of a notional curve representing the incremental economics generated by allowing for more changes in the updated schedule compared to the baseline schedule.

FIG. 6 is a chart 600 of a notional curve 602 representing the incremental economics generated by allowing for more changes in the updated schedule compared to the baseline schedule. Within a certain threshold, the higher the deviation tolerance, the maximum economics results, as shown on the curve 602. Above the threshold, however, further higher deviation tolerance may not be useful because the optimality of the project may have been achieved.

The system may provide the ability to optimize economics from several perspectives including minimizing costs, maximizing throughput, maximizing profit etc.

The updated schedule can be used as a starting point to negotiate 90-day delivery schedules with customers. During the negotiation with a specific customer, the system can be used to evaluate the operational feasibility, economic effect, and side-effects on the delivery schedules for the overall portfolio of satisfying requests by that specific customer. For example, the system may evaluate how a customer request (or the relevant scenario under consideration) may affect LNG inventory profiles at each storage tank farm, and re-optimize the schedule to ensure that storage inventory constraints are satisfied. Similarly, the system may evaluate whether the relevant scenario may cause any berth conflicts and may re-optimize the schedule to mitigate such issues. Similarly, the system may evaluate if the relevant scenario may cause any contractual constraints to be violated, the system may re-optimize the schedule to ensure that these violations are minimized The system can also be used to re-optimize schedules during negotiations with customers during the 90-day scheduling or ADP development stage The system can optimize the schedule at different levels of granularity. For instance, some decisions (e.g. ship speed) may be optimized at a finer scale in the near term (e.g., within the time period of the rescheduling horizon, such as within the 90-day plan), and at a coarser scale beyond the near term. Similarly, the system may optimize ship fuel selection in the near term, but assume nominal selection rules beyond the near term.

The design of the system can be applied to any scheduling problems in which schedules need to updated frequently based business's preferences and new information, and trade-off between change minimization and economics maximization need to be made.

As an example, the present techniques for LNG ship rescheduling may include various scenarios that can be solved by this system include, but are not limited to, the followings: 1) production and inventory change (e.g., daily production rate differs from the production assumptions and or inventory level deviates from the predicted volume in the baseline schedule); 2) ship delay or ship down (e.g., ship delay by several days; and/or ship is down for a significant long period); 3) terminal down (e.g., terminal is down so cargos need to be diverted; terminal is closed for maintenance so cargos need to be rescheduled; and/or berth is closed for maintenance); 4) change requests from customers (e.g., customer requests to change delivery destination/ship/time/quantity/grade and/or negotiation about the annual delivery plan); 5) divert contracts to spot market (e.g., spot market that accepts certain ship types/cargo sizes/LNG grade); 6) dry-dock window is moved from period to period (e.g., to ensure ample shipping resource during periods with higher LNG price) and/or 7) combined scenarios with more than one feature specified above.

Figure 7:
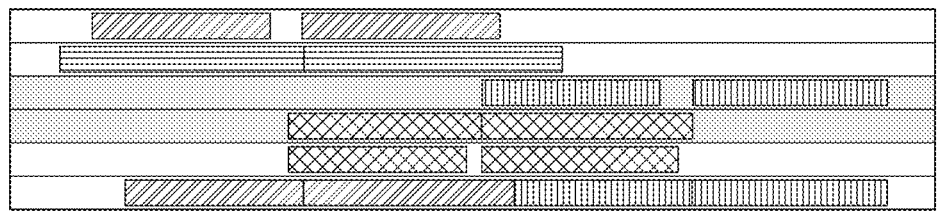
FIG. 7 is a diagram that representations the difference in ship schedules in the updated and baseline plans.

The system may also provide intuitive interfaces to provide the user flexibility and enhance the identifying the differences between the baseline and the updated schedules. As an example, FIG. 7 is a diagram 700 that represents the difference in ship schedules in the updated and baseline plans for three ships. In this diagram 700, the difference in ship schedules in the updated and baseline plans is shown by the different color boxes. The diagram 700 shows the differences in the two schedules for three ships where a schedule changed for one of its original cargos. Each voyage (e.g., laden or ballast) is represented by one box. The boxes are color-coded by cargo, as noted in the legend 702.

Figure 8:
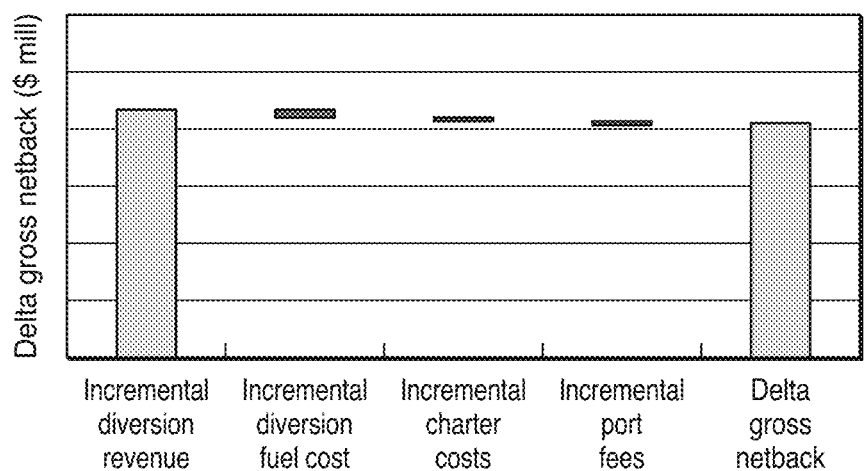
FIG. 8 shows a chart of a notional comparison of economics for the updated delivery plan compared to baseline delivery plan.

FIG. 8 shows a chart 800 of a notional comparison of economics for the updated delivery plan compared to baseline delivery plan. The changes shown in FIG. 7 provide the economic benefits shown in the chart 800 of FIG. 8.

The user interface for the system may provide several capabilities for comparing two or more versions of the same schedule. The intended use of this functionality is to identify where the optimization model has modified the schedule in a significant way and provide an easy method for quantifying the value of the updated schedule.

To quantify the value of the schedule updates, the original ADP as well as the previous version of the schedule may be benchmarked. Benchmarking against the ADP provides insights into the comparison of the 90-day plan and the ADP. This type of benchmarking provides insights into the question of "how are we doing according to the original plan?" or "how are we doing given all previous schedule modifications since the ADP?".

Outputs from the model may be utilized to provide visual indicators for the user. As an example, the outputs may include side-by-side comparison charts for certain metrics. These metrics may include total units loaded and delivered; sales revenue in dollars per unit delivered and overall; profit in dollars per unit delivered and overall; shipping cost in dollars per unit delivered and overall; profit in dollars per unit delivered and overall; burn down chart showing ADP as the baseline with previous and current schedule to project the schedule status (e.g., units delivered, shipping costs; sales revenue, and profit). All of the above metrics should be displayed for the schedule overall, each Joint Venture, each Contract, and each Region of sale.

When determining the value it is also valuable to have other metrics to benchmark two solutions. Some of these examples are Ship Utilization, Number of Cargos, Ratio of the Number of Cargos to the Cargo Size, Knots Sailed, Canal Fees Paid, etc. These metrics can quantify how much the schedule has changed for the value that is seen from the above charts.

For the system to effectively communicate changes to a schedule, several unique comparison interfaces needed to be implemented. Accordingly, displaying schedule differences side-by-side are filtered down to the relevant changes as well as cargoes that fall within the visible time period as defined by the user. These changes can be viewed side-by-side and from multiple different perspectives, as shown in FIGS. 9 and 10.

Figure 9:
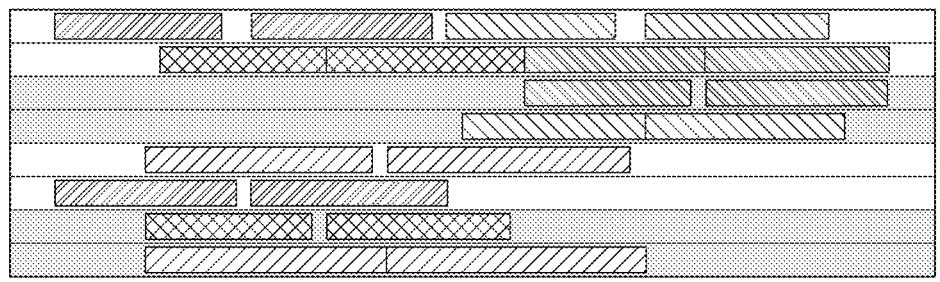
FIG. 9 is a diagram that represents the difference in ship schedules for how cargos are moving between the ships.

FIG. 9 is a diagram 900 that represents the difference in ship schedules for how cargos are moving between the ships. In this diagram 900, the changes are represented for each individual ship.

Figure 10:
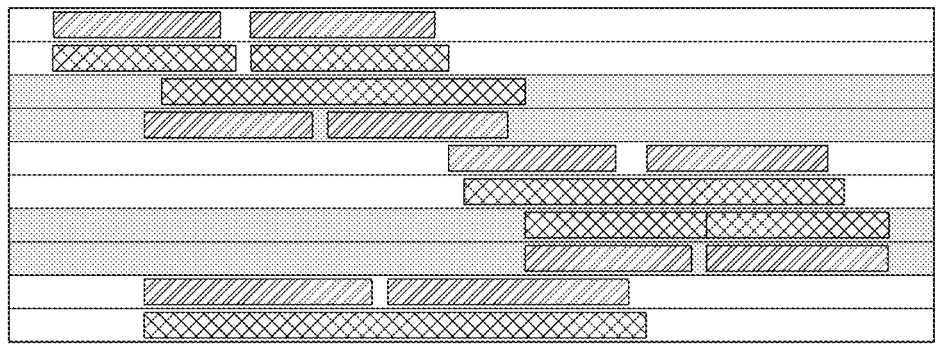
FIG. 10 is another diagram that represents the difference in ship schedules for how cargos are moving between the ships.

FIG. 10 is another diagram 1000 that represents the difference in ship schedules for how cargos are moving between the ships. In this diagram 1000, cargo schedule are represented as to how the cargos are changing with respect to time, but also shows when a ship is changed.

In these diagrams 900 and 1000, the perspective blends the cargo in diagram 900 to show the customer's delivery schedule for their cargos only. The value of this display is to provide clear indications and notifications with a user.

The customer schedule shows how a customer's cargos are changed for the purposes of updating the customer on the impact. To illustrate the scheme of this system, the ship down case is shown below. In this scenario, a ship Ship1 is down in the middle of February and may get back to the production terminal on 3/18/2014 instead of 3/11/2014 as planned. Due to the tight schedule of the ship Ship1, the delay may affect two cargos. This aspect is shown further in the cargos planned for ship Ship1 during March-May, which is indicated in Table 6 below:

TABLE 6

| Cargo Name | Vessel Name | Load Terminal | Load Date | Arrive Date | Customer | Destination | Unload Date | Back Date | Back Terminal | slack days at production terminal | slack days at destination terminal |
|---|---|---|---|---|---|---|---|---|---|---|---|
| | Ship1 | | | | Cstm | Dest | Feb. 27, 2014 | Mar. 11, 2014 | ProdTr | | |
| Cargo1 | Ship1 | ProdTr | Mar. 11, 2014 | Mar. 22, 2014 | Cstm | Dest | Mar. 24, 2014 | Apr. 5, 2014 | ProdTr | 0 | 2 |
| Cargo6 | Ship1 | ProdTr | Apr. 6, 2014 | Apr. 17, 2014 | Cstm | Dest | Apr. 19, 2014 | May 1, 2014 | ProdTr | 1 | 2 |
| Cargo7 | Ship1 | ProdTr | May 4, 2014 | May 15, 2014 | Cstm | Dest | May 16, 2014 | May 28, 2014 | ProdTr | 3 | 2 |
| Cargo8 | Ship1 | ProdTr | Jun. 10, 2014 | Jun. 21, 2014 | Cstm | Dest | Jun. 22, 2014 | Jul. 4, 2014 | ProdTr | 13 | 1 |

As shown in Table 6, when the ship Ship1 is delayed from 3/11/2014 to 3/18/2014, the cargos Cargo1 and Cargo6 are impacted and cargo Cargo7 may or may not be affected depending on the change of facility usage caused by the ship being down. The system may repair the schedules for March to December (Mar-Dec) with minimum change given that the customers do not permit any delivery side change after July and allow ship change, 1 day delivery change and 10% of quantity change during March-May period.

The system is able to recover the schedule in 15 minutes with minimized total weight of changes and maximized economics. An extra in-chartered ship is not used as in this correction and five cargos ship reassignments. After the schedule is repaired, the economics are improved by further optimizing fuel and speed options. Table 7 describes the cargos ship reassignment for the baseline schedule versus the repaired schedule or plan:

TABLE 7

| cargoID | Baseline Schedule | | | | Repaired Plan | | |
|---------|------|-----------|-------------|----|-------|-----------|-------------|
| | ship | Load Date | Unload Date | | ship | Load Date | Unload Date |
| Cargo1 | Ship1 | Mar. 11, 2014 | Mar. 24, 2014 | -> | Ship3 | Mar. 11, 2014 | Mar. 24, 2014 |
| Cargo2 | Ship4 | Mar. 17, 2014 | Mar. 29, 2014 | -> | Ship1 | Mar. 18, 2014 | Mar. 29, 2014 |
| Cargo5 | Ship3 | Mar. 17, 2014 | Apr. 2, 2014 | -> | Ship4 | Mar. 17, 2014 | Apr. 2, 2014 |
| Cargo3 | Ship1 | Apr. 6, 2014 | Apr. 19, 2014 | -> | Ship2 | Apr. 7, 2014 | Apr. 19, 2014 |
| Cargo4 | Ship2 | Apr. 11, 2014 | Apr. 23, 2014 | -> | Ship1 | Apr. 11, 2014 | Apr. 23, 2014 |

Figure 11:
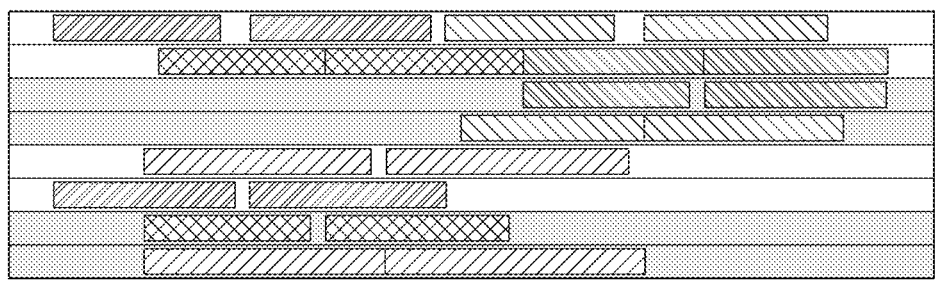
FIG. 11 is a diagram that represents the difference in ship assignments.

FIG. 11 is another diagram 1100 that represents the difference in ship assignments.

Figure 12:
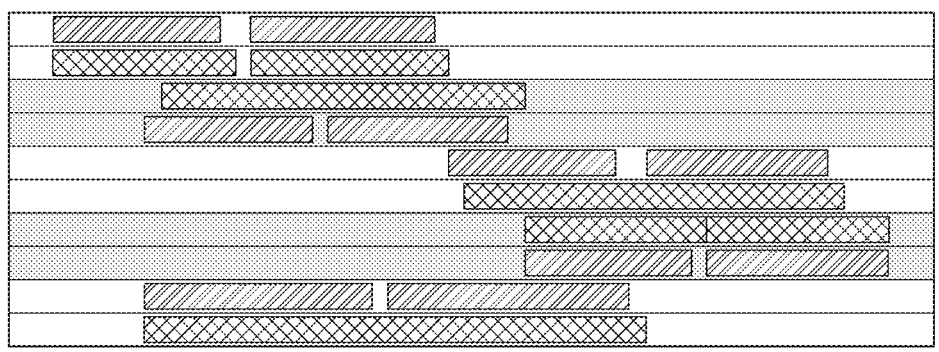
FIG. 12 is another diagram that represents the difference in ship assignments.

FIG. 12 is another diagram 1200 that represents the difference in ship assignments.

See FIG. 11 and FIG. 12 for the illustration of ship reassignments below.

Figure 13:
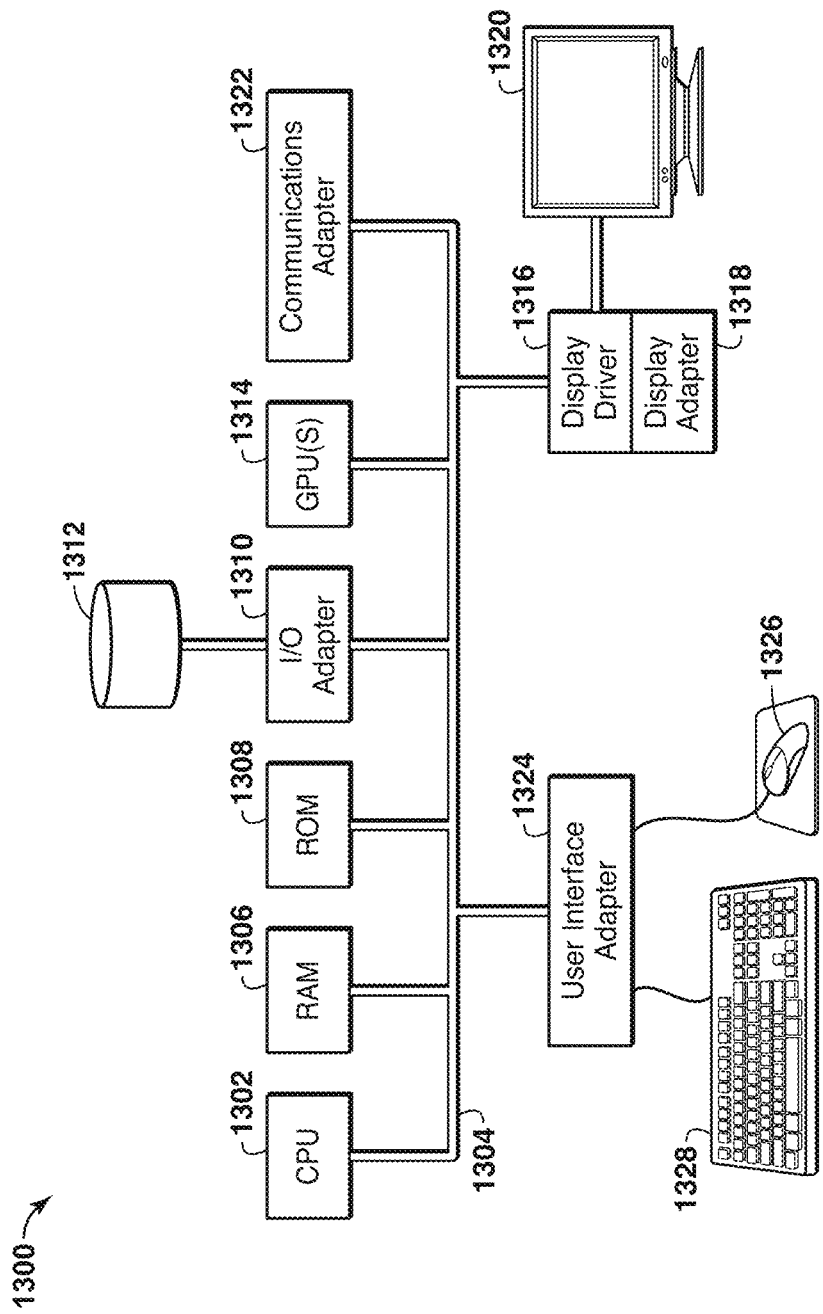
FIG. 13 is a block diagram of a computing system according to disclosed aspects and methodologies.

As an example, FIG. 13 is a block diagram of a computer system 1300 that may be used to perform any of the methods disclosed herein. A central processing unit (CPU) 1302 is coupled to system bus 1304. The CPU 1302 may be any general-purpose CPU, although other types of architectures of CPU 1302 (or other components of exemplary system 1300) may be used as long as CPU 1302 (and other components of system 1300) supports the inventive operations as described herein. The CPU 1302 may execute the various logical instructions according to disclosed aspects and methodologies. For example, the CPU 1302 may execute machine-level instructions for performing processing according to aspects and methodologies disclosed herein.

The computer system 1300 may also include computer components such as a random access memory (RAM) 1306, which may be SRAM, DRAM, SDRAM, or the like. The computer system 1300 may also include read-only memory (ROM) 1308, which may be PROM, EPROM, EEPROM, or the like. RAM 1306 and ROM 1308 hold user and system data and programs, as is known in the art. The computer system 1300 may also include an input/output (I/O) adapter 1310, a communications adapter 1322, a user interface adapter 1324, and a display adapter 1318. The I/O adapter 1310, the user interface adapter 1324, and/or communications adapter 1322 may, in certain aspects and techniques, enable a user to interact with computer system 1300 to input information.

The I/O adapter 1310 preferably connects a storage device (s) 1312, such as one or more of hard drive, compact disc (CD) drive, floppy disk drive, tape drive, etc. to computer system 1300. The storage device(s) may be used when RAM 1306 is insufficient for the memory requirements associated with storing data for operations of embodiments of the present techniques. The data storage of the computer system 1300 may be used for storing information and/or other data used or generated as disclosed herein. The communications adapter 1322 may couple the computer system 1300 to a network (not shown), which may enable information to be input to and/or output from system 1300 via the network (for example, a wide-area network, a local-area network, a wireless network, any combination of the foregoing). User interface adapter 1324 couples user input devices, such as a keyboard 1328, a pointing device 1326, and the like, to computer system 1300. The display adapter 1318 is driven by the CPU 1302 to control, through a display driver 1316, the display on a display device 1320. Information and/or representations of one or more 2D canvases and one or more 3D windows may be displayed, according to disclosed aspects and methodologies.

The architecture of system 1300 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method may be implemented in machine readable logic, set of instructions or code that, when executed, performs the instnictions to create the 90-day plan and/or the ADP. The method may perform the operations noted in the blocks of the different figures.

In one or more embodiments of LNG ship scheduling model, the LNG ship scheduling model may include various logic and components. The system may be used to develop annual delivery plan given the contract specification; production and re-gasification location specifications, rates; ship specifications; ship compatibilities with contracts, production and re-gas terminals, berths; dry-dock requirements; storage tank requirements; berth specifications; berth and storage maintenance; loans/transfers of LNG among co-located JVs; LNG grades; optionality opportunities including in-charter, out-charter, diversion; price projections; and/ or potential ship routes. The system generates decisions, which may be based on ship travel details (time, route, fuel, speed, "state" (warm vs. cold)); cargo size, LNG quality; storage-berth combination which a cargo is served; is ship in-chartered or out-chartered; and/or does ship go to dry-dock on a certain day. The system may also optimize decisions in consideration of ship travel restrictions based on arrival and departure times, speed, distance, loading/unloading operations; compatibility requirements between JV, storage tanks, berths, contracts, cargo sizes; limits on loans between JV's; storage restrictions; berth utilization; contractual requirements (quantity, time); and/or maintenance requirements. The system may also optimize decisions to maximize/minimize an objective; maximize social interest; minimize shipping costs; maximize joint venture profitability (single JV case); maximize IOC shareholder profitability (multiple JV case); maximize NOC interest (multiple JV case). The system uses algorithms to optimize model may include basic algorithm has five stages or phases, as noted above. Further, the system may include extensions to handle soft constraints, such as soft ratability constraints (approach 1: minimize violation after Stage 5 and approach 2: minimize violation after stage 2) and/or soft inventory constraints (e.g., approach 1: minimize violation after stage 5 and approach 2: minimize violation after stage 2.

In one or more embodiments of the LNG ship rescheduling model, LNG ship rescheduling model may include various logic and components. The system may develop updated LNG loading and delivery schedules. The present techniques may adjust the given baseline schedule for individual flexibility specifications towards cargo divertible/ optional, delivery destination; delivery ship, delivery date, and/or delivery quantity. In response to new/updated information, the system may update the schedule in response to updated planning information; disruptions; new market opportunities; new customer request etc. The objective of the system may be to minimize changes; maximize economics; and/or combined (balance changes and economics). The LNG ship rescheduling model may provide adjustment to the length of planning horizon is adjustable; posterior horizon further in future; degree of flexibility (# decision variables) in different horizon. The system may include various constraints for cargos, such as a cargo is enforced if it is not divertible/optional; cargos cannot have changes beyond their specified flexibilities; cargo-based penalties are assigned to each cargos to penalize changes; and/or the total penalties are minimized. As part of the system, an intelligent model preprocessor may be provided, which provide user's preferences responding to new/updated information; cargo manipulation; penalty calculation and/or guide optimizations to recover feasible schedules and achieve better economics in a more efficient manner. The system may also provide balancing between schedules need to updated based business's preferences and new information and/or trade-off between change minimization and economics maximization need to be made The disclosed aspects, methodologies and techniques may be susceptible to various modifications, and alternative forms and have been shown only by way of example. The disclosed aspects, methodologies and techniques are not intended to be limited to the specifics of what is disclosed herein, but include all alternatives, modifications, and equivalents falling within the spirit and scope of the appended claims.

ADP Mathematical Model

May 21, 2015

Contents
1 Data
  1.1 Fundamental Data
    1.1.1 Basic Sets
    1.1.2 Compatible Indexes and Sets
  1.2 Time Windows
    1.2.1 Notations
    1.2.2 Definitions
    1.2.3 Compatible Sets
2 Network
  2.1 Nodes
    2.1.1 Dummy Nodes
    2.1.2 Production Nodes
    2.1.3 Regasification Nodes
    2.1.4 Incharter Nodes
    2.1.5 Outcharter Nodes
    2.1.6 Maintenance Nodes
    2.1.7 Diversion Nodes
    2.1.8 Coloading and Split Nodes
    2.1.9 Compatible Sets
  2.2 Arcs
    2.2.1 Dummy Arcs
    2.2.2 Arcs from production nodes
    2.2.3 Arcs from regasification nodes
    2.2.4 Incharter arcs
    2.2.5 Outcharter arcs
    2.2.6 Maintenance arcs
    2.2.7 Diversion arcs
    2.2.8 Coloading and Split arcs
    2.2.9 Arcs between time windows
3 Modeling
  3.1 Notations
    3.1.1 Sets
    3.1.2 Parameters
    3.1.3 Variables
  3.2 Formulation 1 Data 1.1 Fundamental Data 1.1.1 Basic Sets Time Periods
  T: set of time periods $[t \in T = \{0, 1, \ldots, |T|\}]$
Terminals
  $TR^{LNG}$: set of production terminals $[tr \in TR^{LNG}]$
  $TR^{REG}$: set of regasfication terminals $[tr \in TR^{REG}]$
  $TR^{ICH}$: set of incharter terminals $[tr \in TR^{ICH}]$
  $TR^{OCH}$: set of outcharter terminals $[tr \in TR^{OCH}]$
  $TR^{MN}$: set of maintenance terminals $[tr \in TR^{MN}]$
  TR: set of all terminals $[tr \in TR = TR^{LNG} \cup TR^{REG} \cup TR^{ICH} \cup TR^{OCH} \cup TR^{MN}]$
    Note: These terminals must be named differently even though they can be the same locations.
  $TR^{DI}$: set of diversion terminals $[tr \in TR^{DI} \subseteq TR^{REG}]$
Distances
  RT: set of routes $[rt \in RT]$
Ships
  $V^{DES}$: set of DES ships $[v \in V^{DES}]$
  $V^{FOB}$: set of FOB ships $[v \in V^{FOB}]$
  $V^{ICH}$: set of incharters $[v \in V^{ICH}]$
  V: set of all ships $[v \in V = V^{DES} \cup V^{FOB} \cup V^{ICH}]$
  $V^{OCH}$: set of outcharters $[v \in V^{OCH} \subseteq V^{DES}]$
  SP: set of ship speeds $[sp \in SP]$
  SF: set of ship fuel types $[sf \in SF]$
  ST: set of ship states $[st \in ST]$
  ZL: set of loading cargo sizes at production terminals $[zl \in ZL]$
  ZR: set of arrival cargo sizes at regasification terminals $[zr \in ZR]$
    Note: ZR is derived from ZL, boil-off and fuel usage (See 1.1.2 Ships).
  ZD: set of discharging cargo sizes at regasification terminals $[zd \in ZD]$
    Note: SD is derived from ZR and heel reserve (See 1.1.2 Ships).
  SZ: set of cargo sizes $[sz \in SZ = ZL \cup ZR \cup ZD]$
Joint Ventures
  JV: set of joint ventures $[jv \in JV]$
Storage Units
  SU: set of storage units $[su \in SU]$
Grades
  G: set of energy grades of $LNG [g \in G]$ Berths
B: set of berths [b∈B]

Customers
CM: set of customers [cm∈CM]
$CM^{INV}$: set of customers with inventory management in the model [$CM^{INV}$⊆CM]

Contracts
$DC^{DES}$: set of contracts with DES ships [dc∈$DC^{DES}$]
$DC^{FOB}$: set of contracts with FOB ships [dc∈$DC^{FOB}$]
DC: set of all contracts [dc∈DC=$DC^{DES}$∪$DC^{FOB}$]
Notes:
   Each contract associates with one unique joint venture jv(dc).
   Each contract associates with one unique customer cm(dc).
   Each contract associates with one unique production terminal $tr^{LNG}(dc)$∈$TR^{LNG}$.
   Each contract associates with one unique regasification terminal $tr^{REG}(dc)$∈$TR^{REG}$.

Fiscal Regimes
BFR: set of base fiscal regimes [bfr∈BFR]
FR: set of fiscal regimes [fr∈FR]

1.1.2 Compatible Indexes and Sets

Time Periods
T(v): set of available time periods for ship v, [T(v)⊆T]
$\underline{t}(v)$: the earliest available time period of ship v. [$\underline{t}(v)$=minT(v)]; (Boundary Conditions)
$\bar{t}(v)$: the latest available time period of ship v, [$\bar{t}(v)$=maxT(v)]; (Boundary Conditions)
T(dc): set of available time periods for contract dc, [T(dc)⊆T]
$\underline{t}(dc)$: the start time period for contract dc, [$\underline{t}(dc)$∈T]
$\bar{t}(dc)$: the end time period for contract dc, [$\bar{t}(dc)$∈T]

Terminals
TR(v): set of terminals that ship v can visit, [TR(v)⊆TR]
$\underline{tr}(v)$: the start location of ship v, [$\underline{tr}(v)$∈TR];(Boundary Conditions)
   ∀v∈$V^{DES}$, $\underline{tr}(v)$∈$TR^{LNG}$
   ∀v∈$V^{FOB}$, $\underline{tr}(v)$∈$TR^{LNG}$
   ∀v∈$V^{ICH}$, $\underline{tr}(v)$∈$TR^{ICH}$
$\bar{tr}(v)$: the end location of ship v, [$\bar{tr}(v)$∈TR]; (Boundary Conditions)
   ∀v∈$V^{DES}$, $\bar{tr}(v)$∈$TR^{LNG}$
   ∀v∈$V^{FOB}$, $\bar{tr}(v)$∈$TR^{REG}$
   ∀v∈$V^{ICH}$, $\bar{tr}(v)$∈$TR^{ICH}$
$TR^{LNG}(v)$: set of production terminals that ship v can visit, [$TR^{LNG}(v)$⊆$TR^{LNG}$]
$TR^{REG}(V)$: set of regasification terminals that ship v can visit, [$TR^{LNG}(v)$⊆$TR^{REG}$]
tr(jv): the production terminal that joint venture jv locates, [tr(jv)∈$TR^{LNG}$]
$tr^{LNG}(dc)$: the production terminal associated with contract dc, [$tr^{LNG}(dc)$∈$TR^{LNG}$]
$tr^{REG}(dc)$: the regasification terminal associated with contract dc, [$tr^{REG}(dc)$∈$TR^{REG}$]
TR(cm): set of regasification terminals where customer cm has contracts, [TR(cm)⊆$TR^{REG}$]

Distances
$RT(tr_1, tr_2)$: set of routes between terminals $tr_1$ and $tr_2$, [$RT(tr_1, tr_2)$⊆RT]
$rt^{ST\ D}(tr_1, tr_2)$: the standard route between terminals $tr_1$ and $tr_2$, [$rt^{ST\ D}(tr_1, tr_2)$∈RT $(tr_1, tr_2)$]
$RT^+(tr)$: set of outgoing routes from terminal tr, [$RT^+(tr)$⊆RT]
$RT^-(tr)$: set of incoming routes to terminal tr, [$RT^-(tr)$⊆RT]

Δt(rt, sp): the travelling time needed for route rt with speed sp

Ships
V(dc): set of ships that are compatible to contract dc, [V(dc)⊆V]
ST(v): set of states that ship v can take, [ST(v)⊆ST]
$\underline{st}(v)$: the start state for ship v, [$\underline{st}(v)$∈ST(v)]; (Boundary Conditions)
$\bar{st}(v)$: the end state for ship v, [$\bar{st}(v)$∈ST(v)]; (Boundary Conditions)
ST(v, tr): set of states that are compatible with ship v at terminal tr, [ST(v, tr)⊆ST(v)]
ST (v, sf): set of states that are compatible with ship v with fuel type sf; [ST(v, sf)⊆ST(v)]
$st^{STD}(v)$: the default state of ship v, [$st^{STD}(v)$∈ST(v)]
SP(v): set of speeds for ship v, [SP(v)⊆SP]
$sp^{STD}(v)$: the standard speed of ship v, [$sp^{STD}(v)$∈SP(v)]
SF(v): set of fuel types for ship v, [SF(v)⊆SF]
$sf^{ST\ D}(v)$: the standard fuel type of ship v, [$sf_{ST\ D}(v)$∈SF (v)]
SF(v, st): set of fuel types that are compatible with ship v and state st, [SF(v, st)⊆SF (v)]
ZL(v): set of loading cargo sizes for ship v, [ZL(v)⊆ZL]
Note: This set is specified in the input data.
$ZR(v, zl, tr_1, tr_2)$: set of arrival cargo sizes for ship v when it arrives at regasification terminal $tr_2$ from production terminal $tr_1$ with loading cargo size zl, [$ZR(v, zl, tr_1, tr_2)$⊆ZR]
Note: This set is derived from sp, sf and rt.
Letting loss(v, zl, sp, sf rt) be the boil-off and fuel usage associated with v, zl, sp, sf, rt from production terminals to regasification terminals,
$ZR(v, zl, tr_1, tr_2)$={zl−loss(v, zl, sp, sf, rt): ∀sp∈SP(v), ∀sf∈$∪_{st}$∈ST(v, $tr_2$)SF(v, st), ∀rt∈RT($tr_1, tr_2$)}
$ZR(v, tr_1, tr_2)$: set of arrival cargo sizes for ship v at regasification terminal $tr_2$ from production terminal $tr_1$
$ZR(v, tr_1, tr_2)$=$∪_{zl}$∈ZL(v)TR(v, zl, $tr_1, tr_2$)⊆ZR
ZR(v, tr): set of arrival cargo sizes for ship v at regasification terminal tr
ZR(v, tr)=$∪_{tr_1}$∈T $R^{LNG}(v)$TR(v, $tr_1$, tr)⊆ZR
ZR(v, zl, dc): set of arrival cargo sizes at for ship v when it delivers gas for contract dc with loading cargo size zl
ZR(v, zl, dc)=ZR(v, zl, $tr^{LNG}(dc), tr^{REG}(dc)$)⊆ZR
ZR(v, dc): set of arrival cargo sizes at for ship v when it delivers gas for contract dc
ZR(v, dc)=ZR(v, $tr^{LNG}(dc), tr^{REG}(dc)$)⊆ZR
zd(v, zr, sp, sf, st, rt): the discharging cargo size for ship v associated with v, zr, sp, sf, st, rt
Letting heel(v, zr, sp, sf, st, rt) be the heel reserve associated with v, zr, sp, sf, st, rt from re-gasification terminals to production terminals (including boil-off, fuel usage and the LNG amount which is necessary to keep the ship in the state st),
zd(v, zr, sp, sf, st, rt)=zr−heel(v, zr, sp, sf, st, rt)
SizePlan: set of feasible combinations of loading size and arrival size, [szP lan ∈SizePlan]
SizePlan(v, dc): set of size plans szPlan which are compatible with v and dc, [SizePlan(v, dc)⊆SizePlan]
szPlan=(zl, zr) with zl∈ZL(v) and zr∈ZR(v, zl, dc) for some v and dc.

Fiscal Regimes
fr(v): the default fiscal regime for ship v∈$V^{DES}$∪$V^{ICH}$, [fr(v)⊆FR]
Note: the default fr(v) is used to calculate costs during the time periods when no specific fiscal regime is associated to ship v.

FR(bfr): set of fiscal regimes associated with the base fiscal regime bfr∈BFR, [FR(bfr)⊆FR]

FR(jv): set of fiscal regimes assigned by jv∈JV, [FR(jv)⊆FR]

FR(dc): set of fiscal regimes that are compatible with contract dc∈DC. [FR(dc)∈FR]

$fr^P_{REC}$(fr): the fiscal regime that immediately precede fr, [$fr_{P\ REC}$(fr)∈FR]

Joint Ventures jv(fr): the joint venture associated with fiscal regime fr∈FR, [jv(fr)∈JV]

jv(dc): the joint venture associated with contract dc∈DC, [jv(dc)∈JV]

Storage Units

SU (jv): set of storage units for jv∈JV, [SU (jv)⊆SU]

SU (jv, g): set of storage units for jv∈JV and g∈G, [SU (jv, g)⊆SU (jv)]

Berths

B(v): set of berths that are compatible with ship v∈V, [B(v)⊆B]

B(jv, su): set of berths that can be used by (jv, su), jv∈JV, su⊆SU (jv), [B(jv, su)⊆B]

B(tr, st): set of berths that are compatible with terminal tr and state st, [B(tr, st)⊆B]

B(v, jv, su): set of berths that can be used by (v, jv, su), [B(v, jv, su)⊆B(jv, su)]

B(dc, g): set of berths that can be used by dc to discharge LNG in grade g, [B(dc, g)⊆B($tr^{REG}$(dc))]

B(v, dc, g): set of berths that are compatible with v, dc, g, [B(v, dc, g)⊆B($tr^{REG}$(dc), g)]

Contracts

DC(v): set of contracts that are compatible with v∈V, [DC(v)⊆DC]

DC(v, tr): set of contracts that are compatible with v and tr, [DC(v, tr)⊆DC(v)]

DC(jv): set of contracts that are signed by jv∈JV, [DC(jv)⊆DC]

DC(cm, tr, g): set of contracts that are compatible with (cm, tr, g), [DC(cm, tr, g)⊆DC]

Grades g(su): the energy grade of LNG at storage unit su∈SU, [g(su)∈G]

G(dc): set of energy grades of LNG that are required by contract dc∈DC, [G(dc) S G]

1.2 Time Windows

1.2.1 Notations

TW: set of all time windows, [tw∈TW]

Note:
Listed below are attributes that a time window tw might have.
Not all attributes are required to define the time window tw.

Ship attributes
V(tw): set of ships that are compatible with time window tw
v(tw): the ship that is specified in the time window tw
st(tw): the arrival state associated with the time window tw
$\underline{st}$(tw): the arrival state associated with the time window tw
$\overline{st}$(tw): the state associated with the time window tw Terminal attributes
tr(tw): the terminal that is specified in the time window tw Time period attributes
$t^{min}$(tw): the earliest start time of time window tw
$t^{max}$(tw): the latest start time of time window tw
t(tw): the start time of time window tw $\bar{t}$(tw): the end time of time window tw $\tilde{t}$(tw): the time duration to complete an operation in time window tw T(tw): set of time periods that are compatible with time window tw Contract attributes
JV(tw): set of joint ventures that are compatible with time window tw
jv(tw): the joint venture that is specified in the time window tw
FR(tw): set of fiscal regimes that are compatible with time window tw
fr(tw): the fiscal regimes that is specified in time window tw
DC(tw): set of contracts that are compatible with time window tw
dc(tw): the contract that is specified in the time window tw Delivery attributes
$\underline{\mu}$(tw): the minimum number of deliveries within time window tw
$\bar{u}$(tw): the maximum number of deliveries within time window tw
$\underline{q}$(tw): the minimum quantity of LNG within time window tw
$\tilde{q}$(tw): the target quantity of LNG within time window tw
$\bar{q}$(tw): the maximum quantity of LNG within time window tw
$\underline{zl}$(tw): the minimum loading cargo size specified in time window tw
$\overline{zl}$(tw): the maximum loading cargo size specified in time window tw
zl(tw): the loading cargo size specified in time window tw
ZL(tw): set of loading cargo sizes that are compatible with time window tw
g(tw): the LNG grade that is specified in time window tw
G(tw): set of LNG grades that are compatible with time window tw

1.2.2 Definitions

In this section, six categories of time windows are defined. Each category has its own data attributes which are listed after the definition. Except for the inclusive time windows, all time windows are explicitly expressed in the network either in the nodes or in the arcs.

Inclusive Time Windows
$TW^{IN}$: set of inclusive time windows [tw∈$TW^{IN}$] (Sheet "Ratability")
dc(tw), $\underline{t}$(tw), $\bar{t}$(tw), $\underline{q}$(tw), $\tilde{q}$(tw), $\bar{q}$(tw)
Note: Inclusive time windows will NOT be expressed in the network.

Exclusive Time Windows
$TW^{EX}$: set of exclusive time windows [tw∈TW] (Sheet "Windows")
dc(tw), $\underline{t}$(tw), $\bar{t}$(tw), $\underline{\mu}$(tw), $\bar{\mu}$(tw), $\underline{q}$(tw), $\bar{q}$(tw), ZL(tw)
Note: Exclusive time windows will be expressed in the arcs in the network.

Outcharter Time Windows
  $TW^{OCH}$: set of outcharter time windows $[tw \in TW^{OCH}]$ (Sheet "Outcharter")
  $V(tw), tr_1(tw), t_1(tw), st_1(tw), tr_2(tw), t_2(tw), st_2(tw)$.
  Description:
    $V(tw)$: set of ships that can be outcharted, $[V(tw) \subseteq V^{DES}]$
    $tr_1(tw), t_1(tw), st_1(tw)$: the outcharter should arrive at $tr_1(tw)$ at $t_1(tw)$ with state $st_1(tw)$
    $tr_2(tw), t_2(tw), st_2(tw)$: the outcharter will return from $tr_2(tw)$ at $t_2(tw)$ with state $st_2(tw)$
Maintenance Time Windows
  $TW^{MN}$: set of maintenance time windows $[tw \in TW^{MN}]$ (Sheet "Maintenance")
  $v(tw), tr(tw), \underline{t}^{min}(tw), \underline{t}^{max}(tw), \tilde{t}(tw), st(tw)$
  Description
    $v(tw)$: the ship that needs maintenance as specified in time window tw, $[v(tw) \in V^{DES}]$
    $tr(tw)$: the dry dock that the ship v will have maintenance, $[tr(tw) \in TR^{MN}]$
    $st(tw)$: the ship state when it returns from the dry dock, $[st(tw) \in ST']$
Diversion Time Windows
  $TW^{DI}$: set of diversion time windows $[tw \in TW^{DI}]$ (Sheet "Diversions")
  $V(tw), JV(tw), FR(tw), tr(tw), \underline{t}(tw), \overline{t}(tw), \underline{\mu}(tw), \mu(tw), \underline{q}(tw), \overline{q}(tw), \underline{zl}(tw), \overline{zl}(tw), G(tw)$
  $TW^{DIJV}$ set of diversions each of which requires cargos from the same jv; $[TW^{DIJV} \subseteq TW^{DI}]$
    $TW_{DIJV} = \{tw \in TW^{DI}: $ all cargos of tw need to be from the same jv$\}$
  $TW^{DIF\ R}$: set of diversions each of which requires cargos from the same fr; $[TW^{DIF\ R} \subseteq TW^{DI}]$
    $TW^{DIF\ R} = \{tw \in TW^{D1}: $ all cargos of tw need to be from the same fr$\}$
  $TW^{DIReg}$: set of diversions that do not have specific restrictions; $[TW^{DIReg} \subseteq TW^{DI}]$
    $TW^{DIReg} = \{tw \in TW^{DI}: $ cargos of tw can be from different jv and fr$\}$
  SizePlan$(v, tw^{DI})$: set of size plans szPlan which are compatible with v and $tw^{DI}$; [SizePlan$(v, tw^{DI}) \subseteq$ SizePlan]
  Note:
    Diversion optionality is considered for DES and ICH ships, i.e., $V(tw) \subseteq V^{DES} \cup V^{ICH}$.
    If a diversion is selected, then all its requirements need to be satisfied.
    $zl(v, tw, zr)$: the loading cargo size associated with arrival size zr for ship v and diversion tw
Coloading and Split Time Windows
  $TW^{CO}$: set of coloading and split time windows $[tw \in TW^{CO}]$ (Sheet "Complex-Windows")
  $\underline{\mu}(tw), \overline{\mu}(tw), dc_1(tw), \underline{t}_1(tw), \overline{t}_1(tw), zl_1(tw), g_1(tw), \rho_1(tw), dc_2(tw), \underline{t}_2(tw), \overline{t}_2(tw), zl_2(tw), g_2(tw), \rho_2(tw)$
  Description:
    $\underline{t}_1(tw), \overline{t}_1(tw), zl_1(tw), g_1(tw), \rho_1(tw)$: the earliest start time, latest end time, loading cargo size, LNG grade, and cost share of contract $dc_1(tw)$
    $\underline{t}_2(tw), \overline{t}_2(tw), zl_2(tw), g_2(tw), \rho_2(tw)$: the earliest start time, latest end time, loading cargo size, LNG grade, and cost share of contract $dc_2(tw)$
  Derived attributes:
    $tr^{LNG}(tw)$: the production terminal associated with tw
    $tr_1^{REG}(tw)$: the regasification terminal associated with contract $dc_1(tw)$
    $tr_2^{REG}(tw)$: the regasification terminal associated with contract $dc_2(tw)$
    $jv_1(tw)$: the joint venture associated with contract $dc_1(tw)$
    $jv_2(tw)$: the joint venture associated with contract $dc_2(tw)$
  Assumption:
    Coloading and split are allowed only for DES contracts, i.e., $dc_1(tw), dc_2(tw) \in DC^{DES}$.
    Coloading and split are allowed among no more than 2 contracts.
    Coloading can only occur at the same berth.
    Split can occur either at the same berth or at different locations.
    Contract dc1(tw) is always processed earlier than dc2(tw), i.e., the order is fixed.
    Standard speed, standard fuel and standard route are used for $tw \in TW^{CO}$.

1.2.3 Compatible Sets $TW^{EX}(dc)$: set of exclusive time windows that are compatible with dc, $[TW^{EX}(dc) \subseteq TW^{EX}]$
TW (v, t, dc, zl): set of exclusive time windows that are compatible with v, t, dc and zl
$TW^{EX}(v, t, dc, zl) = \{tw \in TW^{EX}(dc): v \in V(dc(tw))$,
  (Ship v is allowed for tw.)
  $t \in [\underline{t}(tw), \overline{t}(tw)] \cap T(v)$,
  (Time t is within time periods of tw.)
  dc=dc(tw),
  (Contract dc is specified in tw.)
  $zl \in ZL(tw) \cap ZL(v)$,
  (Loading size zl is allowed for tw.)$\}$
$TW^{EX}(v, t, dc, zr)$: set of exclusive time windows that are compatible with v, t, dc and zr
$TW^{EX}(v, t, dc, zr) = \{tw \in TW^{EX}(dc): v \in V(dc(tw))$,
  (Ship v is allowed for tw.)
  $t \in T(v)[\underline{t}(tw), \overline{t}(tw)] \cap T(v)$,
  (Time t is within time periods of tw.)
  dc=dc(tw),
  (Contract dc is specified in tw.)
  $zl(v, dc, zr) \in ZL(tw) \cap ZL(v)$,
  (Loading size zl(v, dc, zr) is allowed for tw.)$\}$ 2 Network 2.1 Nodes Parameters
  $\tau^{max}(tr_1, tr_2)$: maximum travel time periods between terminal $tr_1$ and $tr_2$
  $\tau^{min}(tr_1, tr_2)$: minimum travel time periods between terminal $tr_1$ and $tr_2$
  $\Delta^{wait}(w)$: maximum waiting time periods allowed for time window tw
  $\Delta^{op}$: maximum operating time periods among all ships at all compatible terminals operating=berthing(including cooling down time)+loading(discharging)+de-berthing
Attributes: v(n), t(n), tr(n), dc(n), g(n), zr(n), st(n), tw(n)
  v(n): ship associated with node n
  t(n): time period associated with node n
  tr(n): terminal associated with node n
  dc(n): contract associated with node n
  g(n): LNG energy grade associated with node n zr(n): arrival cargo size associated with node n st(n): ship state associated with node n
  tw(n): time window associated with node n, $[tw(n) \in TW^{DI} \cup TW^{CO} \cup TW^{OCH} \cup TW^{MN}]$
    Not all attributes are required to define a node n.

2.1.1 Dummy Nodes

Source nodes
$N^{SRC} = \{(v): \forall v \in V\}$
Sink nodes
$N^{SNK} = \{(v): \forall v \in V\}$
Description
   Each ship (including in-charters) has one individual source.
   Each ship (including in-charters) has one individual sink node.

2.1.2 Production Nodes $N^{LNG} = \{(v, t, tr, st): \forall v \in V, \forall t \in T(v), \forall tr \in TR^{LNG}(v), \forall st \in ST(v, tr)\}$
Description
   st: the state when the ship arrives at the production terminal
   This is required to calculate the cooling-down time.
   jv, su and b will be put in the outgoing arcs.
   sp,sf,rt and $tw \in TW^{EX}$ will be put in the outgoing arcs.
   Loading size zl is indicated by end nodes of the outgoing arcs.
   Fiscal regime fr is indicated by end nodes of the outgoing arcs.

2.1.3 Regasification Nodes $N^{REG} = \{(v, t, tr, dc, g, szPlan, fr): \forall v \in V, \forall t \in T(v), \forall tr \in TR^{REG}(v), \forall dc \in DC(v, tr), \forall g \in G(dc), \forall szPlan \in SizePlan(v, dc), \forall fr \in FR(dc)\}$
Description
   szPlan: the combination of loading size zl and arrival size zr
   This is required to calculate the discharging size and time.
   b will be put in the outgoing arcs.
   sp,sf,rt and $tw \in TW^{EX}$ will be put in the outgoing arcs.
   st is indicated by end nodes of the outgoing arcs.

2.1.4 Incharter Nodes

Incharters are treated as DES ships in the network with the following features:
   Their cost structures are more complicated than DES ships.
   Their available time periods are more restricted than DES ships.
   Incharters are only allowed for regular contracts, diversions and coloading and split.
   Incharters get into the system through production terminals.
   Incharters leave the system through regasification and diversion terminals.

2.13 Outcharter Nodes

Outcharter Nodes
$N^{OCH} = \{(tw, v, t, tr, st): \forall tw \in TW^{OCH}, \forall v \in V(tw), \forall t \in [\underline{t}_1(tw) - \Delta^{wait}, \underline{t}_1(tw)] \cap T(v), tr = tr_1(tw), st = st_1(tw)\}$
Note: The outcharter jobs are built into the outgoing arcs from tw.

2.1.6 Maintenance Nodes $N^{MN} = \{(tw, v, t, tr, st): \forall tw \in TW^{MN}, v = v(tw), \forall t \in [\underline{t}^{min}(tw) - \Delta^{wait}, \underline{t}^{max}(tw)] \cap T(v), tr = tr(tw), \forall st \in ST(v, tr)\}$
The maintenance jobs will be built in the outgoing arcs from tw.

2.1.7 Diversion Nodes $N^{DI} = \{(tw, v, t, tr, g, zr, fr): \forall tw \in TW^{DI} \forall v \in V(tw), \forall t \in [\underline{t}(tw) - \Delta^{wait}, \bar{t}(tw)] \cap T(v), tr = tr(tw), \forall g \in G(tw), \forall zr \in \bigcup_{zl \in [\underline{zl}(tw), \overline{zl}(tw)] \cap ZL(v)} TR(v, zl, tr), \forall fr \in FR(tw)\}$
Description
   Diversion time windows are treated similar as an SPA contracts in the network.
   Diversion nodes are treated similar as the regular regasification nodes in the network. sp,sf,st and rt will be put in the outgoing arcs.

2.1.8 Coloading and Split Nodes

Notations: $\forall tw \in TW^{CO}$
the earliest time that the ship needs to arrive the production terminal for coloading
$\underline{t}^{ARR}(tw) = \underline{t}_1(tw) - \Delta^{wait}(tw) - \tau^{max}(tr^{LNG}(dc_1(tw)), tr^{REG}(dc_1(tw)))) - \Delta^{op} - \Delta^{wait}(tw)$
the latest time that the ship needs to arrive the production terminal for coloading
$\bar{t}^{ARR}(tw) = \underline{t}_2(tw) - \tau^{min}(tr^{REG}(dc_1(tw)), tr^{REG}(dc_2(tw))) - \tau^{min}(tr^{LNG}(dc_1(tw)), tr^{REG}(dc_1(tw)))$
$ZR_1(tw)$: set of potential cargo sizes when the ship arrives at the terminal of $dc_1(tw)$.
$ZR_2(tw)$: set of potential cargo sizes when the ship arrives at the terminal of $dc_2(tw)$.
$ZD_1(tw)$: set of potential discharging cargo sizes for $dc_1(tw)$.
$ZD_2(tw)$: set of potential discharging cargo sizes for $dc_2(tw)$.
Notes:
   $ZR_1(tw)$, $ZR_2(tw)$, $ZD_1(tw)$ and $ZD_2(tw)$ will be calculated approximately.
   Cost will be allocated between $fr_1(tw)$ and $fr_2$ according to predefined ratios $\rho_1$ and $\rho_2$.
Coloading nodes
   $N^{CL} = \{(tw, v, t, tr, st): \forall tw \in TW^{CO}, \forall v \in V(tw), \forall t \in [\underline{t}^{ARR}(tw), \bar{t}^{ARR}(tw)] \cap T(v), tr = tr^{LNG}(dc(tw)), \forall st \in ST(v, tr)\}$
   st is the state when the ship arrives at the production terminal.
   st is used to calculate the time for cooling down.
   The coloading operations will be built in the coloading arcs.
Split nodes for $dc_1(tw)$
   $N^{CD1} = \{(tw, v, t, tr, dc, g, zr, fr, st): \forall tw \in TW^{CO}, \forall v \in V(tw), \forall t \in [\underline{t}_1(tw) - \Delta^{wait}, \bar{t}_1(tw)] \cap T(v), tr = tr^{REG}(dc_1(tw)), dc = dc_1(tw), g = g_1(tw), \forall zr \in ZR_1(tw) = ZR(v, zl_1(tw), dc_1(tw)), fr = FR(dc_1), \forall st \in ST(v, s^{STD}(v))\}$
   st is the state when the ship returns to production terminals later.

The discharging size for $dc_1(tw)$ is approximately calculated as if standard speed, fuel and route are used in the remaining voyages to $tr_2(tw)$ and back to production terminals.

Split nodes for $dc_2(tw)$ $N^{CD2} = \{(tw, v, t, tr, dc, g, zr, fr, st): \forall tw \in TW^{CO},$
$\forall v \in V(tw), \forall t \in [\underline{t}_2(tw) - \Delta^{wait}, \overline{t}_2(tw)] \cap$
$T(v), tr = tr^{REG}(tw)$
$dc = dc_2(tw), g = g_2(tw), \forall zr \in ZR^2(tw),$
$fr = FR(dc_2), \forall st \in ST(v, sf^{STD}(v))\}$ st is the state when the ship returns to production terminals later.

The discharging size for $dc_2(tw)$ can be calculated more accurately than that for $dc_1(tw)$.

2.1.9 Compatible Sets

N: set of all nodes, $[n \in N]$
$N^{F \, OB}$: set of nodes associated with FOB ships, $[n \in N^{F \, OB}]$
$N^{DES}$: set of nodes associated with DES ships, $[n \in N^{DES}]$
$N^{ICH}$: set of nodes associated with ICH ships, $[n \in N^{ICH}]$
$N^{LNG}$: set of nodes associated with production terminals, $[n \in N^{LNG}]$
$N^{REG}$: set of nodes associated with regasification terminals, $[n \in N^{REG}]$
N (v): set of nodes for ship v, $[N(v) \subseteq N]$
$N^{LNG}(v)$: set of production nodes for ship v, $[N_{LNG}(v) \subseteq N(v)]$
$N^{REG}(v)$: set of regasification nodes for ship v, $[N^{REG}(v) \subseteq N(v)]$

2.2 Arcs

A: set of all arcs $[a \in A]$

Operating and travelling arcs
  Definition: $(n^{from}, n^{to}, jv(optional), su(optional), b, sp, sf, rt, tw \in TW^{EX \, (optional)})$
  Time attributes: $\tau 0/a, \tau 1/a, \tau 2/a, \tau 3/a, \tau 2/a, T_a^{OP}, T_a^{BT}$
    $\tau_a^0$: time to start berthing and cooling down, $\tau 0/a = t(n^{from})$
    $\tau_a^1$: time to start operating (loading, discharging, outchartering or maintaining)
    $\tau_a^2$: time to start de-berthing
    $\tau_a^3$: time to start departing
    $\tau_a^4$: time of arriving at destination, $\tau_a^4 = t(n^{to})$
    $T_a^{OP}$: set of time periods on which the arc α is operating, $T_a^{OP} = \{\tau_a^1 + 1, \ldots, \tau_a^2\}$
    $T_a^{BT}$: set of time periods on which the arc α is occupying a berth, $T_a^{BT} = \{\tau_a^0 + 1, \ldots, \tau_a^3\}$
  Terminal attributes: $jv_a, su_a, b_a$
    $jv_a$: the joint venture associated with arc a
    $su_a$: the storage unit associated with arc a
    $b_a$: the berth associated with arc a
  Size attributes: $zl_a, zd_a, \tilde{\alpha}_a, t, \tilde{\beta}_a, t, \tilde{q}_a, \tilde{ql}_a$
    $zl_a$: loaded cargo size at production nodes associated with arc a
    $zd_a$: discharged size at regasification nodes associated with arc a
    $\tilde{\alpha}_{a,t}$: loaded amount associated arc a during time period t
    $\tilde{\beta}_{a,t}$: discharged amount associated with arc a during time period t
    $\tilde{q}_a$: sold energy quantity associated with zl or zd for arc a
    $\tilde{ql}_a$: loaded energy quantity associated with zl or zl(v, dc, zr)/zl(v, tw, zr) for arc a Cost attributes: $fr_a, tax_a, share_a^{IOC}, share_a^{NOC}, Rev_a, Roy_a, Shp_a$
    $fr_a$: the fiscal regime associated with the arc
      $fr_a = fr(v(n^{from}))$ if none of $n^{from}$ and $n^{to}$ has specified fr
    $tax_a$: tax rate associated with the arc
    $share_a^{IOC}$: share of the specific organization associated with the arc
    $share_a^{NOC}$: share of the non-specific organization associated with the arc
    $Rev_a$: revenue achieved by the arc
    $Roy_a$: royalty associated with the arc
    $Shp_a$: shipping cost associated with the arc Note:
All attributes can be calculated based on $n^{from}, n^{to}, b, sp, sf, rt$ in the definition.
Attributes can be optional for some arcs.
An arc is created only if its nodes and attributes are compatible!!!
  Time compatibility: $\tau_a^4 | \tau_a^3 = \Delta t(rt, sp)$
Waiting arcs
  Definition $(n^{from}, n^{to})$

2.2.1 Dummy Arcs $A^{SRC}$: set of arcs from source nodes to destination nodes, i.e., $n^{from} \in N^{SRC}$
  $A^{SRC} = \{(n^{from}, n^{to}): \forall v \in V^{DES} \cup V^{F \, OB},$
  $n^{from} = n^{SRC}(v),$
  $\forall n^{to} \in \{n \in N^{LNG}(v): v(n) = v, t(n) = t(v), tr(n) \in TR(v), st(n) \in ST(v)\}$
  $\cup \{(n^{from}, n^{to}, sp, sf, rt): \forall v \in V^{ICH},$
  $n^{from} = n^{SRC}(v),$
  $\forall tr^{from} \in TR(v), \forall tr^{to} \in TR^{LNG}(v), \forall rt \in RT(tr^{from}, tr^{to}),$
  $\forall st \in ST(v), \forall sp \in SP(v), \forall sf \in SF(v, st)$
  $\forall n^{to} \in \{n \in N^{LNG}(v): v(n) =, t(n) = t(v) + \Delta t(rt, sp), tr(n) = tr^{to}, st(n) = st\}$ All ships get into the system through production terminals with initial information.

$A^{SNK}$: set of arcs sink nodes, i.e., $n^{to} \in N^{SNK}$
  $A^{SRC} = \{(n^{from}, n^{to}): \forall v \in V^{DES},$
  $n^{to} = n^{SNK}(v),$
  $\forall n^{from} \in \{n \in N^{LNG}(v): v(n) = v, t(n) \geq \overline{t}(v), tr(n) \in TR(v), st(n) \in ST(v)\}$
  $\cup \{(n^{from}, n^{to}): \forall v \in V^{FOB},$
  $n^{to} = n^{SNK}(v),$
  $\forall n^{from} \in \{n \in N^{REG}(v): v(n) = v, t(n) \geq \overline{t}(v), tr(n) \in TR^{REG}(v)\},$
  $\cup \{(n^{from}, n^{to}, b, sp, sf, rt, st): \forall v \in V^{ICH},$
  $n^{to} = n^{SNK}(v),$
  $\forall tr^{from} \in TR^{REG}(v), \forall b \in B^{tr^{from},v},$
  $\forall tr^{to} \in TR(v), \forall rt \in RT(tr^{from}, tr^{to}),$
  $\forall st \in ST(v), \forall sp \in SP(v), \forall sf \in SF(v, st)$
  $\forall n^{to} \in \{n \in N^{REG}(v): v(n) = v, t(n) \leq \overline{t}(v) - \Delta t(rt, sp), tr(n) = tr^{from}\}$ DES ships leave the system through production terminals.
FOB ships leave the system through regasification terminals.
Incharters leave the system through regasification terminals.

$A^{SRC \to SNK}$: set of dummy arcs from source nodes to sink nodes for incharters
  $A^{SRC \to SNK} = \{(n^{from}, n^{to}): n^{from} = N^{SRC}(v), n^{to} = n^{SNK}(v),$
  $\forall v \in V^{ICH}\}$ Note:
The nodes with $t(n) \in T^{EXT}$ can be connected with sinks.
From now on, all arcs we define at below start from nodes with $t(n) \in T^{P\ LAN}$.
The arcs we define at below may still end at nodes with $t(n) \in T^{EXT}$.

2.2.2 Arcs from Production Nodes $A^{LNG \rightarrow REG}$: set of arcs from production nodes to regasification nodes
$A^{LNG \rightarrow REG} = *\{(n^{from}, n^{to}, jv, su, b, sp, sf, rt, tw^{EX}):$
$\forall n^{from} = (v, t^{from}, tr^{from}, st) \in N^{LNG} \cap N^{FOB},$
$n^{to} = (v, t^{to}, tr^{to}, dc, g, zr, fr) \in N^{REG},$
$jv = jv(dc), \forall su \in SU\ (jv, g), \forall b \in B(v, jv, su),$
$\forall sp \in SP(v), \forall sf \in SF(v), \forall rt \in RT(tr^{from}, tr^{to}),$
$\forall tw^{EX} \in TW^{EX}(v, \tau^1_a, dc, zl_a)\}$
$\cup \{(n^{from}, n^{to}, jv, su, b, sp, sf, rt):$
$\forall n^{from} = (v, t^{from}, tr^{from}, st) \in N^{LNG} \cap \{N^{DES} \cup N^{ICH}\},$
$n^{to} = (v, t^{to}, tr^{to}, dc, g, zr, fr) \in N^{REG},$
$jv = jv(dc), \forall su \in SU\ (jv, g), \forall b \in B(v, jv, su)$
$\forall sp \in SP(v), \forall sf \in SF(v), \forall rt \in RT(tr^{from}, tr^{to})\}$
$A^{LW\ AIT}$: set of waiting arcs at production terminals
$A^{LW\ AIT} = \{(n^{from}, n^{to}): \forall n^{from} = (v, t, tr, st) \in N^{LNG},$
$n^{to} = (v, t+1, tr, st) \in N^{LNG}\}$

2.2.3 Arcs from Regasification Nodes $A^{REG \rightarrow LNG}$: set of arcs from regasification terminals to production terminals
$A^{REG \rightarrow LNG} = *\{(n^{from}, n^{to}, b, sp, sf\ rt):$
$\forall n^{from} = (v, t^{from}, tr^{from}, dc, g, zr, fr) \in N^{REG} \cup N^{F\ OB},$
$n^{to} = (v, t^{to}, tr^{to}, st) \in N^{LNG}, \forall b \in B(dc, g) \cap B(v),$
$\forall sp \in SP(v), \forall sf \in SF(v, st), \forall rt \in RT(tr^{from}, tr^{to})\}$
$\cup \{(n^{from}, n^{to}, b, sp, sf, rt, tw^{EX}):$
$\forall n^{from} = (v, t^{from}, tr^{from}, dc, g, zr, fr) \in N^{REG} \cap \{N^{DES} \cup N^{ICH}\}, n^{to} = (v, t^{to}, tr^{to}, st) \in N^{LNG},$
$\forall b \in B(dc, g) \cap B(v),$
$\forall sp \in SP(v), \forall sf \in SF(v, st), \forall rt \in RT(tr^{from}, tr^{to}),$
$\forall tw^{EXs} \in TW^{EX}(v, \tau^1_a, dc, zr_a)\}$
$A^{RW\ AIT}$: set of waiting arcs at regasification terminals
$A^{RW\ AIT} = \{(n^{from}, n^{to}): \forall n^{from} = (v, t, tr, dc, g, zr, fr) \in N^{REG},$
$n^{to} = (v, t+1, tr, dc, g, zr, ft) \in N^{REG}\}$

2.2.4 Incharter Arcs

Incharters are treated as DES ships in the network.
$A^{ICH}$: set of all arcs for incharters
$A^{ICH}(v)$: set of arcs for incharter $v \in V^{ICH}$

2.2.5 Outcharter Arcs $A^{REG \rightarrow OCH}$: set of arcs from regasification nodes to outcharter nodes
$A^{REG \rightarrow OCH} = \{(n^{from}, n^{to}, b, sp, sf\ rt, tw^{EX}):$
$\forall n^{to} = (tw, v, t^{to}, tr_1(tw), st_1(tw)) \in N^{OCH},$
$n^{from} = (V, t^{from}, tr^{from}, dc, g, zr, fr) \in N^{REG} \cap N^{DES},$
$b \in B(dc, g) \cap B(v),$
$\forall sp \in SP(v), \forall sf \in SF(v, st_1(tw)), \forall rt \in RT(tr^{from}, tr_1(tw)),$
$\forall tw^{EX} \in TW^{EX}(v, \tau^1_a, dc, zr_a)\}$ $A^{OCH \rightarrow LNG}$: set of arcs for outcharter nodes to production nodes
$A^{OCH \rightarrow LNG} = \{(n^{from}, n^{to}, b, sp, sf, rt):$
$\forall n^{from} = (tw, v, t_1(tw), tr_1(tw), st_1(w)) \in N^{OCH},$
$n^{to} = (v, t^{to}, tr^{to}, st_2(tw)) \in N^{LNG} \cap N^{DES},$
$b \in B(tr_2(tw), st_2(tw)) \cap B(v),$
$\forall sp \in SP(v), \forall sf \in SF(v, st_2(tw)), \forall rt \in RT(tr_2(tw), tr^{to})\}$
$A^{OW\ AIT}$: set of waiting arcs for outcharters
$A^{OW\ AIT} = \{(n^{from}, n^{to}): \forall n^{from} = (tw, v, t, tr, st) \in N^{OCH},$
$n^{to} = (tw, v, t+1, tr, st) \in N^{OCH}\}$

2.2.6 Maintenance Arcs $A^{REG \rightarrow MN}$: set of arcs from regasification nodes to maintenance nodes
$A^{REG \rightarrow MN} = \{(n^{from}, n^{to}, b, sp, sf\ rt, tw^{EX}):$
$\forall n^{to} = (tw, v(tw), t^{to}, tr(tw), st) \in N_{MN},$
$n^{from} = (v(tw), t^{from}, tr^{from}, dc, g\ zr, fr) \in N^{REG} \cap N^{DES},$
$\forall b \in B(dc, g) \cap B(v),$
$\forall sp \in SP(v), \forall sf \in SF(v, st), \forall rt \in RT(tr^{from}, tr^{to})$
$\forall tw^{EX} \in TW^{EX}(v(tw), \tau^1_a, dc, zr_a)\}$
$A^{MN \rightarrow LNG}$: set of arcs from maintenance nodes to production nodes
$A^{MN \rightarrow LNG} = \{(n^{from}, n^{to}, b, sp, sf\ rt):$
$\forall n^{from} = (tw, v(tw), t^{from} \geq t^{min}(tw), tr(tw), st(tw)) \in N^{MN},$
$n^{to} = (v(tw), t^{to}, tr^{to}, st(tw)) \in N^{LNG} \cap N^{DES},$
$\forall b \in B(tr(tw), st(tw)) \cap B(v),$
$\forall sp \in SP(v), \forall sf \in SF(v, st(tw)), \forall rt \in RT(tr(tw), tr^{to})\}$
$A^{MW\ AIT}$: set of waiting arcs for maintenance time windows
$A^{MW\ AIT} = \{(n^{from}, n^{to}): \forall n^{from} = (tw, v, t, tr) \in N^{MN},$
$n^{to} = (tw, v, t+1, tr) \in N^{MN}\}$

2.2.7 Diversion Arcs $A^{LNG \rightarrow DI}$: set of arcs from production nodes to diversion nodes
$A^{LNG \rightarrow DI} = \{(n^{from}, n^{to}, jv, su, b, sp, sf, rt):$
$\forall n^{to} = (tw, v, t^{to}, tr(tw), g, zr, fr) \in N^{DI},$
$n^{from} = (v, t^{from}, tr^{from}, st) \in N^{LNG} \cap N^{DES},$
$\forall jv \in jv(fr), \forall su \subseteq SU\ (jv, g), \forall b \in B(jv, su) \cap B(v),$
$\forall sp \in SP(v), \forall sf \in SF(v), \forall rt \in RT(tr^{from} \cdot tr(tw))\}$
$A^{DI \rightarrow LNG}$: set of arcs from diversion nodes to production nodes
$A^{DI \rightarrow LNG} = \{(n^{from}, n^{to}, b, sp, sf, rt):$
$\forall n^{from} = (tw, v, t^{from} \geq t(tw), tr(tw), g, zr, fr) \in N^{DI},$
$n^{to} = (v, t^{to}, tr^{to}, st) \in N^{LNG} \cap N^{DES},$
$\forall b \in B(tr(tw)) \cap B(v),$
$\forall sp \in SP(v), \forall sf \in SF(v, st), \forall rt \in RT(tr(tw), tr^{to})\}$
$A^{DW\ AIT}$: set of waiting arcs for diversion time windows
$A^{DW\ AIT} = \{(n^{from}, n^{to}): \forall n^{from} = (tw, v, t, tr(tw), g, zr, fr) \in N^{DI},$
$n^{to} = (tw, v, t+1, tr(tw), g, zr, fr) \in N^{DI}\}$

2.2.8 Coloading and Split Arcs $A^{REG \rightarrow CL}$: set of arcs from regasification nodes to coloading nodes
$A^{REG \rightarrow CL} = \{(n^{from}, n^{to}, b, sp, sf\ rt):$
$\forall n^{to} = (tw, v, t^{to}, tr^{LNG}(tw), st) \in N^{CL},$
$n^{from} = (v, t^{from}, tr^{from}, dc, g, zr, fr) \in N^{REG} \cap \{N^{DES} \cup N^{ICH}\},$
$\forall b \in B(dc, g) \cap B(v),$
$\forall sp \in SP(v), \forall sf \in SF(v), \forall rt \in RT(tr^{from}, tr^{LNG}(tw))\},$ $A^{CL \rightarrow CD1}$: set of arcs from coloading nodes to first contracts $A^{CL \rightarrow CD1} = \{(n^{from}, n^{to}, jv_1, su_1, jv_2, su_2, b, sp, sf, rt):$
$\forall n^{from} = (tw, v, t^{from}, tr^{LNG}(tw), st^{from}) \in N^{CL},$
$n^{to} = (tw, v, t^{to}, tr_1^{REG}(tw), dc_1(tw), g_1(tw), zr, fr_1(tw), st^{to}) \in N^{CD1},$
$jv_1 = jv_1(tw), \forall su_1 \in SU(jv_1(tw), g_1(tw)),$
$jv_2 = Jv_2(tw), \forall su_2 \in SU(jv_2(tw), g_2(tw)),$
$\forall b \in B(jv_1, su_1) \cap B(jv_2, su_2) \cap B(v),$
$sp = sp^{STD}(v), sf = sf^{STD}(v), rt = rt^{STD}(tr^{LNG}(tw), tr_1^{REG}(tw))\}$ $A^{CD1 \rightarrow CD2}$: set of arcs from first contracts to second contracts $A^{CD1 \rightarrow CD2} = \{(n^{from}, n^{to}, b, sp, sf, rt):$
$\forall n^{from} = (tw, v, t^{from} \geq t_1(tw), tr_1^{REG}(tw),$
$dc_1(tw), g_1(tw), zr^{from}, fr_1(tw), st^{to}) \in N^{CD1},$
$n^{to} = (tw, v, t^{to}, tr_2^{REG}(tw), dc_2(tw), g_2(tw), zr^{to}, fr_2(tw), st^{to}) \in N^{CD1},$
$\forall b \in B(dc_1(tw), g_1(tw)) \cap B(v),$
$sp = sp^{STD}(v), sf = sf^{STD}(v), rt = rt^{STD}(tr_1^{REG}(tw), tr_2^{REG}(tw))\}$ $A^{CD2 \rightarrow LNG}$: set of arcs from second contracts to production nodes $A^{CD2 \rightarrow LNG} = \{(n^{from}, n^{to}, b, sp, sf, rt):$
$\forall n^{from} =$
$(tw, v, t^{from}, tr_2^{REG}(tw), dc_2(tw), g_2(tw), zr, fr_2(tw), st^{to})) \in N_{CD2},$
$n^{to} = (v, t^{to}, tr^{to}, st^{to}) \in N^{LNG} \cap (N^{DES} \cup N^{ICH}).$
$\forall b \in B(dc2(tw), g\ 2(tw)) \cap B(v),$
$sp = sp^{STD}(v), sf = sf^{STD}(v), rt = rt^{ST}(tr_2^{REG}(tw), tr^{to})\}$ $A^{CW\ AIT}$: set of waiting arcs for coloading and split $ACOW\ AIT = \{(n^{from}, n^{to}): \forall n^{from} = (tw, v, t, tr, st) \in N^{CL},$
$n^{to} = (tw, v, t+1, tr, st) \in N^{CL}\}$
$\cap \{(n^{from}, n^{to}): \forall n^{from} = (tw, v, t, tr, dc, g, zr, fr, st) \in N^{CD1}, n^{to} = (tw, v, t+1, tr, dc, g, zr, fr, st) \in N^{CD1}\}$
$\cap \{(n^{from}, n^{to}): \forall n^{from} = (tw, v, t, tr, dc, g, zr, fr, st) \in N^{CD2}, n^{to} = (tw, v, t+1, tr, dc, g, zr, fr, st) \in N^{CD2}\}$ 2.2.9 Arcs Between Time Windows Listed below are the type of connections between different time windows
- outcharter→outcharter
- outcharter→maintenance
- outcharter→coloading and split
- maintenance→outcharter
- maintenance→coloading and split
- diversion→outcharter
- diversion→maintenance
- diversion→coloading and split
- coloading and split→outcharter
- coloading and split→maintenance
- coloading and split→coloading and split $A^{OCH \rightarrow OCH}$: set of arcs between different outcharter time windows $A^{OCH \rightarrow OCH} = \{(n^{from}, n^{to}, b, sp, sf\ rt):$
$\forall n^{from} = (tw^{from}, v, t_1(tw^{from}), tr_1(tw^{from}), st_1(tw^{from}), \in N^{OCH},$
$n^{to} = (tw^{to} \neq tw^{from}, v, t^{to}, tr_1(tw^{to}), st_2(tw^{from})) \in N^{OCH},$
$\forall b \in B(tr_2(tw^{from}), st_2(tw^{from})) \cap B(v),$
$\forall sp \in SP(v), \forall sf \in SF(v, st_2(tw^{from})), \forall rt \in RT(tr_2(tw^{from}), tr_1(tw^{to}))\}$ $A^{OCH \rightarrow MN}$: set of arcs from outcharter time windows to maintenance time windows $A^{OCH \rightarrow MN} = \{(n^{from}, n^{to}, b, sp, sf, rt):$
$\forall n^{from} = (tw^{from}, v, t_1(tw^{from}), tr_1(tw^{from}), st_1(tw^{from}), \in N^{OCH},$
$n^{to} = (tw^{to}, v, t^{to}, tr^{LNG}(tw^{to}), st_2(tw^{from})) \in N^{MN},$
$\forall b \in B(tr_2(tw^{from}), st_2(tw^{from})) \cap B(v),$
$\forall sp \in SP(v), \forall sf \in SF(v, st_2(tw^{from})), \forall rt \in RT(tr_2(tw^{from}), tr(tw^{to}))\}$ $A^{OCH \rightarrow CO}$: set of arcs from outcharter time windows to coloading and split time windows $A^{OCH \rightarrow CL} = \{(n^{from}, n^{to}, b, sp, sf, rt):$
$\forall n^{from} = (tw^{from}, v, t_1(tw^{from}), tr_1(tw^{from}), st_1(tw^{from})) \in N^{OCH},$
$n^{to}\ (tw^{to}, v, t^{to}, tr^{LNG}(tw^{to}), st_2(tw^{from}) \in N^{CL},$
$\forall b \in B(tr_2(tw^{from}), st_2(tw^{from})) \cap B(v),$
$\forall sp \in SP(v), \forall sf \in SF(v, st_2(tw^{from})), \forall rt \in RT(tr_2(tw^{from}), t^{LNG}(tw^{to}))\}$ $A^{MN \rightarrow OCH}$: set of arcs from maintenance time windows to outcharter time windows $A^{MN \rightarrow OCH} = \{(n^{from}, n^{to}, b, sp, sf, rt):$
$\forall n^{from} = (tw^{from}, v, t(tw^{from}), tr(tw^{from}), st) \in N^{MN},$
$n^{to} = (tw^{to}, v, t^{to}, tr_1(tw^{to}), st(tw^{from})) \in N^{OCH},$
$\forall b \in B(tr(tw^{from}), st(tr^{from})) \cap B(v),$
$\forall sp \in SP(v), \forall sf \in SF(v, st(tw^{from})), \forall rt \in RT(tr(tw^{from}), tr_1(tw^{to}))\},$ $A^{MN \rightarrow CL}$: set of arcs from maintenance time windows to coloading and split time windows $A^{MN \rightarrow CL} = \{(n^{from}, n^{to}, b, sp, sf, rt):$
$\forall n^{from} = (tw^{from}, v, t(tw^{from}), tr(tw^{from}), st) \in N^{MN},$
$n^{to} = (tw^{to}, v, t^{to}, tr^{LNG}(tw^{to}), st(tw^{from})) \in N^{CL},$
$\forall b \in B(tr(tw^{from}), st(tw^{from})) \cap B(v),$
$\forall sp \in SP(v), \forall sf \in SF(v, st(tw^{from})), \forall rt \in RT(tr(tw^{from}), tr^{LNG}(tw^{to}))\}$ $A^{DI \rightarrow CH}$: set of arcs from diversion time windows to outcharter time windows $A^{DI \rightarrow OCH} = \{(n^{from}, n^{to}, b, sp, sf\ rt):$
$\forall n^{from} = (tw^{from}, v, t^{from} \geq t(tw^{from}), tr(tw^{from}), g, zr, fr) \in N^{DI},$
$n^{to} = (tw^{to}, v, t^{to}, tr_1(tw^{to}), st_1(tw^{to})) \in N^{OCH},$
$\forall b \in B(tr(tw^{from}), st_1(tw^{to})) \cap B(v),$
$\forall sp \in SP(v), \forall sf \in SF(v, st_1(tw^{to})), \forall rt \in RT(tr(tw^{from}), tr_1(tw^{to}))\}$ $A^{DI \rightarrow MN}$: set of arcs from diversion time windows to maintenance time windows $A^{D \rightarrow MN} = \{(n^{from}, n^{to}, b, sp, sf, rt):$
$\forall n^{from} = (tw^{from}, v, t^{from} \geq t(tw^{from}), tr(tw^{from}), g, zr, fr) \in N^{DI},$
$n^{to} = (tw^{to}, v, t^{to}, tr(tw^{to}), st) \in N^{MN},$
$\forall b \in B(tr(tw^{from}), st) \cap B(v),$
$\forall sp \in SP(v), \forall sf \in SF(v, st), \forall rt \in RT(tr(tw^{from}), tr(tw^{to}))\}$ $A^{DI \rightarrow CL}$: set of arcs from diversion time windows to coloading and split time windows $A^{DI \rightarrow CL} = \{(n^{from}, n^{to}, b, sp, sf\ rt):$
$\forall n^{from} = (tw^{from}, v, t^{from} \geq t(tw^{from}), tr(tw^{from}), g, zr, fr) \in N^{DI},$
$n^{to} = (tw^{to}, v, t^{to}, tr^{LNG}(tw^{to}), st)) \in N^{CL},$
$\forall b \in B(tr(tw^{from}), st) \cap B(v),$
$\forall sp \in SP(v), \forall sf \in SF(v, st), \forall rt \in RT(tr(tw^{from}), tr^{LNG}(tw^{to}))\}$ $A^{CD2 \rightarrow OCH}$: set of arcs from coloading and split time windows to outcharter time windows $A^{CD2 \rightarrow OCH} = \{(n^{from}, n^{to}, b, sp, sf\ rt):$
$\forall n^{from} = (tw^{from}, v, t^{from} \geq t_2(tw^{from}), tr_2^{REG}(tw^{from}),$
$dc_2(tw^{from}), g_2(tw^{from}), zr, fr_2(tw^{from}), st^{to}) \in N^{CD2},$
$n^{to} = (tw^{to}, v, t^{to}, tr_1(tw^{to}), st^{to}) \in N^{OCH},$
$\forall b \in B(tr_2^{REG}(tw^{from}), st^{to}) \cap B(v),$ sp=sp$^{STD}$(v), sf=sf$^{STD}$(v), rt
=rt$^{STD}$(tr$_2$$^{REG}$(tw$^{from}$), tr$_1$(tw$^{to}$))}

A$^{CD2 \to MN}$: set of arcs from coloading and split time windows to maintenance time windows A$^{CD2 \to MN}$={(n$^{from}$, n$^{to}$, b, sp, sf rt):
∀n$^{from}$=(tw$^{from}$, v, t$^{from}$≥
t$_2$(tw$^{from}$), tr$_2$$^{REG}$(tw$_{from}$),
dc$_2$(tw$^{from}$), g$_2$(tw$^{from}$), zr, fr$_2$(tw$^{from}$, st$^{to}$)∈N$^{CD2}$,
n$^{to}$=(tw$^{to}$, v, t$^{to}$, tr(tw$^{to}$), st$^{to}$)∈N$^{MN}$,
∀b∈B(tr$_2$$^{RED}$(tw$^{from}$), st$^{to}$)∩B(v),
sp=sp$^{STD}$(v), sf=sf$^{STD}$(v), rt
=rt$^{STD}$(tr$_2$$^{REG}$(tw$^{from}$), tr(tw$^{to}$))}

A$^{CD2 \to CL}$: set of arcs between coloading and split time windows

A$^{CD2 \to CL}$={(n$^{from}$, to, b, sp, sf, rt):
∀n$^{from}$=(tw$^{from}$, v, t$^{from}$≥
t$_2$(tw$^{from}$), tr$_2$$^{REG}$(tw$^{from}$),
dc$_2$(tw$^{from}$), g$_2$(tw$^{from}$), zr, fr$_2$(tw$^{from}$, st$^{to}$)∈N$^{CD2}$,
n$^{to}$=(tw$^{to}$, v, t$^{to}$, tr$^{LNG}$(tw$^{to}$), st$^{to}$)∈N$^{CL}$,
∀b∈B(tr$_2$$^{REG}$(tw$^{from}$), st$^{to}$)∩B(v),
sp=sp$^{STD}$(v), sf=sf$^{STD}$(v), rt
=rt$^{STD}$(tr$_2$$^{REG}$(tw$^{from}$),
tr$^{LNG}$(tw$^{to}$))}

3 Modeling

3.1 Notations

3.1.1 Sets

Note: See Section 1 for basic indexes and sets.

$\delta^+(n)$: set of outgoing arcs from node n;
$\delta^-(n)$: set of incoming arcs to node n;
ξ(jv, su, t): set of arcs that are loading gas from (jv, su) during time period t;
ξ(cm, tr, g, t): set of arcs that are discharging gas for (cm, tr, g) during time period t;
ξ(b, t): set of arcs that are occupying berth b∈B$^{LNG}$ during time period t;
ξ(v): set of arcs that associate with ship v;
ξ(dc): set of arcs that discharge(load) gas to the contract dc∈DC$^{DES}$(DC$^{F\ OB}$);
ξ(tw): set of arcs that contribute to time window tw∈TW$^{DI}$;
ξ(tw, jv): set of arcs that are discharging gas for diversion tw∈TW$^{DI}$ from joint venture jv;
ξ(tw, fr):set of arcs that are discharging gas for diversion tw∈TW$^{DI}$ from fiscal regime fr;
ξ(bfr): set of arcs associated with base fiscal regime bfr;
A$^{F\ RSUCC}$: set of billing arcs whose fiscal regime is the immediate successor of some other fiscal regimes;
ξ$^{RP\ REC}$(a): set of billing arcs whose fiscal regime is the immediate predecessor of the fiscal regime fra;

Note: Billing arcs are loading arcs for FOB contracts and discharging arcs for DES contracts.

3.1.2 Parameters p$_{jv,su,t}$: production of (jv, su) during time period t
r$_{cm,tr,g,t}$: consumption of (cm, tr, g) during time period t
$\underline{S}_{su}, \overline{S}_{su}$: the minimum and maximum capacity for storage unit su;
$\underline{S}_{jv,su}, \overline{S}_{jv,su}$: the minimum and maximum storage capacity for (jv, su);
$\underline{S}_{cm,tr,g}, \overline{S}_{cm,tr,g}$: the minimum and maximum storage capacity for (cm, tr, g);

$\overline{I}_{jv',su',jv,su}$: the maximum net loan or transfer allowed from (jv', su') to (jv, su)
$\overline{I}_{jv',su',jv,su,t}$: the maximum loan or transfer from (jv', su') to (jv, su) during time period t
$\overline{q}_{dc}^{DI}$: the maximum divertable energy quantity from dc;
$\overline{q}_{dc}^{SPOT}$: the maximum over produced LNG quantity that dc can take;
$\underline{q}_{dc}, \overline{q}_{dc}$: the minimum and maximum energy quantity required by dc; (including diversions)
$\underline{\mu}_{dc}, \overline{\mu}_{dc}$: the minimum and maximum cargos required by dc; (excluding diversions)
$\underline{q}_{tw}, \overline{q}_{tw}$: the minimum and maximum energy quantity required by tw;
$\underline{\mu}_{tw}, \overline{\mu}_{tw}$: the minimum and maximum cargos required by tw;
$\overline{q}_{bfr}$: the maximum energy quantity allowed for bfr;
$\underline{q}_a^{FRPREC}, \overline{q}_a^{FRPREC}$: the minimum and maximum energy quantity specified for ξ$^{FRPREC}$ (a);

Note: See Section 2.2 for parameters associated with arcs.

3.1.3 Variables x$_a$: binary variable, 1 if arc a is selected; 0 o.w.; ∀a∈A
s$_{jv,su,t}$: inventory level for (jv, su) at the end of time period t
s$_{cm,tr,g,t}$: inventory level for (cm, tr, g) at the end of time period t
l$_{jv',su',jv,su,t}$: loan or transfer from (jv', su') to (jv, su) during time period t
y$_{dc}$: the LNG energy quantity that is diverted from contract dc; ∀dc∈DC
z$_{tw}$: binary variable, 1 if diversion time window tw is selected; 0 o.w.; ∀tw∈TW$^{DIReg}$
z$_{tw,jv}$: binary variable, 1 if diversion tw is selected by joint venture jv; 0 o.w.; ∀tw∈TW$^{DIJV}$, jv∈JV(tw)
z$_{tw,fr}$: binary variable, 1 if diversion tw is selected by fiscal regime fr; 0 o.w.; ∀tw∈TW$^{DIF\ R}$, fr∈FR(tw)

3.2 Formulation

Objective
Social Economy $$\max \sum_{a \in A} (Rev_a - Shp_a) x_a \qquad (1a)$$

JV's Profit $$\max \sum_{a \in A} (1 - tax_a) \cdot (Rev_a - Roy_a - Shp_a) x_a \qquad (1b)$$

IOC's Profit $$\max \sum_{a \in A} share_a^{ICO} (1 - tax_a) \cdot (Rev_a - Roy_a - Shp_a) x_a \qquad (1c)$$

NOC's Interest $$\max \sum_{a \in A} \{Roy_a + (tax_a + share_a^{NOC}(1 - tax_a)) \cdot (Rev_a - Roy_a - Shp_a)\} x_a \quad (1d)$$

Flow Conservation $$\sum_{a \in \delta^+(n)} x_a = 1, \forall n \in SRC \quad (2a)$$

$$\sum_{a \in \delta^+(n)} x_a - \sum_{a \in \delta^-(n)} x_a = 0, \forall n \in N \quad (2b)$$

$$\sum_{a \in \delta^-(n)} x_a = 1, \forall n \in SNK \quad (2c)$$

Inventory Constraints $$S_{jv,su,t} = S_{jv,su,t-1} + P_{jv,su,t} + \sum_{(jv',su') \neq (jv,su)} [l_{jv,su,jv',su',t}] - \sum_{a \in \xi(jv,su,t)} \overline{u}_{a,t} \cdot x_a, \quad (3a)$$
$$\forall jv \in JV, su \in SU(jv), \forall t \in T$$

$$S_{cm,tr,g,t} = S_{cm,tr,g,t-1} - r_{cm,tr,g,t} \sum_{a \in \xi(cm,tr,g,t)} \overline{\beta}_{a,t} \cdot x_a, \quad (3b)$$
$$\forall cm \in CM^{INV}, tr \in TR(cm), g \in G(cm,tr), \forall t \in T$$

$$\underline{S}_{jv,su} \leq S_{jv,su,t} \leq \overline{S}_{jv,su}, \forall jv \in JV, su \in SU(jv), \forall t \in T \quad (3c)$$

$$\underline{S}_{su} \leq \sum_{jv \in JV(su)} S_{jv,su,t} \leq \overline{S}_{su}, \forall su \in SU, \forall t \in T \quad (3d)$$

$$\underline{S}_{cm,tr,g} \leq S_{cm,tr,g,t} \leq \overline{S}_{cm,tr,g}, \forall cm \in CM^{INV}, tr \in TR(cm), g \in G(cm,tr), \forall t \in T \quad (3e)$$

$$-\overline{l}_{jv,su,jv',su'} \leq \sum_{t' \leq t} \{l_{jv',su',jv,su,t'} - l_{jv,su,jv',su',t'}\} \leq \overline{l}_{jv',su',jv,su}, \quad (3f)$$

$$l_{jv,su,jv',su',t} \leq \overline{l}_{jv,su,jv',su',t'} \cdot l_{jv',su',jv,su,t} \leq \overline{l}_{jv',su',jv,su,t'}; \quad (3g)$$
$$\forall jv \in JV, su \in SU(jv), jv' \in JV, su' \in SU(jv'), (jv',su') \neq (jv,su)$$

Berth Constraints $$\sum_{a \in \xi(b,t)} x_a \leq 1, \forall b \in B^{LNG}, t \in T \quad (4)$$

Contract Constraints $$\underline{\mu}_{dc} \leq \sum_{a \in \xi(dc)} x_a \leq \overline{\mu}_{dc}, \forall dc \in DC \quad (5a)$$

$$\underline{q}_{dc} - y_{dc} \leq \sum_{a \in \xi(dc)} \overline{q}_a \cdot x_a \leq \overline{q}_{dc} + \overline{q}_{dc}^{SPOT}, \forall dc \in DC \quad (5b)$$

$$0 \leq y_{dc} \leq \overline{q}_{dc}^{DI}, \forall dc \in DC \quad (5c)$$

Fiscal Regime Precedency Constraints $$\sum_{a \in \xi(bfr)} \tilde{q}l_a \cdot x_a \leq \overline{q}_{bfr}, \forall bfr \in BFR \quad (6a)$$

$$\tau_a^1 \cdot x_a \leq \tau_{a'}^1 \cdot x_{a'} + |T|(1-x_a), \forall a \in A^{SUCC}, a' \in \xi^{PREC}(a) \quad (6b)$$

$$\underline{q}_a^{PREC} \cdot x_a \leq \sum_{a' \in \xi^{PREC}(a)} \tilde{q}l_{a'} \cdot x_{a'} \leq \overline{q}_a^{PREC}, \forall a \in A^{SUCC} \quad (6c)$$

Inclusive and Exclusive Time Windows $$\underline{\mu}_{tw} \leq \sum_{a \in \xi(tw)} x_a \leq \overline{\mu}_{tw}, \forall tw \in TW^{EX} \quad (7a)$$

$$\underline{q}_{tw} \leq \sum_{a \in \xi(tw)} \overline{q}_a \cdot x_a \leq \overline{q}_{tw}, \forall tw \in TW^{IN} \cup TW^{EX} \quad (7b)$$

Outcharter Constraints $$\sum_{a \in \xi(tw)} x_a \leq 1, \forall tw \in TW^{OCH} \quad (8)$$

Maintenance Time Windows $$\sum_{a \in \xi(tw)} x_a = 1, \forall tw \in TW^{MN} \quad (9)$$

Diversion Time Windows $$\underline{\mu}_{tw} \cdot z_{tw} \leq \sum_{a \in \xi(tw)} x_a \leq \overline{\mu}_{tw} \cdot z_{tw}, \forall tw \in TW^{DIReg} \quad (10a)$$

$$\underline{q}_{tw} \cdot z_{tw} \leq \sum_{a \in \xi(tw)} \tilde{q}_a \cdot x_a \leq \overline{q}_{tw} \cdot z_{tw}, \forall\, tw \in TW^{DIReg} \quad (10b)$$

$$\sum_{jv \in JV(tw)} z_{tw,jv} \leq 1, \forall\, tw \in TW^{DIJV} \quad (10c)$$

$$\underline{\mu}_{tw} z_{tw,jv} \leq \sum_{a \in \xi(tw,jv)} x_a \leq \overline{\mu}_{tw} z_{tw,jv}, \forall\, tw \in TW^{DIJV}, \forall\, jv \in JV(tw) \quad (10d)$$

$$\underline{q}_{tw} z_{tw,jv} \leq \sum_{a \in \xi(tw,jv)} \tilde{q}_a \cdot x_a \leq \overline{q}_{tw} z_{tw,jv}, \forall\, tw \in TW^{DIJV}, \forall\, jv \in JV(tw) \quad (10e)$$

$$\sum_{fr \in FR(tw)} z_{tw,fr} \leq 1, \forall\, tw \in TW^{DIFR} \quad (10f)$$

$$\underline{\mu}_{tw} z_{tw,fr} \leq \sum_{a \in \xi(tw,fr)} x_a \leq \overline{\mu}_{tw} z_{tw,fr}, \forall\, tw \in TW^{DIFR}, \forall\, fr \in FR(tw) \quad (10g)$$

$$\underline{q}_{tw} z_{tw,fr} \sum_{a \in \xi(tw,fr)} \tilde{q}_a \cdot x_a \leq \overline{q}_{tw} z_{tw,fr}, \forall\, tw \in TW^{DIFR}, \forall\, fr \in FR(tw) \quad (10h)$$

Coloading and Split Time Windows $$\underline{\mu}_{tw} \leq \sum_{a \in \xi(tw)} x_a \leq \overline{\mu}_{tw}, \forall\, tw \in TW^{CO} \quad (11)$$

The objective functions (1a)-(1d) maximize the total profit of selling LNG during the planned time horizon. In reality, people usually consider four different types of profit structures. The objective function (1a) considers the overall profit of the entire social economy which is simply the difference of sales revenue and shipping cost; the objective function (1b) represents the after-tax profit for all joint ventures; the objective function (1c) describes the profit for a specific international oil company IOC; and the objective function (1d) stands for the profit of the national oil company NOC. One of these four profits can be selected to optimize based on the commercial requirements of the problem.

Constraints (2b)-(2c) are the network flow constraints. Constraint (2a) and (2b) ensure that each ship leaves its source node and arrives at its sink node, while constraint (2c) conserves the flow through network.

Constraints (3a)-(3g) enforce the inventory balance at the terminals. During a time period t, the production inventory unit (jv, su) might have four activities: production, loaning LNG from others, returning LNG to others and loading LNG to ships. Constraint (3a) ensures that the inventory at the production terminals is balanced at the end of each day given these four activities. Regasification termi-nals, however, only have two activities: regasification and discharging LNG from ships. Constraint (3b) guarantees the inventory at regasification terminals is balanced based on the two activities. Constraints (3c)-(3e) put the storage limits or inventory capacities on production inventory unit (jv, su), storage unit su and regasification inventory unit (invCm, trr, g); while constraints (3f)-(3g) put the limits on the net loan volume and daily transfer rate between two different production inventory units.

Constraint (4) ensures that only one ship can be operated at a berth at a time. This constraint is only applied to berths at production terminals.

Constraints (5a)-(5c) guarantee that all contractual requirements are satisfied. Constraint (5a) gives the minimum and maximum cargo requirements for the contract while constraints (5b) put the minimum and maximum energy quantity requirements for that contract. Two additional options of requirements might be provided for a contract: one specifies the maximum quantity that can be diverted from the contract and the other one specifies the maximum quantity that the contract can take if the jv has over production. These options provide flexibility with regard to quantity requirements and it is reflected in the lower and upper limits in (5b) and (5c). It should be noticed that, the diverted quantity variable ydc in (5b) is redundant currently. It is included here because penalties might be introduced for diverted quantity later.

Constraints (6a)-(6c) ensure that the fiscal regime of each cargo is set correctly. Constraint (6a) specify that the energy quantity assigned to a base fiscal regime should not exceed its limit. If the fiscal regime associated with an arc a has immediate preceding regime, constraint (6b) guarantees that all of cargos assigned the preceding regime will be scheduled earlier than the cargo that is represented by a if the arc a is selected; while constraint (6c) says that the arc a can be selected only if the quantity of precedent regime has been fulfilled.

Constraints (7a)-(7b) provide cargo and quantity requirements for inclusive and exclusive time windows.

Constraint (8) ensures that the outcharter opportunity is only taken at most once. Constraint (9) forces that maintenance is applied exactly once.

Constraints (10a)-(10h) guarantee that all requirements for a diversion are satisfied if it is selected. Constraints (10a)-(10b) give the minimum and maximum cargo and quantity requirements for diversion opportunities that do not require unique joint venture or unique contract. Constraints (10c)-(10e) are cargo and quantity requirements for diversions that require all cargos to be from the same joint venture; while constraints (10f)-(10h) are for those that require all cargos to be from the same fiscal regime.

Constraint (11) gives the minimum and maximum cargo requirements for coloading and split time windows.

What is claimed is:

1. A computer implemented method for generating an optimized ship schedule to deliver liquefied natural gas (LNG) from one or more LNG liquefaction terminals to one or more LNG regasification terminals using a fleet of ships, comprising:
   (A) obtaining input data on the LNG shipping operations, wherein the input data comprises one or more of production data from one or more LNG liquefaction terminals, facility management data from one or more production terminals, customer terminal data, contract data, and shipping data;
(B) identifying a time horizon for the optimized ship schedule;
(C) defining one or more objectives associated with the LNG shipping operations in a computer system;
(D) defining two or more constraints in the computer system, wherein at least one of the constraints is configurable to be a hard constraint and wherein at least one of the constraints is configurable to be a soft constraint;
(E) prioritizing the defined constraints based on the one or more objectives;
(F) defining at least one of the constraints to be a hard constraint based on the prioritization;
(G) defining at least one of the constraints to be a soft constraint based on the prioritization;
(H) determining one or more algorithms to optimize an LNG ship scheduling model in the computer system;
(I) calculating optimal decisions with the one or more algorithms based on the one or more objectives, input data, and constraints in the computer system, wherein the calculating optimal decisions with the one or more algorithms comprises:
  (i) generating a feasible solution to a feasibility model, wherein the feasibility model is a based on the LNG ship scheduling model, wherein the feasibility model is solved by a rolling time algorithm, wherein the rolling time algorithm breaks the identified time horizon into a sequence of smaller overlapping time blocks and solves each sub-problem sequentially, and wherein for each sub-problem the method comprises:
    adjusting coefficients for an objective function of the sub-problem;
    creating the sub-problem by populating one or more of variables, parameters, and constraints;
    adjusting a solver for the sub-problem by adjusting one or more of node limits, time limits, and optimality tolerance;
    solving the sub-problem; and
    updating the feasibility solution with the solution to the sub-problem to converge in an iterative manner to an optimal solution;
  (ii) generating an optimal solution to the feasibility model, wherein the feasibility model is solved by a rolling time algorithm;
  (iii) identifying one or more soft constraints to relax and relaxing the constraint range for the soft constraint;
  (iv) calculating a soft constraint violation with respect to original constraint range for the identified soft constraints, after generating the optimal solution to the feasibility model;
  (v) calculating a minimal violation for the calculated constraint violation; and
  (vi) defining the feasibility model with penalties for the relaxed constraint;
(J) displaying the optimal decisions as output data; and
(K) using the output data to perform LNG shipping operations.

2. The computer implemented method of claim 1, wherein calculating optimal decisions with the one or more algorithms comprises minimizing in-chartered ships using an in-charter model, wherein the in-charter model is based on the LNG ship scheduling model.

3. The computer implemented method of claim 1, wherein calculating optimal decisions with the one or more algorithms comprises searching for out-charter opportunities using an out-charter model, wherein the out-charter model is based on the LNG ship scheduling model.

4. The computer implemented method of claim 1, wherein a soft constraint is generated from the one or more constraints based on values of input data.

5. The computer implemented method of claim 4, wherein the soft constraint is generated based on one or more of aggregated for constraints based on ratability and relaxed for constraints based on inventory.

6. The computer implemented method of claim 5, comprising adjusting a ratability window for the soft constraint range based on the input data.

7. The computer implemented method of claim 1, wherein the calculating optimal decisions with the one or more algorithms based on the one or more objectives, input data and one or more constraints comprises modeling the boil-off rate for one or more of the ships in the fleet of ships.

8. The computer implemented method of claim 1, wherein the calculating optimal decisions with the one or more algorithms based on the one or more objectives, input data and one or more constraints comprises computing fuel options for one or more of the ships in the fleet of ships.

9. The computer implemented method of claim 1, wherein the fleet of ships includes at least one ship that is one of leased, owned, in-chartered, and available for transport of a spot LNG cargo.

10. The computer implemented method of claim 1, wherein the optimal decisions comprise a ship schedule for at least one ship owned or leased by an LNG customer.

11. The computer implemented method of claim 1, wherein creating an optimized ship schedule includes optimizing optionally in the LNG supply chain.

12. The computer implemented method of claim 1, wherein the LNG ship scheduling model is an annual development plan (ADP) model.

13. The method of claim 1, further comprising determining whether to convert one of the one or more constraints from the hard constraint into the soft constraint.

14. The computed implemented method of claim 1, wherein the LNG shipping operations comprises delivering LNG from a liquefaction terminal to a regasification terminal.

15. A system for generating an optimized ship schedule to deliver liquefied natural gas (LNG) from one or more LNG liquefaction terminals to one or more LNG regasification terminals using a fleet of ships, comprising:
  a processor;
  an input device in communication with the processor and configured to receive input data associated with the LNG shipping operations, wherein the input data comprises one or more of production data from one or more LNG liquefaction terminals, facility management data from one or more production terminals, customer terminal data, contract data, and shipping data;
  memory in communication with the processor, the memory having a set of instructions, wherein the set of instructions, when executed, are configured to:
    define one or more objectives associated with the LNG shipping operations;
    define two or more constraints, wherein at least one of the constraints is configurable to be a hard constraint and wherein at least one of the constraints is configurable to be a soft constraint, wherein the soft constraint is configured to permit minor violations of the soft constraint;
prioritize the defined constraints based on the one or more objectives;
define at least one of the constraints to be a hard constraint based on the prioritization;
define at least one of the constraints to be a soft constraint based on the prioritization;
determine one or more algorithms to optimize an LNG ship scheduling model;
calculate optimal decisions with the one or more algorithms based on the one or more objectives, input data and one or more constraints, wherein the calculating optimal decisions comprises:
generating a feasible solution to a feasibility model, wherein the feasibility model is a based on the LNG ship scheduling model, and wherein the feasibility model is solved by a rolling time algorithm, wherein the rolling time algorithm breaks the identified time horizon into a sequence of smaller overlapping time blocks and solves each sub-problem sequentially, and wherein for each sub-problem the method comprises:
adjusting coefficients for an objective function of the sub-problem;
creating the sub-problem by populating one or more of variables, parameters, and constraints;
adjusting a solver for the sub-problem by adjusting one or more of node limits, time limits, and optimality tolerance;
solving the sub-problem; and
updating the feasibility solution with the solution to the sub-problem to converge in an iterative manner to an optimal solution;
generating an optimal solution to the feasibility model, wherein the feasibility model is solved by a rolling time algorithm;
identifying one or more soft constraints to relax and relaxing the constraint range for the soft constraint;
calculating a constraint violation of the feasibility solution using the identified soft constraint; and
minimizing the constraint violation based on the one of the one or more constraints using at least one penalty term in the objective; and
an output device that outputs the optimized ship schedule.

16. The system of claim 15, wherein the set of instructions are further configured to minimize the in-chartered ships using an in-charter model, wherein the in-charter model is based on the LNG ship scheduling model.

17. The system of claim 15, wherein the set of instructions are further configured to: search for out-charter opportunities using an out-charter model, wherein the out-charter model is based on the LNG ship scheduling model.

18. The system of claim 15, wherein the set of instructions are further configured to compute optimal solution to an optimality model, wherein the optimality model is based on the LNG ship scheduling model.

19. The system of claim 15, wherein the set of instructions are further configured to calculate aggregate constraints based on input data.

20. The system of claim 15, wherein the set of instructions are further configured to model the boil-off rate for one or more of the ships in the fleet of ships.

21. The system of claim 15, wherein the set of instructions, when executed, are further configured to convert one of the one or more constraints from the hard constraint into the soft constraint.

22. A method for delivering liquefied natural gas (LNG) from one or more liquefaction terminals to one or more LNG regasification terminals using a fleet of ships, comprising:
(I) developing an optimized ship schedule, comprising:
(A) obtaining input data on LNG shipping operations, wherein the input data comprises one or more of production data from one or more LNG liquefaction terminals, facility management data from one or more LNG production terminals, customer terminal data, and shipping data;
(B) identifying a time horizon for the optimized ship schedule;
(C) defining two or more constraints for the optimized ship schedule, wherein at least one of the two or more constraints is a hard constraint, and wherein at least one of the two or more constraints is a soft constraint;
(D) determining a feasible solution to a feasibility model, wherein the feasibility model minimizes violations of the hard constraints and is solved by a rolling time algorithm, wherein the rolling time algorithm breaks the identified time horizon into a sequence of smaller overlapping time blocks and solves each sub-problem sequentially, and wherein for each sub-problem the method comprises:
adjusting coefficients for an objective function of the sub-problem;
creating the sub-problem by populating one or more of variables, parameters, and constraints;
adjusting a solver for the sub-problem by adjusting one or more of node limits, time limits, and optimality tolerance;
solving the sub-problem; and
updating the feasibility solution with the solution to the sub-problem to converge in an iterative manner to an optimal solution;
(E) optimizing the feasible solution to determine an optimal solution to the feasibility model, wherein the feasibility model is solved by an algorithm performing a sequence of local searches until the objective function vale of the feasibility model reaches zero, wherein the local searches comprise one or more of a one-direction search, a k-day-flexibility-time-window search, a sorted one-ship search, and a sorted two-ship search;
(F) determining one or more additional constraints for optimized ship schedule and prioritizing the defined constraints based on one more objectives, wherein the one or more objectives comprise minimizing in-chartering ships or maximizing out-chartering opportunities; and
(G) determining an updated solution to the optimal solution based on the objectives, wherein the feasibility model is solved by an algorithm that sorts the ships in the fleet of ships based on utilization and then uses the objectives to optimize the feasibility model until the algorithm terminates when the objective function value reaches zero, is below a specified threshold, or after a specified number of iterations;
(II) displaying the updated solution as the optimized ship schedule; and (III) delivering LNG from one or more liquefaction terminals to one or more LNG regasification terminals based on the optimized ship schedule.

\* \* \* \* \*